United States Patent [19]
Hirose et al.

[11] 3,992,089
[45] Nov. 16, 1976

[54] READER-PRINTER APPARATUS WITH MULTIPLE SUPPLY ROLLS AND CHARGING DEVICES

[75] Inventors: Hiroshi Hirose, Machida; Hiroshi Yamada, Ichikawa; Nachio Seko, Sagamihara; Junji Kurokawa, Yokohama; Masumi Ikesue, Tokyo; Shozo Shimomura, Tokyo; Hideo Yamazaki, Tokyo; Hiroki Takeda, Tokyo; Tetsuo Sakurai, Sagamihara; Hiroshi Mano, Yokohama; Minolu Fukuda, Yokohama; Setsuo Soga, Mitaka; Yukio Noguchi, Yokohama, all of Japan

[73] Assignee: Ricoh Company, Ltd., Japan

[22] Filed: Oct. 10, 1975

[21] Appl. No.: 621,544

[30] Foreign Application Priority Data
Oct. 14, 1974 Japan.............................. 49-117956

[52] U.S. Cl..................................... 355/5; 355/13; 355/45; 355/73
[51] Int. Cl.² ................ G03G 15/00; G03B 13/28; G03B 27/60
[58] Field of Search................ 355/3 CH, 5, 13, 29, 355/45, 73; 271/259

[56] References Cited
UNITED STATES PATENTS

| | | | |
|---|---|---|---|
| 2,979,026 | 4/1961 | Reuter, Jr............................ | 355/5 X |
| 3,418,047 | 12/1968 | Lee et al............................. | 355/13 X |
| 3,451,754 | 6/1969 | Prew.................................... | 355/73 |
| 3,495,822 | 2/1970 | Cederbaum......................... | 271/259 |
| 3,578,970 | 5/1971 | Michand et al. .......... | 355/3 CH UX |
| 3,597,078 | 8/1971 | Miyauchi............................. | 355/73 |
| 3,672,770 | 6/1972 | Lee..................................... | 355/13 X |
| 3,684,373 | 8/1972 | Berge et al......................... | 355/29 X |
| 3,727,499 | 4/1973 | Boston................................ | 355/13 X |
| 3,730,623 | 5/1973 | Jordan................................ | 355/73 X |
| 3,878,540 | 4/1975 | Kawai................................. | 271/259 X |
| 3,890,045 | 6/1975 | Barnstein et al..................... | 355/73 |
| 3,899,248 | 8/1975 | Tiger................................... | 355/5 |

Primary Examiner—George H. Miller, Jr.
Attorney, Agent, or Firm—McGlew and Tuttle

[57] ABSTRACT

The apparatus comprises a projection optical system and a copying system. The projection optical system can project an image of an original either onto a screen or to an exposing position of the copying system by switching between two positions. The copying system comprises a plurality of chargers providing different charging conditions in accordance with the types and sizes of copy sheets, by utilizing a changeover switch. A plurality of switches adapted for use with copy sheets of different lengths are arranged along the path of movement of a sheet of paper and, when the switch corresponding to the particular length of copy sheet desired is actuated, the movement of the sheet of paper is stopped, so that the central portion of the copy sheet can be brought into alignment with the optical axis for exposing at all times regardless of the difference in the length of copy sheets. Apparatus can interchangeably mount either a pressing plate assembly for manually feeding one original after another or an automatic feed device which can automatically feed one by one a plurality of originals to the exposing position of the copying system and to eject the same therefrom. By switching between the charging conditions of the chargers, it is possible to produce a positive duplicate of an original irrespective of whether the original is negative or positive. The pressing plate assembly and automatic feed device comprise carriers for effecting moving in X-and Y-directions which are interchangeable, so that it is possible to select a carrier which best suits the size of an original and the amount of movement of the original. The projection optical system comprises a blind coupled to a reflector so as to prevent light from the screen from reaching the exposing position of the copying system, the reflecting surface automatically facing downwardly when the power source is turned off.

17 Claims, 52 Drawing Figures

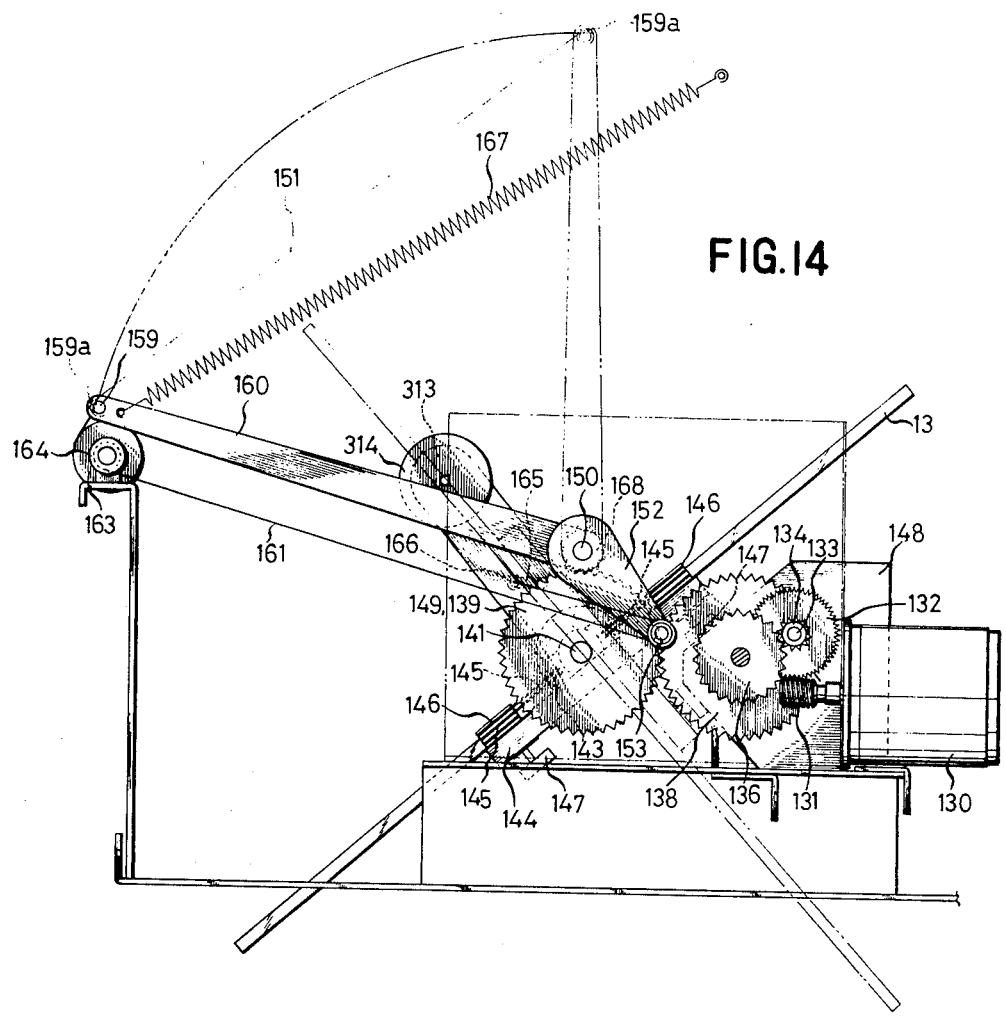

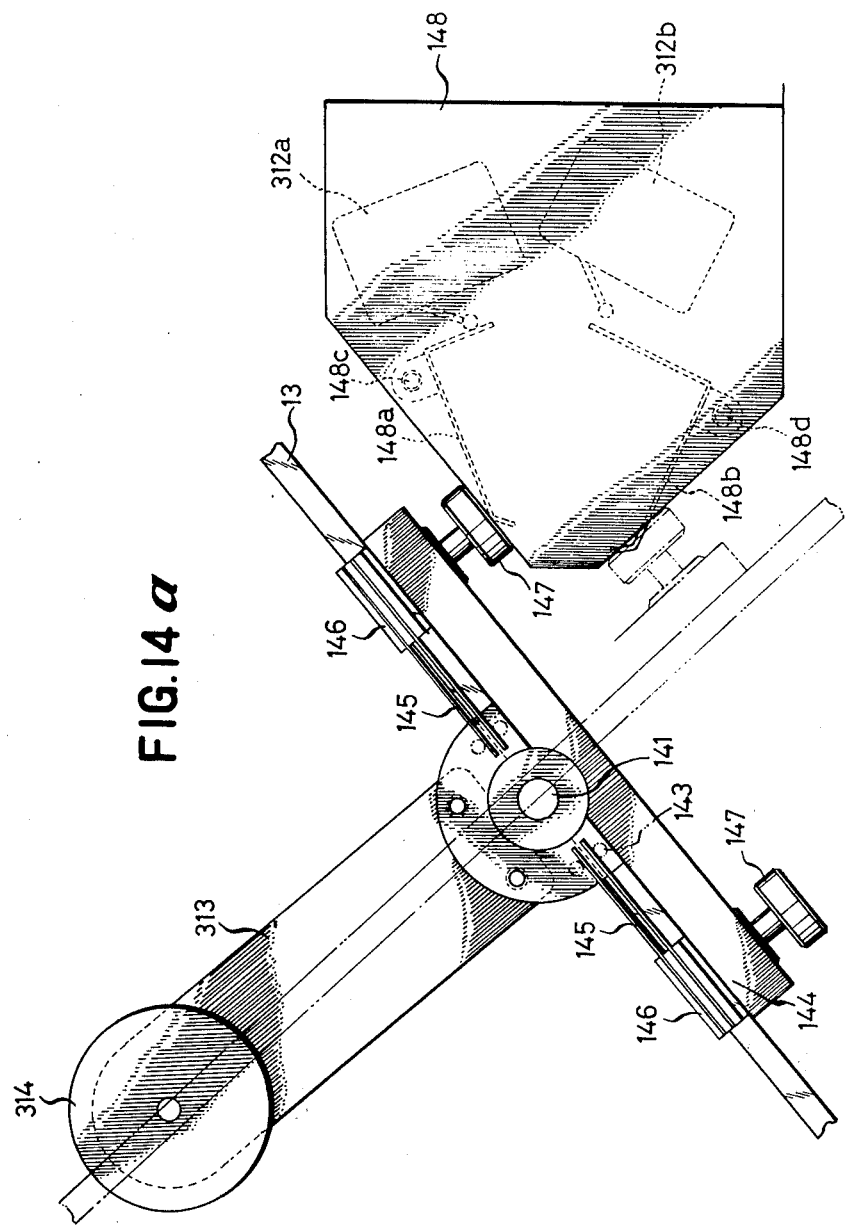

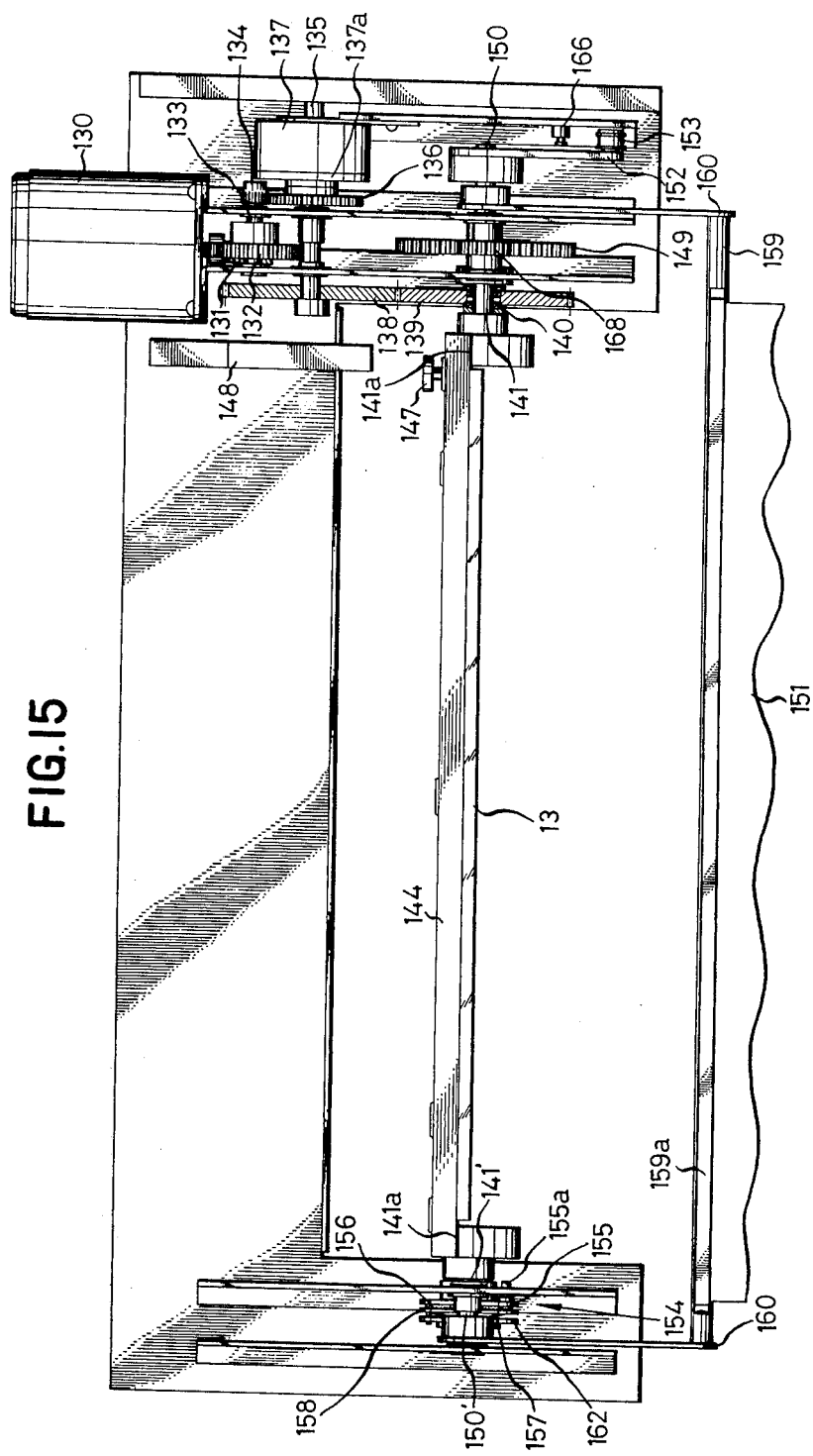

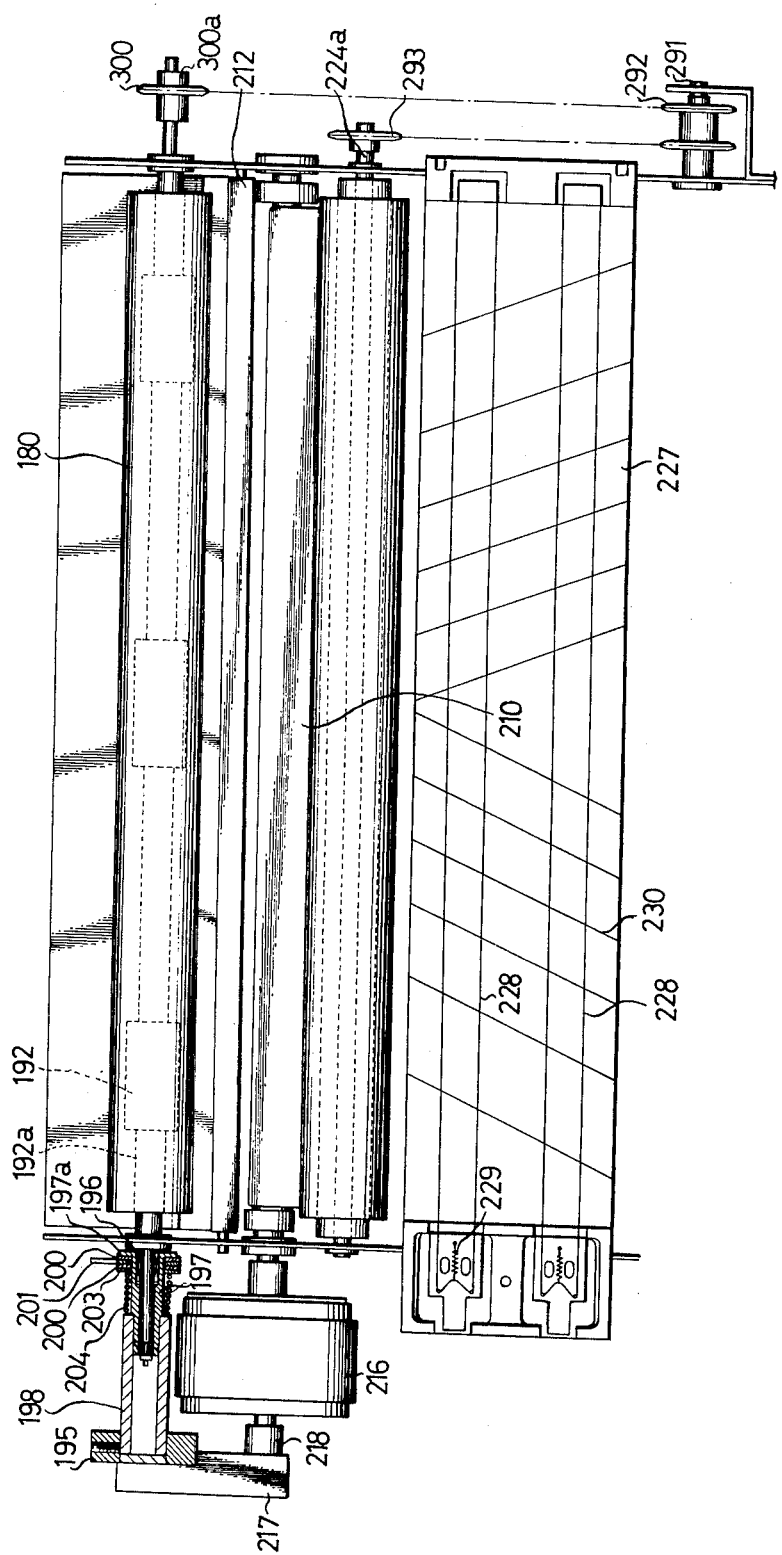

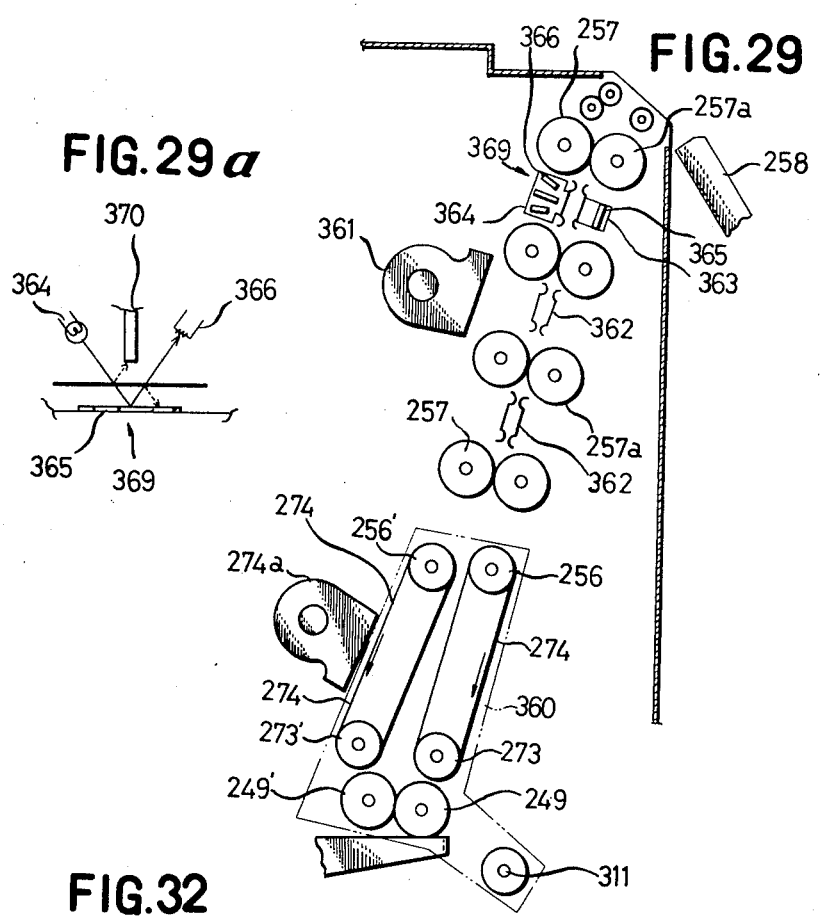
FIG. 29
FIG. 29a
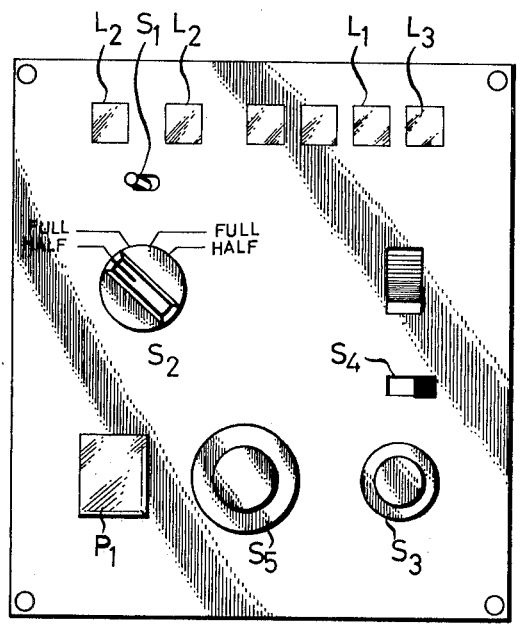
FIG. 32

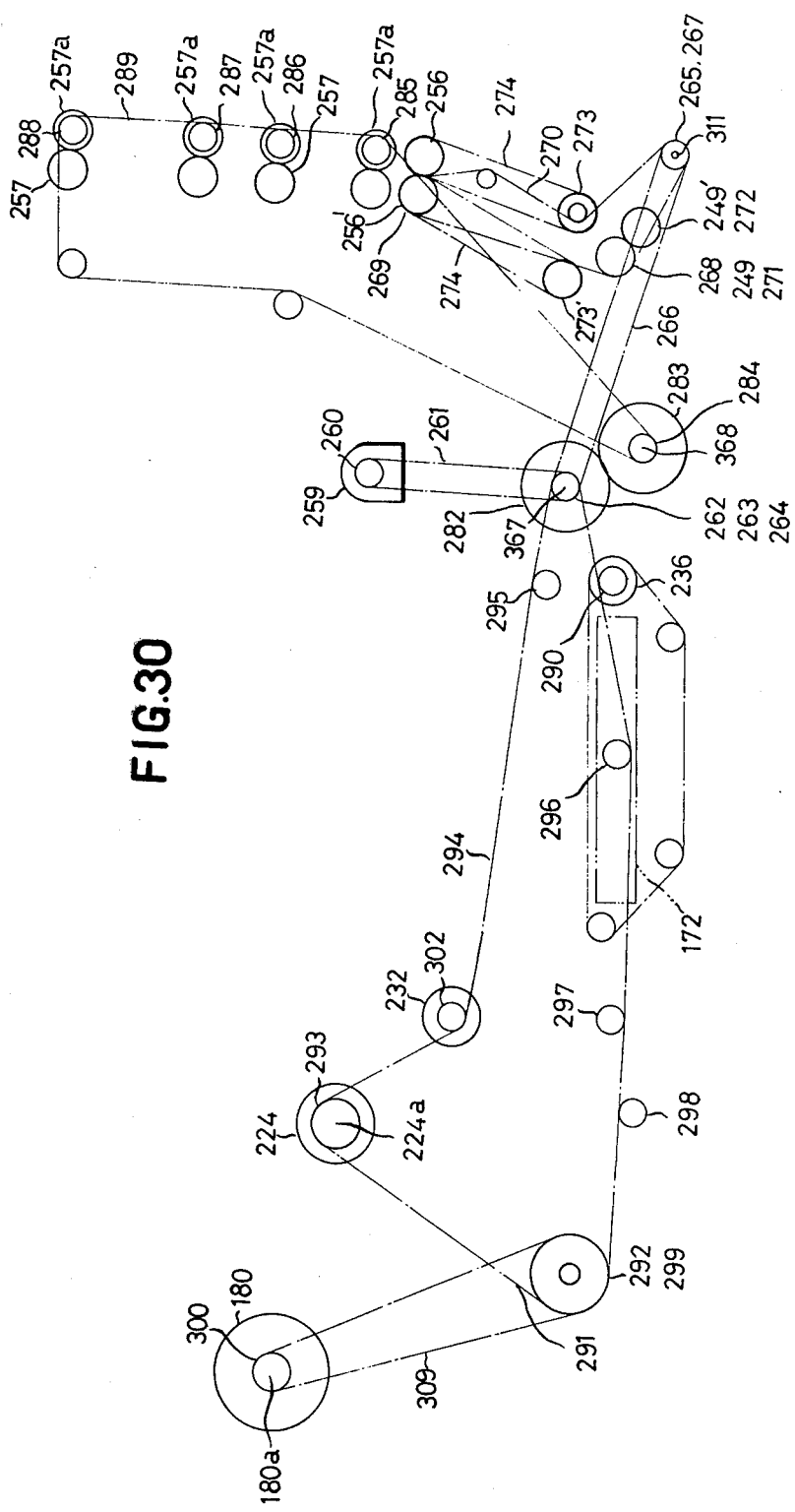

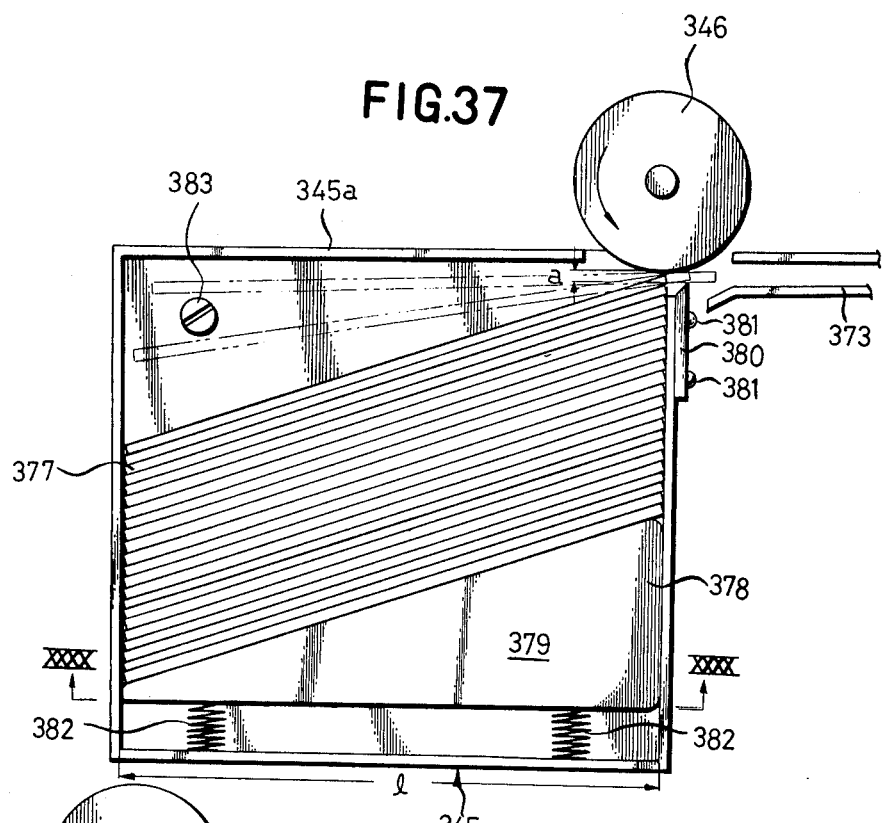
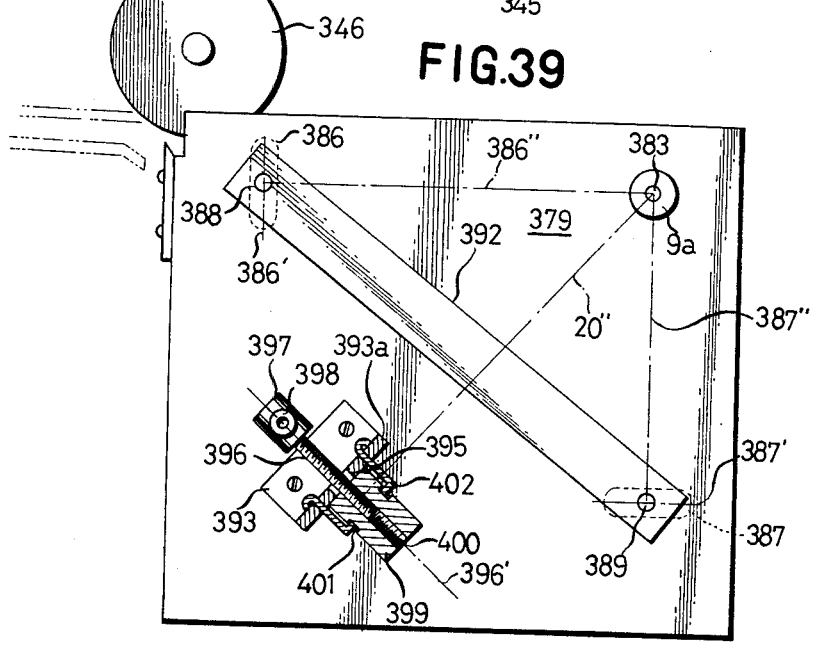

READER-PRINTER APPARATUS WITH MULTIPLE SUPPLY ROLLS AND CHARGING DEVICES

BACKGROUND OF THE INVENTION

This invention relates to an apparatus in which are incorporated, in combination, a reader for cards, microfiches, or microfilms and a copying system.

The practice of using reader-printer apparatus comprising the combination of a copying system and a reader has become popular in recent years. This is an increasing demand for reader-printer apparatus of the type which permits an original either in the form of a negative or in the form of a positive to be selectively handled. In one type of reader-printer apparatus known in the art, the charger is switched between opposite charging polarities for effecting switching between positive and negagive. To effect switching between opposite charging polarities, it is necessary to use a complex construction for moving the charger casing upside down or to utilize a high voltage change-over switch.

Copying systems of the prior art have the disadvantage of having to adjust the charging condition each time the quality of paper handled is varied, e.g. between translucent paper and ordinary paper, or there is a change in the size of the copy sheets required, in order to produce duplicates of high quality. Thus they are inconvenient to operate.

For example, microfilm used as an original is either in a negative form or positive form. Users may wish to use an original in either negative form or positive form as desired. In one type of printers or copying systems known in the art, a positive image can be obtained from both negative and positive originals by switching between the opposite charging polarities of the copy sheets. Besides producing duplicates of an original by using ordinary copy sheets, the need arises of using translucent paper for file copies of drawings and for use in the design section. To meet this requirement, proposals have been made by us to provide a reader-printer apparatus which is capable of using translucent paper.

However, there has been no reader-printer apparatus available which enables obtaining duplicates of high quality by switching by simple means regardless of the type of an original, for example, whether it is negative or positive, and the type of copy sheets.

SUMMARY OF THE INVENTION

This invention obviates the aforementioned disadvantages of the prior art. Accordingly, the invention has for its object the provision of a reader-printer apparatus which can handle any type of original and any type of copy sheets by using a simple switching mechanism and which is capable of producing duplicates of high quality from an original of any type.

According to the invention, there is provided a reader-printer apparatus comprising a projection optical system having a reflector device capable of projecting an image of an original either onto a screen or to a duplication exposing position by switching, and a copying system capable of mounting at least two rolls of paper of different widths, such copying system comprising a copy sheet feed device capable of switching between the rolls of paper to be fed in accordance with the size of copy sheets required, a paper cutting device, two sets of chargers which can be switched in accordance with the size of copy sheets and the quality of copy sheets, a copy sheet suction and conveyor device, a developing device, and a sheet ejecting device.

BRIEF DESCRIPTION OF THE DRAWINGS

FIG. 14 is a side view of the first reflector for switching between the reading position and the printing position and the drive means therefor;
FIG. 14a is a side view showing the relation between switches and stoppers of the first reflector;
FIG. 15 is a plan view of the first reflector and the drive means therefor;
FIG. 22 is a plan view of the copy sheet feed device;
FIG. 29 is a schematic view of the sheet ejecting device;
FIG. 29a is a schematic view of the ejection detection switch.
FIG. 30 is a schematic front view of the drive system;
FIG. 32 shows one example of the arrangement of lamps and knobs on the operation panel.

FIG. 37 is a plan view of the card separation and feed device provided with card feed gap adjusting means;

FIG. 39 is a bottom plan view of the device shown in FIG. 37 as seen in the direction of the arrows of FIG. 38, with the base plate being removed;

DESCRIPRION OF A PREFERRED EMBODIMENT

Figure 1:
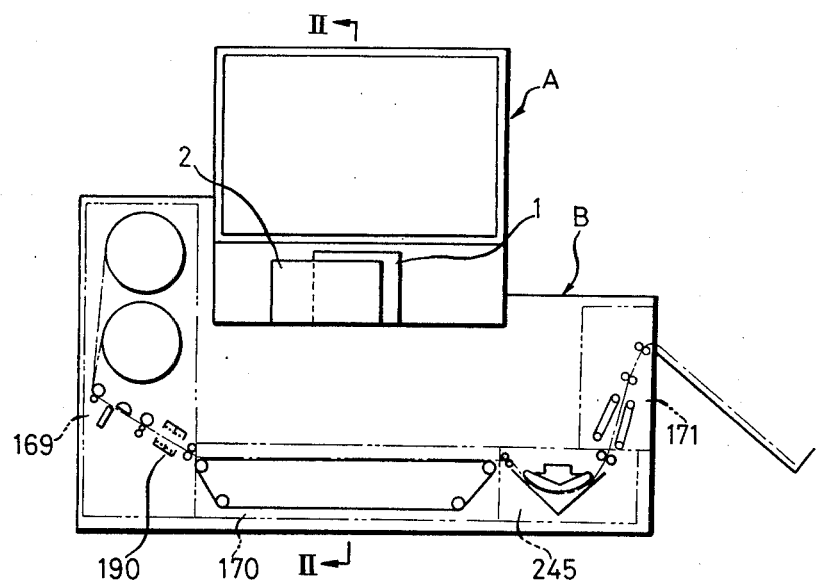
FIG. 1 is a front view of the reader-printer apparatus according to the invention, with its cover removed.
Figure 2:
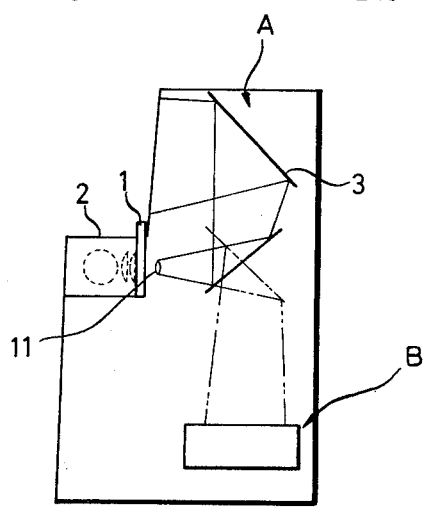
FIG. 2 is a sectional view taken along the line II—II of FIG. 1.

Referring to FIG. 1 and FIG. 2, the reader-printer apparatus in accordance with the invention comprises a projection optical system A and a copying system B. The projection optical system A will be first described. As shown in FIG. 1 to FIG. 5, the projection optical system comprises a device 1 for moving an original, a condenser device 2, a reflector device 3 and projecting lenses 11.

Figure 3:
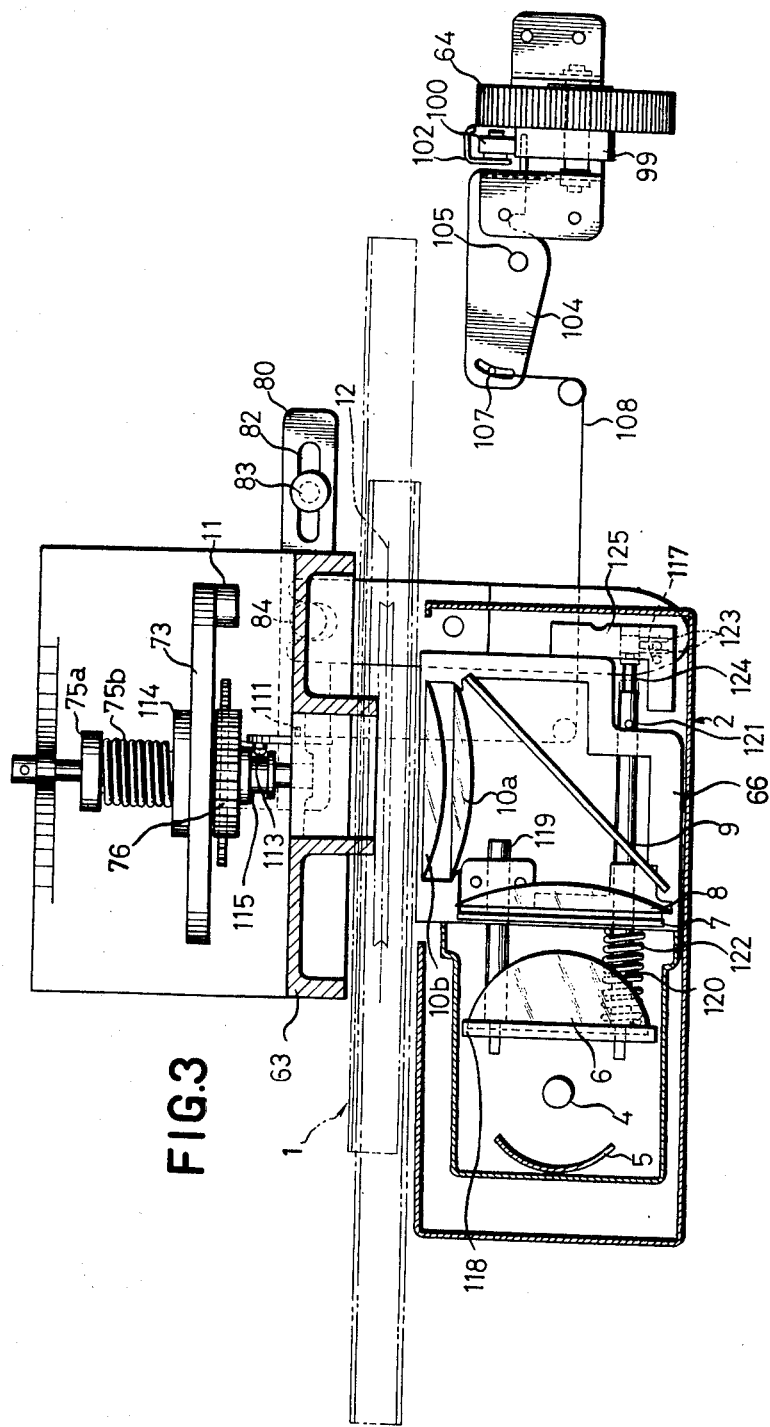
FIG. 3 is a plan view of the projection optical system.
Figure 4:
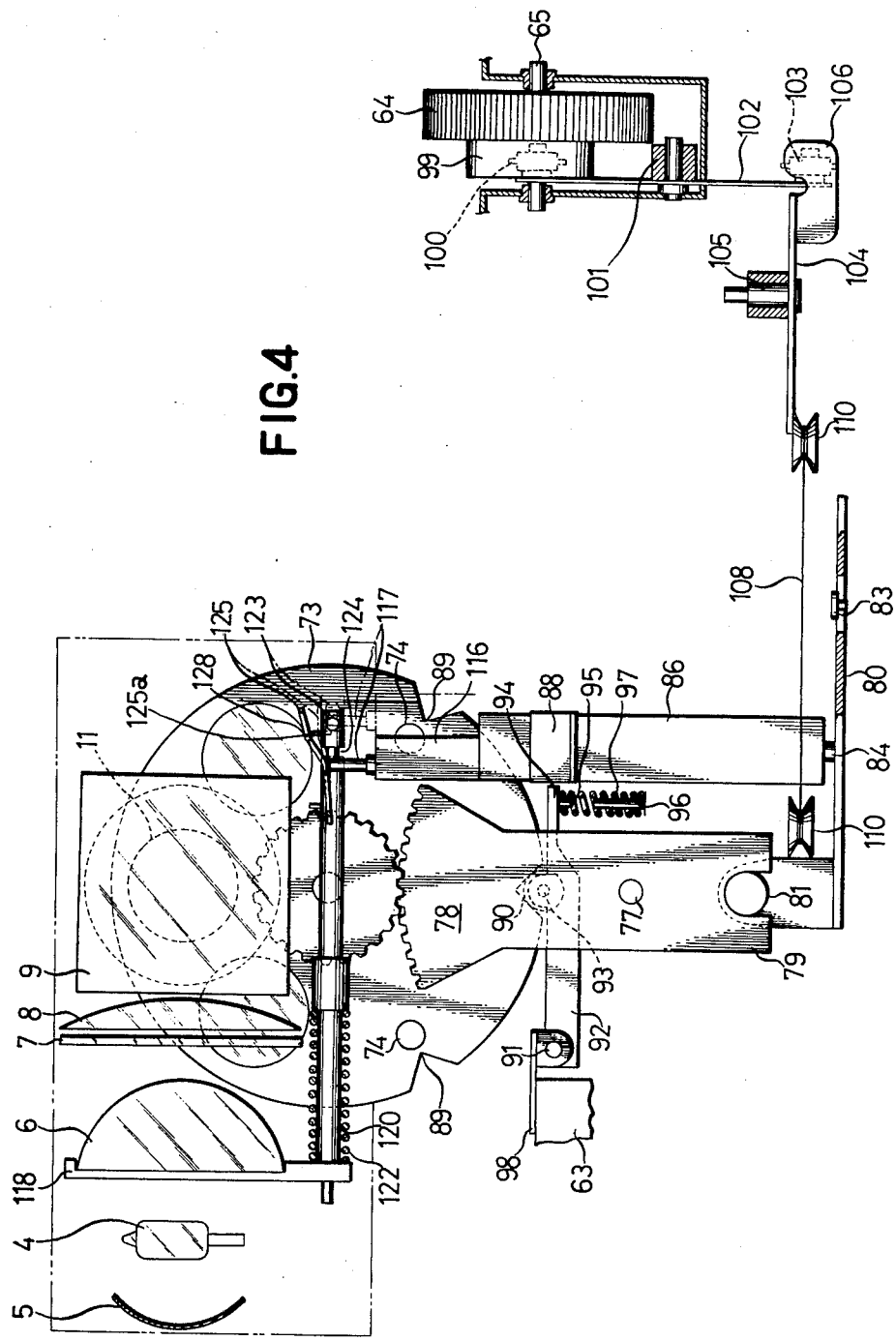
FIG. 4 is a front view of the projection optical system.
Figure 5:
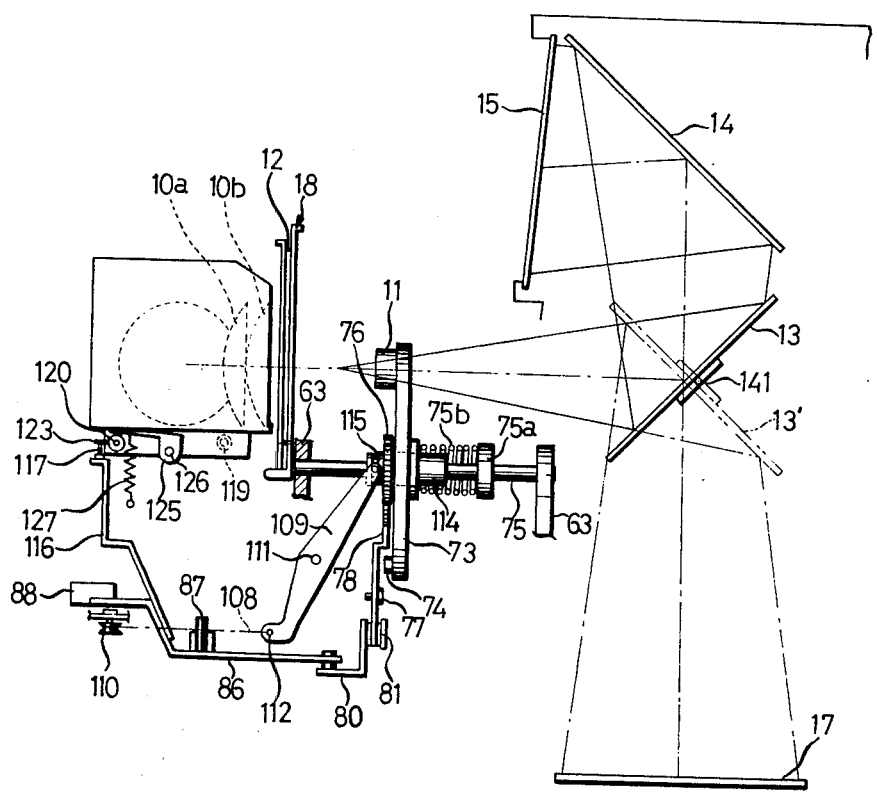
FIG. 5 is a side view of the protection optical system.
Figure 6:
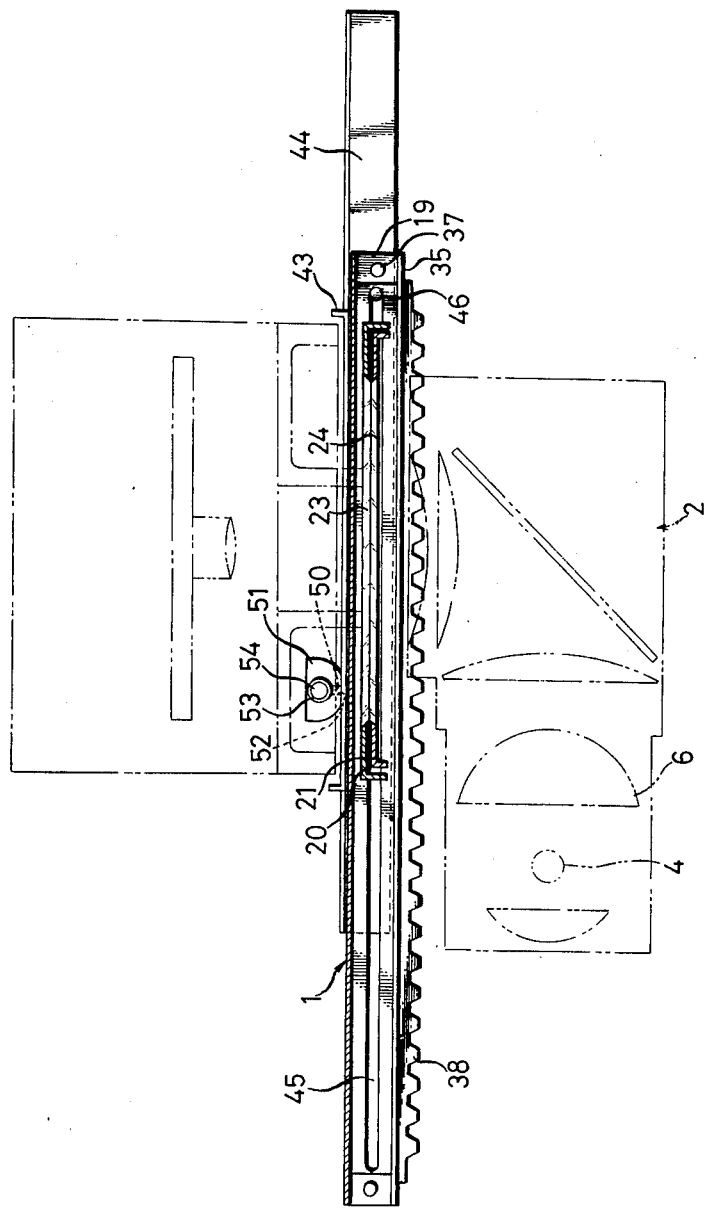
FIG. 6 is a plan view of the device for moving the original.
Figure 7:
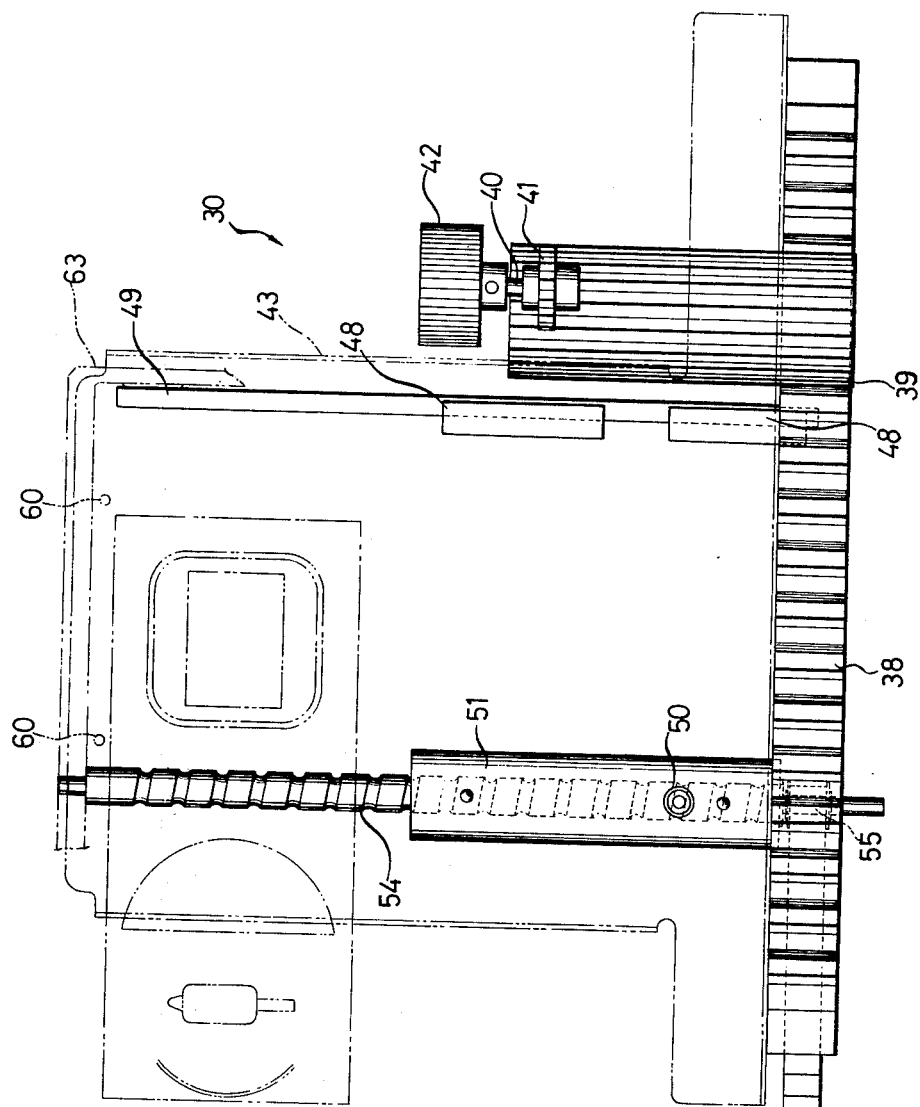
FIG. 7 is a front view of the device for moving the original.

Referring to FIG. 3 to FIG. 5, the condenser device 2 comprises a light source 4, a spherical mirror 5 for reflecting light rays from the light source 4, and a first condenser lens 6 for concentrating the light rays directly emanating from the light source 4 and the light rays reflected by the spherical mirror 5. The light rays concentrated on the first condenser lens 6 pass through a heat insulating filter 7 and a second condenser lens 8 and are reflected by a cold mirror 9. Then they pass through a third condenser lens 10a and a fourth condenser lens 10b and are projected onto an original 12 held in position by the device 1 for moving the original (original moving device). The cold mirror 9, which is in the form of a half mirror, reflects visible light rays but permits visible light rays to pass therethrough.

When the reader-printer apparatus according to the invention functions as a reader, the light rays projected through the original 12 pass through one of the projection lenses 11 in the projection position and are reflected upwardly in FIG. 5 by a first reflector 13. The light rays reflected by the first reflector 13 are further reflected by a second reflector 14, so that they are projected onto a screen 15 mounted in the front of the apparatus. The operator reads the content of the original 12 through an image of the original 12 formed on the screen 15.

The first reflector 13 is pivotally supported by a shaft 141 and moves to a dash-and-dot line position 13' shown in FIG. 5 when a duplicate of the original 12 is to be produced. When a duplicate of the original 12 is to be produced, the light rays of the original 12 are reflected downwardly in FIG. 5 by the first reflector disposed in the dash-and-dot line position 13' and projected onto a copy sheet 17 disposed in an exposing position of the copying system B.

Referring to FIG. 6 to FIG. 9, the original moving device 1 comprises a pressing plate means or assembly 18 for holding the original 12, a carrier 19 for moving the pressing plate means 18 up and down and rightwardly and leftwardly so as to move a desired portion of the original 12 held by the pressing plate means 18 to a light ray projection position, and a moving device 30 for moving the carrier 19.

Figure 8:
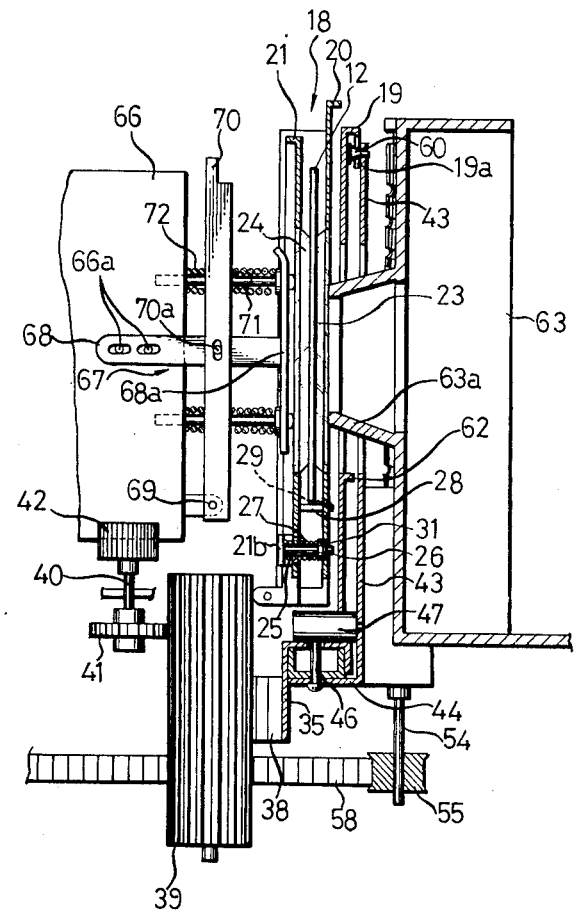
FIG. 8 is a side view of the device for moving the original.
Figure 9:
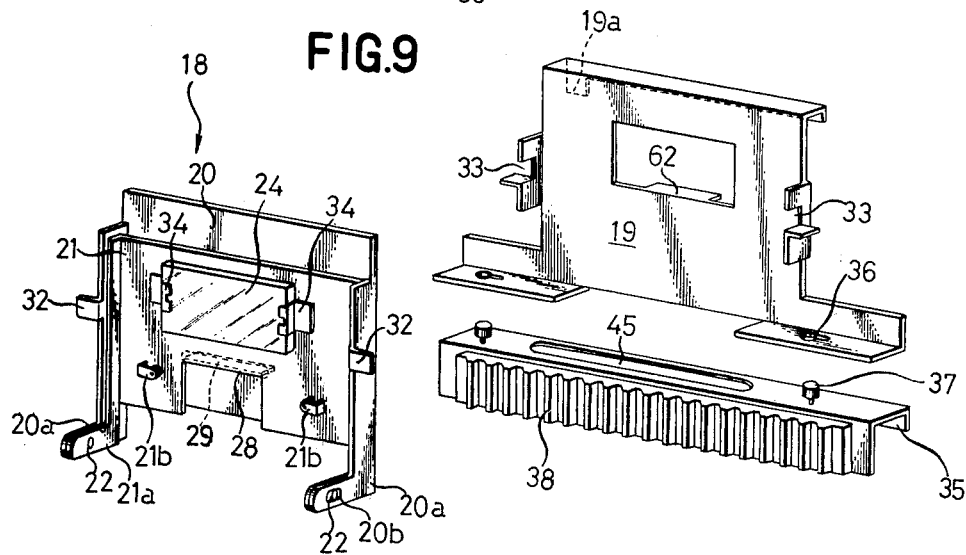
FIG. 9 is an exploded perspective view of the pressing plate assembly and the carrier base.
Figure 10:
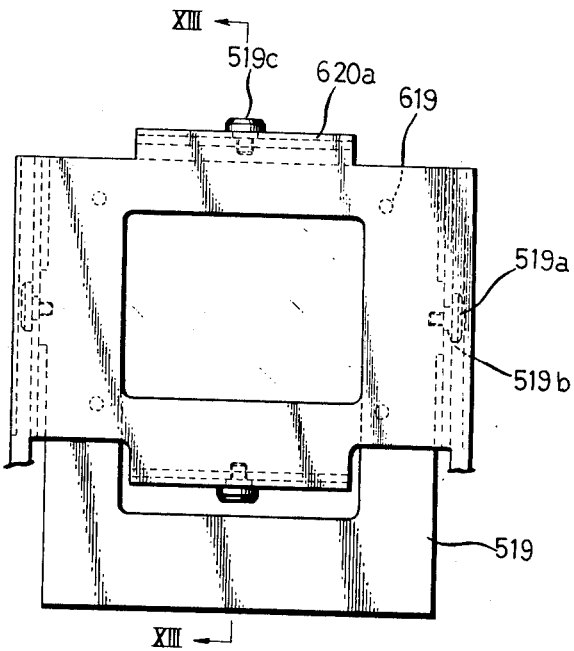
FIG. 10 is a front view of another form of the pressing plate assembly.
Figure 11:
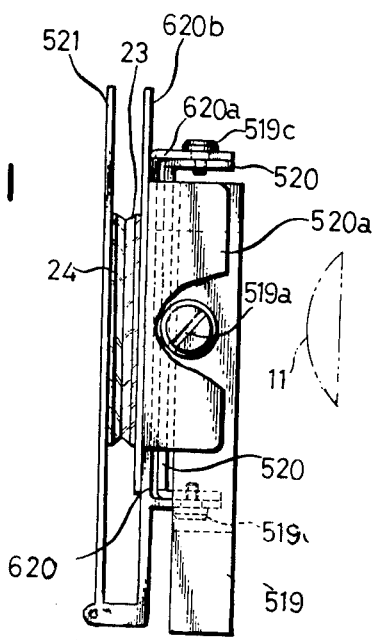
FIG. 11 is a side view of the assembly shown in FIG. 10.
Figure 12:
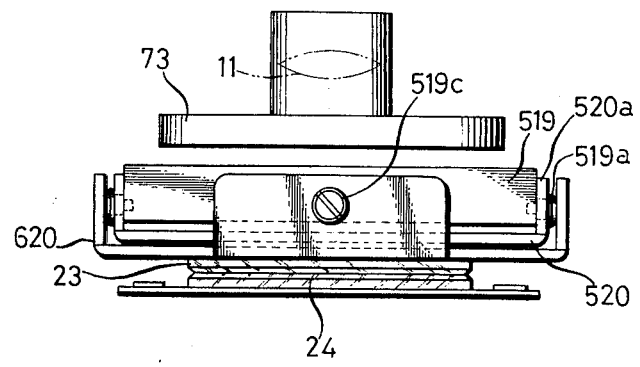
FIG. 12 is a plan view of the assembly shown in FIG. 10.

As shown in FIG. 8 and FIG. 9, the pressing plate means 18 comprises a keep plate 21 and a support plate 20, the keep plate 21 being formed with a lug 21a to which is secured a pin 22 which is received in a slot 20b formed in a lug 20a on the support plate 20. By this arrangement, the keep plate 21 and the support plate 20 are hingedly connected together. The provision of the slot 20b enables effecting adjustments of the distance between the keep plate 21 and the support plate 20 in accordance with the thickness of the original.

The keep plate 21 and the support plate 20 have secured thereto, by support means 34, respective pressure plates 23 and 24 which are brought into pressing engagement with the original and support the projection surface of the original, the pressing plates 23, 24 being made of glass or other transparent material. Two pins 25 are attached to the keep plate 21 by threadable connection or otherwise and each has a free end which extends through a respective aperture formed in the support plate 20. Each of the pins 25 projecting from the keep plate 21 has secured thereto a stopper 26, e.g. an E ring, which performs the function of preventing dislodging of a spring seat 31 slidably mounted on each pin 25. Each pin 25 mounts thereon a compression spring 27 which is interposed between the spring seat 31 and a tongue 21b of the keep plate 21, so as to maintain the keep plate 21 and the support plate 30 in spaced juxtaposed relationship.

The keep plate 21 is formed with a receiver 28 for supporting the original 12 which is adapted to be inserted in a split 29 formed in the support plate 20. The provision of the receiver 28 is effective to prevent dislodging of the original 12 from the pressing plate means 18 even when the distance between the keep plate 21 and the support plate 20 is maximized when the pressing plate means 18 is supported by the carrier 19.

Referring to FIG. 9, support projections 32 are provided on opposite sides of the support plate 20 and adapted to be inserted in support recesses 33 formed in the carrier 19. Thus, the pressing plate means 18 is supported by the carrier 19 as the support projections 32 are inserted in the respective support recesses 33.

The carrier 19 for supporting the pressing plate means 18 is detachably attached to a base 35 of the moving device 30. In order to facilitate detaching of the carrier 19 from the base 35 of the moving device 30, apertures 36 are formed in the carrier 19, each consisting of a major diameter portion and a minor diameter portion contiguous with each other and receive therein screws 37 threaded into the base 35. By this arrangement, the carrier 19 can be attached to and detached from this base 35 by merely loosening the screws 37 without requiring to withdraw them.

As shown in FIG. 6 to FIG. 9, a rack 38 is either affixed to the base 35 of formed integrally therewith and adapted to engage a pinion 39 which is rotatably supported by a frame of the main body. The pinion 39 has a large axial length so that it may remain in meshing engagement with the rack 38 no matter where the latter is vertically disposed, because the base 35 moved not only leftwardly and rightwardly but also upwardly and downwardly. The pinion 39 is in meshing engagement with a gear 41 which is affixed to a shaft 40 rotatably supported by the frame of the main body, the gear 41 being rotated by turning a knob 42 affixed to the shaft 40. By turning the knob 42, it is possible to rotate the pinion 39, so that the base 35 and the carrier 19 supported by the base 35 can be made to move rightwardly and leftwardly to effect moving of the original 12 in an X-direction.

The base 35 is slidably supported by a support 44 disposed at the lower end of a base plate 43. The base 35 is formed with a guide groove 45 which receives a guide pin 46 attached to the support 44. Thus, the distance of movement of the base 35 is restricted as the guide pin 46 is brought into abutting engagement with opposite ends of the guide groove 45. Keep rollers 47 are rotatably mounted on the base plate 43 so as to avoid tilting of the base 35 due to play.

The base plate 43, for supporting the base 35, is formed near one side portion thereof with guide pieces 48 in which moves a guide bar 49 affixed to a fixed frame 63, thereby guiding the base plate 43 in its up-and-down movement relative to the fixed frame 63 or the frame of the main body.

Attached to the other side portion of the base plate 43 is a sleeve 51 which is formed with an aperture 52 receiving therein an engaging pin 50 attached to the base plate 43. The sleeve 51 is guided slidably by a helicoid 54. The inner end of engaging pin 50 is maintained in engagement with a groove portion of the helicoid 54 rotatably supported by the fixed frame 63. The sleeve 51 has mounted thereon a bush 53 for facilitating the movement thereof with respect to the helicoid 54. Upon rotation of the helicoid 54, the engaging pin 50 moves upwardly or downwardly, thereby moving the base plate 43 upwardly or downwardly. A pulley 55 is attached to one end portion of the helicoid 54. Another pulley 57 is attached to a shaft 56 rotatably supported by the frame of the main body. A belt 58 is trained over the two pulleys 55 and 57. A knob 59 is attached to the shaft 56. By turning the knob 59, it is possible to cause the helicoid 54 to rotate through the pulleys 57, 55 and the belt 58, thereby moving upwardly and downwardly the base plate 43 and the base 35 as well as the pressing plate means 18 supported by the base plate 43. Thus, the original 12 can be made to move in a Y-direction.

The base plate 43 has attached thereto stopper pins 60 which limit the movement of the original in the X-direction. A stopper projection 19a formed in the carrier 19 is brought into abutting engagement with the stopper pins 60, thereby limiting the movement of the original 12 in the X-direction. If several types of carriers 19 are prepared and stored in reserve to be ready for handling aperture cards, microfiches, or jackets which differ from one another in size and the amount of movement thereof in the X-direction, it is possible to limit the movement of the original within a suitable range. In replacing a carrier 19 of the standard size by a carrier of any specific size suitable for a desired original, the standard carrier is detached from the base 35 by loosening the screws 37 and a carrier for the specific size is attached to the base 35 by fastening the screws 37 and then a pressing plate means 18 of a size suitable for the desired original is mounted for operation. All the carriers are similar in construction to the standard carrier 19 except for the moving distance. No trouble occurs in interchangeably using different carriers.

Each carrier 19 is formed with a stopper 62 for limiting the movement thereof in the Y-direction. When the stopper 62 is brought into abutting engagement with a lower edge of a projection 63a of the fixed frame 63, the movement of the carrier 19 is limited.

As shown in FIG. 8, the keep plate 21, when it is mounted on the carrier 19, is caused, by a pressing means 67, to press against the suppport plate 20, the pressing means 67 being attached to a lamp housing 66 enclosing the light source of the condenser device 2 and other parts. The pressing means 67 comprises a bracket 68 attached by step bolts 66a to the lamp housing 66 for movement toward the support plate 20, and a pressure releasing lever 70 pivotally connected to the lamp housing 66 by a pin 69. Four pressure applying pins 71 extend through a support plate 68a of the bracket 68 and the lamp housing 66 to press against the pressure plate 24. When the carrier 19 is moved, the pressure plate 24 and the pressure applying pins 71 move in sliding movment relative to one another, so that the ends of the pins 71 which press against the pressure plate 24 are of a shape such that they do not damage the pressure plate 24.

Springs 72 are mounted between the support plate 68a of the bracket 68 and the lamp housing 66 so that the bracket 68 may be urged at all times by the biasing forces of the springs to move toward the pressure plate 24. When urged by the biasing forces of the spring 72, the bracket 68 urges, together with the pressure release lever 70 pivotally connected to the bracket at its middle point by a pin 70a, the pressure applying pins 71 to move toward the pressure plate 24. Thus, the pressure plate 24 is pressed against the pressure plate 23 and the pressure plate 23 is pressed against the projection 63a of the fixed frame 63, so that the original is held therebetween.

In replacing the original 12 by a new one, the top of the pressure releasing lever 70 is pulled toward the lamp housing 66. The result of this is that the bracket 68 moves horizontally toward the lamp housing 66 against the biasing forces of spring 72. This releases the pressure which has been applied to the pressure applying pins 71, so that the keep plate 21 is moved by the biasing force of spring 27 away from the support plate 20 a distance sufficiently large to insert or remove the original. If the pressure applied to the pressure releasing lever 70 is released, the keep plate 21 is again urged by the biasing forces of springs 72 to press against the support plate 20.

FIG. 10 to FIG. 13 show modifications of the pressing plate means. The modifications are constructed such that the degree of parallelism between a film surface of an aperture card or the like and a projecting surface of a projection lens can be readily adjusted.

Referring to FIG. 10 to FIG. 13, a carrier 519 is arranged substantially parallel to the projection surface of the projection lens 11 affixed to a turret plate 73 (See FIG. 3 to FIG. 5). The carrier 519 is formed with threaded portions at opposite sides thereof which are disposed on a horizontal line passing through the optical axis of the lens 11. Stepped screws 519a are threadably connected to the threaded portions. A stepped portion 519b of each stepped screw 519a is fitted in an aperture in one of bent portions 520a formed at opposite sides of a first support plate 520. Thus the first support plate 520 is pivotal about a horizontal axis or a center axis connecting the axes of the stepped screws 519a disposed at the opposite sides of the first support plate 520.

The first support plate 520 is formed at its upper and lower end portions with bent portions 520b each formed with a threaded aperture for threadably receiving therein a second stepped screws 519c, and a second support plate 620, juxtaposed against the first support plate 520, has upper and lower end portions 620a each formed with an aperture for fitting a stepped portion 519d of a second stepped screw 519c. The upper and lower second stepped screws 519c are positioned such that their axes are substantially normal to the axes of the stepped screws 519a and the optical axis of the projection lens 11. The second support plate 620 is supported by the first support plate 520 such that the former is pivotal about a vertical axis, or the about a line interconnecting the axes of the second stepped screws 519c. The second support plate 620 has affixed thereto, through a fixed frame 620b, the pressure plate 23.

From the foregoing, it will be understood that the first support plate 520 and second support plate 620 are movable relative to the carrier 519. This enables the pressure plate 23 to freely pivot about two axes which are normal to each other relative to the carrier 519. Thus, it is possible to freely effect adjustments of the degree of parallelism of the pressure plate 23 and the projection surface of the projection lens 11.

The pressure plate 24, adapted to press a film surface of an aperture card against the pressure plate 23, is arranged for movement toward and away from the pressure plate 23 and for applying pressure thereto. Like the pressure plate 24 of the embodiment shown in FIG. 8, the pressure plate 24 is affixed to a keep plate 521. The second support plate 620 and the keep plate 521 are connected to each other in the same manner as the corresponding parts of the embodiments shown in FIG. 9. The carrier 519 is affixed to a base plate in manner like the carrier 19 and can move in the X-direction and the Y-direction.

In effecting adjustments of the degree of parallelism, adjustable screws 619 threaded into the carrier 519 in four positions, are moved to adjust the length of the screws threaded into the carrier 519. The four adjustable screws 619 are arranged such that one or two screws are disposed in upper and lower portions of the carrier 519 on opposite sides of the line connecting the axes of the stepped screws 519a and one or two screws are disposed in right and left side portions of the carrier 519 on opposite sides of the line connecting the axes of the second stepped screws 519c. The adjustable screws 619 press at their forward ends against the second support plate 620 in accordance with the length thereof which is threadably inserted into the carrier 519. If there is a difference in the length of the screws threaded into the carrier 519 between the screw 619 disposed in the upper and lower portions of the carrier 519, then the first support plate 520 is pivoted about the line connecting the axes of the stepped screws 519a; if there is a difference in the length of the screws threaded into the carrier 519 between the screws 619 disposes in the right and left side portions of the carrier 519, then the second support plate 620 is pivoted about the line connecting the axes of the second stepped scress 519c. The pressure plate 23 can be pivoted about two axes disposed normal to each other, so that it can be tilted in a complex manner. It will be appreciated that, by adjusting the four adjustable screws 619, it is possible to effect fine adjustments of the degree of parallelism between the pressure plate 23 and the projection surface of the projection lens 11.

Figure 13:
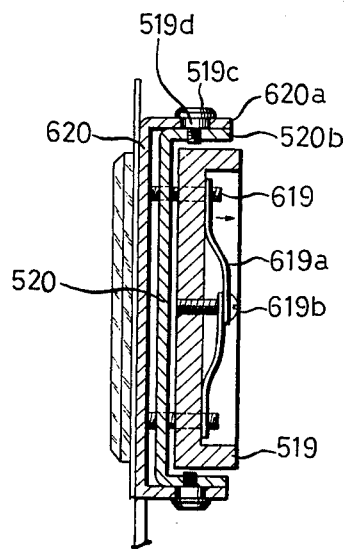
FIG. 13 is a sectional view taken along the line XIII—XIII of FIG. 10.

Referring to FIG. 13, a plate spring 619a engages at opposite ends thereof the threaded portions of the upper and lower adjustable screws 619, and a lock screw 619b extends into an aperture formed in the plate spring 619 in a position corresponding to the middle of the distance between the two adjustable screws 619. The lock screw 619b, extending into an aperture formed in the plate spring 619a, is threaded into the carrier 519. By threadably inserting the lock screw 619b deeper into the carrier 519, the central portion of the plate spring 619a, which later has a length greater than the distance between the upper and lower adjustable screws 619, is pressed to cause the opposite end portions of the plate spring 619a to push the adjustable springs 619a outwardly by the resilient deformation of the plate spring 619a as indicated by an arrow. This phenomenon is utilized to fix the adjustable screws 619 in position by preventing their rotation. A frictional force of a large magnitude is produced between the adjustable screws 619 and the threaded portions of the carrier 519 by the outwardly oriented pressing force so as to positively lock the adjustable screws 619 and prevent their dislodging.

The embodiment described above enables effecting fine adjustments of the degree of parallelism by adjusting the length of the screws threadably inserted into the carrier 519, and it is simple in construction.

If the knobs 42 and 59 (FIG. 7) are turned to effect moving of the original 12, held by the pressing plate means 18, to move the same in the X-direction and Y-direction, a desired portion of the original can be brought to the projecting position. Thus it is possible to read the content of the original through the image of the original projected onto the screen 15. In reading the image, focusing of the image is effected and sometimes the magnification of the image is varied.

The image of the original 12 is enlarged by the projection lens 11 when projected onto the screen. The projection lens shown in FIG. 3 to FIG. 5 may have any magnification as desired, e.g. 10x, 15x, 20x and the like. Generally, two or three projection lenses 11 of different magnifications are arranged on the circumference of a circle on the turret plate 73. Counterweights 74 are arranged on the turret plate 73 in positions which are symmetrical with the positions of the lenses 11 with respect to the center of rotation of the turret plate 73, so that the turret plate 73 can be balanced. The turret plate 73 is affixed to a sleeve 114 slidably supported by a shaft 75 rotatably supported by the fixed frame 63.

Referring to FIGS. 3 and 4, a gear 76 is affixed to the turret plate 73 and maintained in meshing engagement with a segmental gear 78 rotatably supported by a shaft 77 removably connected to the fixed frame 63. Formed at that end portion of the segmental gear 78 which is opposite to its serrated portion is a formed end portion 79 which is engaged by a roller 81 mounted on a lever 80 supported by the frame of the main body for reciprocating motion. The lever 80 is formed with a slot 82 which is adapted to be guided by a guide pin 83 attached to the frame of the main body for restricting the reciprocating movement of the lever 80. Mounted substantially in the middle portion of the lever 80 is a roller 84 which is in engagement with a forked portion at one end of a changing lever 86 which is pivotally supported by the frame of the main body through a pin 87 (See FIG. 5). Attached to the other end of the changing lever 86 is a knob 88 (See FIG. 5) which can be moved to any position as desired along a scale of magnifications attached to the frame of the main body. If the knob 88 is moved, the changing lever 86 pivots about the pin 87 and causes the segmental gear 78 to pivot pivotal motion through the linear motion of the lever 80, thereby rotating the turret plate 73.

The turret plate 73 is discal in shape and formed at its edge with notches 89, which correspond in number to the lenses 11 of different magnifications, for holding the lenses in position. A stopper roller 90 is adapted to engage in each notch 89 for holding the turret plate 73 in a desired position. The stopper roller 90 is rotatably supported through a pin 93 by a lever 92 pivotally supported by a pin 91. Formed at an end portion of the lever 92 in the vicinity of the roller 90 is a spring seat 94 which is provided with a seat pin 95 for preventing the dislodging of a spring 97 which is mounted between the spring seat 94 and a pin 96 attached to the frame of the main body. The spring 97 urges, by its biasing force, the roller 90 in pressing engagement with the edge of the turret plate 73 or one of the notches 89.

The pin 91 supporting the lever 92 can have its position adjusted by means of a support lever 98 attached to the fixed frame 63, so that the pin 91 can be held in any position as desired.

By turning the knob 88, the turret plate 73 can be rotated and the roller 90 can be brought out of engagement in one of the notches 89. If the knob 88 is stopped as the lens 11 of the desired magnification reaches the projection position, the roller 90 is brought into engagement with the associated notch 89, thereby positioning the turret plate 73 and preventing its inadvertent rotation.

On the other hand, focusing of the image is adjusted by means of a focusing adjusting knob 64 (FIG. 4) attached to a shaft 65 rotatably supported by the frame of the main body. The focusing adjusting knob 64 has attached thereto an eccentric cam 99 which is in engagement with a roller 100 functioning as a cam follower. The roller 100 is rotatably supported at one end of a lever 102 pivotally supported by the frame of the main body through a pin 101. Rotatably supported at the other end of the support lever 102 is a roller 103 which is positioned against a lug 106 of a lever 104 supported by a pin 105 for pivotal movement about a substantially vertical axis. The lever 104 is formed with a wire attaching aperture 107 (FIG. 3) which is disposed at an end portion of the lever 104 which is opposite to the lug 106 with respect to the center of its pivotal movement. Secured to the wire attaching aperture 107 is one end of a wire 108 which is secured at the other end to an attaching aperture 112 of a lever 109 (See FIG. 5). The wire 108 is guided to change its direction by a guide roller 110 rotatably attached to the frame of the main body. The lever 109 (See FIG. 5) is pivotally supported by a pin 111 removably attached to the fixed frame 63 and mounts at the other end thereof a roller 113 which is maintained in engagement with a ring-shaped groove 115 formed in sleeve 114 to which the turret plate 73 and the gear 76 are attached.

If the focusing adjusting knob 64 is turned, then the lever 104 is pivoted and causes the lever 109 to pivot through the wire 108. This moves the projection lenses 11 together with the turret plate 73 axially, thereby effecting focusing adjustments. The turret plate 73 is urged, by the biasing force of a spring 75$b$ mounted between the sleeve 114 and a spring seat 75$a$ affixed to the shaft 75, to move toward the lamp housing 66 to prevent loosening of the wire 108. In order to avoid inadvertent displacement of the turret plate 73 after focusing is adjusted by the force of the wire 108, a braking force of a magnitude sufficiently high to overcome the biasing force of the spring 75$b$ is applied beforehand. Such braking force may be applied by means of a simple construction using a friction plate which is urged by the biasing force of a spring to press against one side of the knob 64.

The fixed frame 63, which supports the guide bar 49, the helicoid 54 and the shaft 75 (See FIG. 5 and FIG. 7), is constructed as a unit, and removably fixed to the frame of the main body. If several fixed frames carring lenses of several magnifications are prepared, it is possible for one fixed frame to be easily replaced by the desired fixed frame.

In case the magnifications of the projection lenses are 10$x$ and 15$x$, then it is not necessary to move the condenser lenses. However, if a projection lens of a magnification of 20$x$ is additionally provided, irregularities in the intensity of illumination may occur. To avoid this, the position of the first condenser lens 6 is adjustable. To this end, a lens adjusting lever 116 (See FIG. 5) is attached to the changing lever 86 and detached when no lens of 20$x$ magnification is used. An adjusting pin 117 is attached to the top of the lens adjusting lever 116.

The first condenser lens 6 is supported by a support member 118 affixed to two guide bars 119 and 120 which are slidably supported by the lamp housing 66 affixed to the frame of the main body. A spring 122 is mounted between the support member 118 and the lamp housing 66 and normally urges the support member 118 and the guide bars 119 and 120 to move leftwardly in FIG. 3. A stopper 121 attached to the guide bar 120 is brought into abutting engagement with the lamp housing 66 so as to keep the first condenser lens 6 in a predetermined position.

If the knob 88 is turned to move the changing lever 86 to a position in which a projection lens of 20$x$ magnification is disposed, then the adjusting pin 117 abuts against a pin 123 attached to the guide bar 120 and moves the guide bar 120 rightwardly in FIG. 4 against the biasing force of spring 122. This moves the first condenser lens 6 too. Upon the first condenser lens moving to a predetermined position, a stopper 125 has its projecting portion 125$a$ engaged in a groove 124 formed in the guide bar 120. By this arrangement, the movement of the first condenser lens 6 by the biasing force of spring 122 can be prevented even if the hand is removed from the knob 88. The stopper 125 is pivotally supported by the frame of the main body through a pin 126 and maintained at all times in the engaging position by the biasing force of a spring 127.

If the knob 88 is turned to rotate the turret plate 73 and switch the projection lens of one magnification to that of another magnification, then the head of the adjusting pin 117 gradually pushes and moves upwardly a release plate 128, formed integrally with the stopper 125 according to its inclination, so that the projecting portion 125a of the stopper 125 is pushed out of the engaging groove 124. This permits the spring 122 to return the guide bars 119 and 120 and the first condenser lens 6 to their normal positions.

In case it is required to effect copying of the image of the original projected onto the screen after the image is read following focusing adjustment, various parts of the copying system are rendered operative and then a printing button is depressed. This causes the first reflector 13 disposed in the reflecting position to pivot, so that its optical path can be switched to the copying system.

Depression of the printing button energizes a motor 130 shown in FIG. 14 and FIG. 15. The motor 130 has secured to its output shaft a worm 131 which is maintained in meshing engagement with a worm gear 132 affixed to a shaft 133 rotatably supported by the frame of the main body. The shaft 133 has secured thereto a gear 134 which is in meshing engagement with a gear 136 rotatably supported by a clutch shaft 135. The gear 136 is mounted on a follower plate 137a of an electromagnetic clutch 137. The clutch 137 is affixed to the clutch shaft 135, while the follower plate 137a is slidably and rotatably supported by the clutch shaft 135. The gear 134 may consist of a serrated portion formed in one axial portion of a cylindrical member, the depth of the gear teeth grooves becoming increasingly smaller in the boundary between the serrated portion and a non-serrated portion. When the power source switch of the reader-printer apparatus according to the invention is turned on, the electromagnetic clutch 137 is energized to pull the gear 136 together with the follower plate 137a, so that the teeth of the gear 136 are brought into engagement with the shallow portions of the grooves of the teeth and the backlash of the gear teeth can be prevented. This eliminates the noise which would otherwise be produced in the clutch shaft 135 due to the backlash of the gear teeth when the direction of rotation is reversed.

Secured to the clutch shaft 135 is a gear 138 which is in meshing engagement with a gear 139 rotatably supported by a mirror shaft 141 thrugh a bearing 140. Drive pins 143 are attached to the gear 139. A first reflector mounting plate 144 is attached at opposite ends thereof to cut surfaces 141a of mirror shafts 141 and 141' rotatably supported by the frame. The cut surfaces 141a of the shafts 141 and 141' are positioned such that, when the reflector 13 is mounted on the first reflector mounting plate 144, the reflecting surface of the reflector 13 passes through the center line of the mirror shaft 141. Plate springs 145 are provided on the first reflector mounting plate 144 and disposed on opposite sides of the mirror shaft 141 such that they are positioned to engage pins 143 attached to the gear 139. One end portion of each plate spring 145 is affixed to the first reflector mounting plate 144 by a fixing member 146 and carried thereby, while the other end portion thereof is held between the two drive pins 143 attached to the gear 139. Rotation of the motor 130 causes the gear 139 to rotate and thereby causes the drive pins 143, through the plate springs 145, to move the first reflector 13 about the mirror shaft 141.

Figure 16:
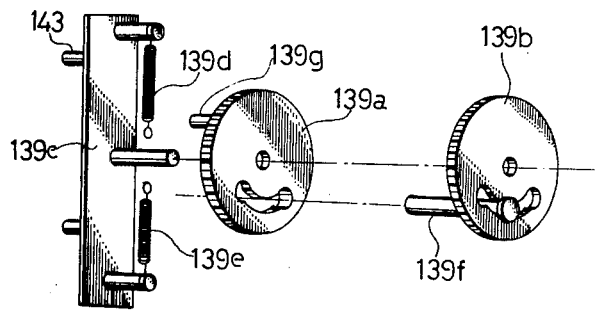
FIG. 16 shows one example of the construction of the gears for the mirror shaft.

In FIG. 16, the gear 139 can be divided into two gears 139a, 139b of identical shape, and a support plate 139c, having pins 143 affixed thereto and mounting springs 139d and 139e, is used in place of the gear 139.

Pins 139g and 139f engaging the springs 139d and 139e, respectively, are attached to the gears 139a and 139b respectively. By this arrangement, the two gears 139a and 139b are pulled in opposite directions and the backlash of the gear 138 meshing with the gears 139a and 139b can be corrected, thereby eliminating noise. The noise caused by the backlash of gears is not negligible because the first reflector mirror 13 is pivoted many times. The force is symmetrically exerted by the two mirrors on the two gears 139a and 139b, so that the effect of symmetry of the movement is not spoiled.

The first reflector 13 stops in its pivotal movement when stoppers 147, adjustably attached to the first reflector mounting plate 144, are brought into abutting engagement with a stopper surface of a block 148 formed on the frame of the main body. At least two stoppers are provided to define the original reading position and the original copying position. In order to maintain the reflector 13 in a properly inclined position, the stoppers 147 are preferably provided on opposite end portions of the first reflector mounting plate 144. In FIG. 14a, the block 148 has two levers 148a and 148b pivotally connected thereto by respective pins 148c and 148d. Forward ends of these levers can engage the stoppers 147, while the other ends thereof can be brought into engagement with limit switches 312a and 312b respectively. The forward ends of the levers 148a and 148b normally project slightly forwardly of the stopper surface 148 by the action of springs (not shown). Thus, as the stoppers 147 are brought into engagement with the forward ends of the levers 147a and 148b respectively, the rear ends of the levers are brought into engagement with the limit switches 312a and 312b respectively. Limit switches 312a or 312b are actuated to the open position to stop the motor 130 slightly before the reflector 13 is brought to a position in which it is designed to stop. When the motor 130 is stopped, the reflector 13 is stably maintained, by the resilience of the plate springs 145 produced by the over-run of the motor, in the position in which it has stopped. The gears are locked by the action of the worm 131 and prevented from rotating.

A weight 314 is attached through an arm 313 to the first reflector mounting plate 144 or mirror shaft 141. When the power source switch is opened, the clutch 137 is de-energized and the first reflector 13 is rendered free to move. The provision of the weight 314 enables the mirror surface of the reflector 13 to face downwardly when not in service, so that the mirror surface will not gather dust.

The mirror shaft 141 has attached thereto a friction brake 154 which functions to prevent the production of noise due to the backlash of the gears caused by the movement of the first reflector 13 brought about by the spring force accumulated by the overrun of the motor when the first reflector is moved in a reverse direction by the action of the motor 130. The friction brake 154 also functions to prevent damage to the first reflector 13 which would otherwise occur when the first reflector is suddenly rotated to impinge on the stoppers on the opposite side by the accumulated spring force as the first reflector 13 is rendered free to rotate as a result of opening of the power source switch and de-energization of the clutch 137. The friction brake 154 comprises a fixed plate 155 rotatably supported by the mirror shaft 141 and having a pin 155a adapted to engage the frame by which it is prevented from rotating, a friction plate 156 maintained in frictional engagement with the fixed plate 155 supported by the mirror shaft 141, a spring 157 adapted to urge the friction plate 156 to press against the fixed plate 155 through a keep plate 158, and an adjusting disc 162 fitted slidably and fixedly on the mirror shaft 141'. By adjusting of the fixed position of the disc 162, the biasing force of the spring 157 can be adjusted.

Affixed to the mirror shaft 141 is a gear 149 which is maintained in meshing engagement with a gear 168 affixed to a shaft 150 rotatably supported by the frame. The shaft 150 carries a lever 152 for opening and closing a blind 151. A wire pulley 153 is rotatably supported at one end portion of the lever 152.

The blind is secured at one end portion to and wound on a shaft 163 rotatably supported by the frame. The blind 151 has a free end portion which is affixied by a keep plate 159a to a mounting rod 159 supported at opposite ends by arms 160 rotatably supported by the shaft 150 and a shaft 150' coaxial therewith. Secured to one end portion of shaft 163 on which the light intercepting blind 151 is wound is a wire drum 164 to which a wire 161 is secured at one end thereof. The wire 161 is secured at the other end thereof to a pin 166 inserted in a slot 165 formed in the frame, the pin 166 being capable of having its position adjusted.

The blind 151 is tensioned and moved away from the frame by a spring 167 engaged at one end by the arm 160 supporting one end of the blind 151. The blind 151 is urged by spring 167 to move into a light intercepting position. When the blind 151 is in its light intercepting position, the wire 161 is wound on the wire drum 164 and is extended between the wire drum and a pin 166.

Upon rotation of the gear 168, the shaft 150 rotates and the lever 152 is pivoted. Since the gear 168 rotates as the first reflector 13 is pivoted, the lever 152 is pivoted in synchronism with the pivoting of the first reflector 13. When the first reflector 13 begins to pivot from a copying position, in which it reflects light rays to the exposing position of the copying system B, to a position for reading the original, the pulley 153 of the lever 152 is not brought into contact with the wire 161 till the first reflector 13 reaches a position in which it substantially intercepts light rays from the screen 15 and prevents them from being projected onto the exposing position of the copying system B. The wire pulley 153 of the lever 152 is brought into contact with the wire 161 extending between the wire drum 164 and the pin 166 about the time the first reflector 13 has moved to a position in which it prevents light rays from the screen 15 from reaching the exposing position. Thereafter, the wire 161 is pushed as the pivotal movement of the lever 152 progresses so as to gradually pay out the wire 161 from the wire drum 164. This causes the wire drum 164 to rotate, so that the blind is wound on the shaft 163. With the first reflector 13 in the position in which it allows the original to be read by the reader, the blind 151 is wound on the shaft 163.

If the printing is depressed to switch the apparatus from reading to copying, the motor 130 will be rotated in the reverse direction and cause the lever 152 to pivot, thereby gradually releasing the tension exerted by the pulley 153 on the wire 161. Release of the tension allows the arm 160 to be pulled by the force of the spring 167, so that the blind 151 is rapidly unwound and extends into a position in which it separates the screen 15 from the first reflector 13. This permits light rays from the projection lens 11 to be reflected and projected onto the exposing position of the copying system B. Lightrays coming from the screen 15 are fully intercepted by the blind 151, so that no unnecessary light is incident on the exposing position.

The copying system B will now be described.

The copying system comprises, as shown in FIG. 1, a copy sheet feed device 169, a charging device 190, a vacuum tank means 170, a developing device 245 and a drying-ejecting device 171. The copy sheet feed device 169 comprises a supply section having a support member 173 (FIG. 17) on which rolls 172 of webs of copy paper are supported.

Figure 17:
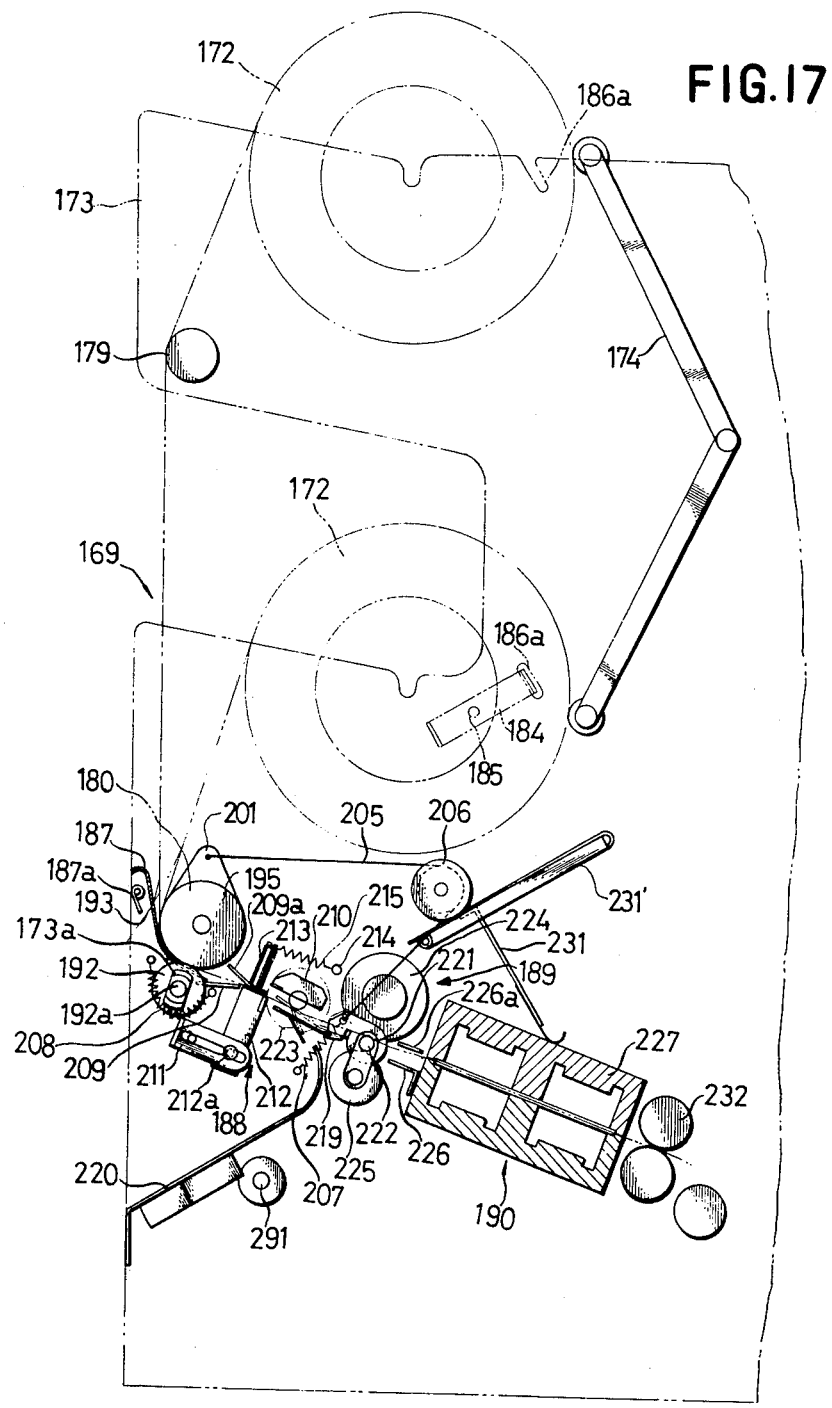
FIG. 17 is a front view of the copy sheet feed device.
Figure 18:
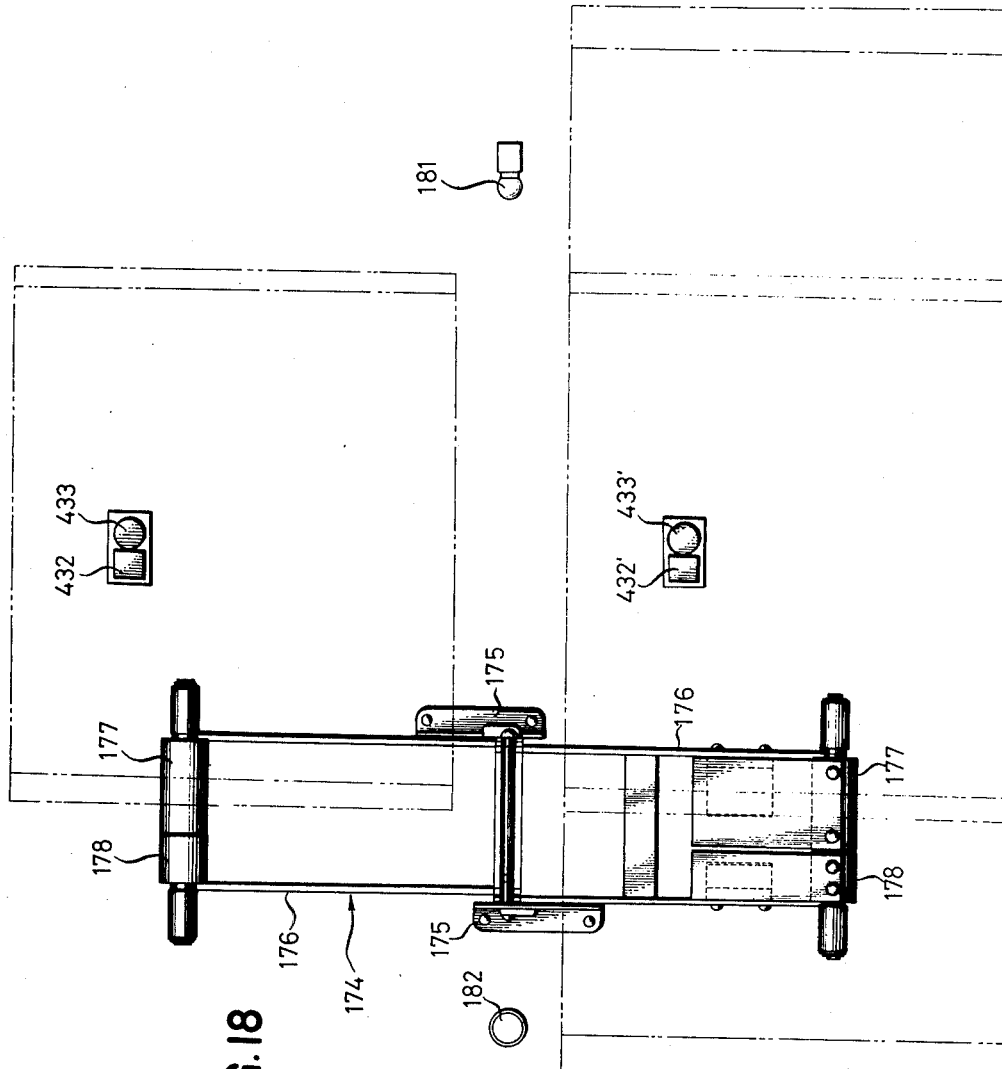
FIG. 18 is a front view of the sheet size distinguishing device and the upper and lower roll paper distinguishing device.

Referring to FIG. 17 and FIG. 18, the rolls 172 can be arranged in two stages or one above the other on the support member 173 in the supply section. Arranged in the supply section is a detector means 174 which is capable of detecting the presence or absence of paper and the width of the paper. As shown in FIG. 18, the detector means 174 comprises two support frames 176, for the upper and lower rolls of paper, pivotally supported by the frame of the main body through support brackets 175 arranged separately or connected by a common shaft, and a first actuator 177 and a second actuator 178 mounted on the support frames 176. The first and second actuators 177, 178 are arranged in side-by-side relation when mounted on the support frames 176. It is indicated on an indication panel that a roll of paper of smaller width is mounted when only the first actuator 177 is actuated. A mounted roll of paper of larger width is indicated when the two actuators 177, 178 are actuated.

Regardless of whether they are of smaller width or larger width, the rolls of paper 172 are mounted on the support member 173 in such a manner that the center line thereof is disposed in the same position. The support frames 176 of the detector means 174 are urged by a spring (not shown) to press against the rolls of paper. When no rolls of paper are mounted, the support frames 176 are maintained in predetermined positions by the spring under the influence of stoppers or the like. When neither of the actuators 177 and 178 is actuated, it is indicated on the indication board that no rolls of paper are mounted on the support member 173. The boundary between the two actuators 177 and 178 is determined in accordance with the width of paper of two types or more that are used. For example, when two types of paper, or paper of a width of 9 inches and paper of a width of 18 inches are used, the boundary between the two actuators 177 and 178 is disposed slightly outside the paper of 9 inch width (about 5 inches outside the center line of the paper).

If a roll of paper is mounted on the support member 173, an end portion of each roll of paper will push either the actuator 177 alone or both the actuators 177 and 178, depending on the width of the paper, and actuate the same. The support frames 176 are pressed by the roll of paper, in accordance with its radius, against the biasing force of the spring. Thus, the first actuator 177 alone, or both the first and second actuators 177 and 178, remain operative so long as rolls of paper are mounted on the support member 173.

Detection of the rolls of paper is carried out for the upper and lower rolls of paper, respectively.

When the upper roll of paper 172 and the lower roll of paper 172 are supported by the support member 173, a web of paper paid out of the upper roll is led to a feed roller 180 as guided by a guide bar 179 while a web of paper paid out of the lower roll is directly led to the feed roller 180.

Figure 19:
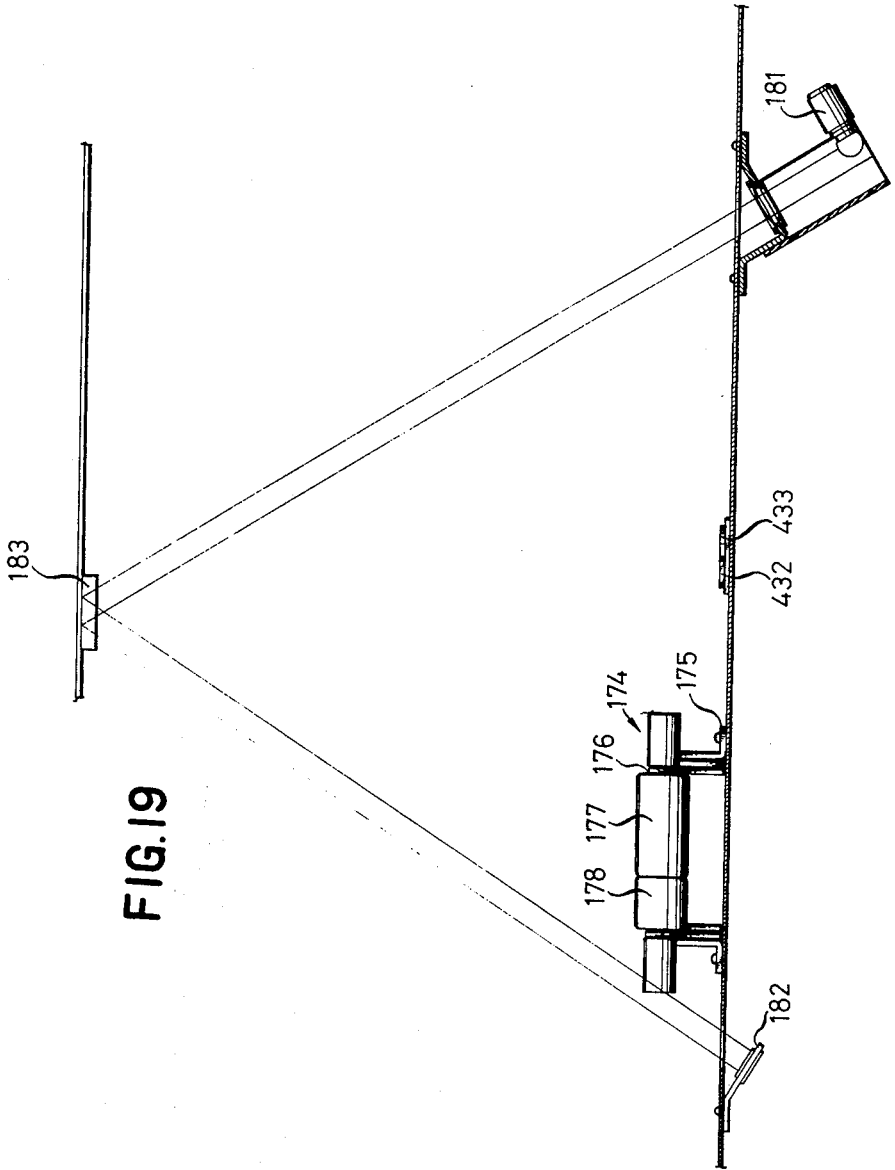
FIG. 19 is a plan view of the upper and lower roll paper distinguishing device.

An upper and lower rolls distinguishing device is provided to determine whether the upper roll of paper or the lower roll of paper is used for copying the original. The upper and lower rolls distinguishing device comprises, as shown in FIG. 18 and FIG. 19, a light emitting member 181, a light receiving member 182, e.g. a cadmiun sulfide meter, and a mirror 183 for reflecting light from the light emitting member 181 and projecting the same toward the light receiving member 182. The upper and lower rolls distinguishing device is arranged such that the light from the light emitting member 182 does not reach the light receiving member 182 whene the web of paper from the upper roll passes therethrough but the light from the light emitting member 181 reaches the light receiving member 182 when the web of paper from the lower roll passes therethrough. Light rays of some wavelengths may be transmitted through a web of copying paper and reach the light receiving member 182. Thus, a signal indicating the passage of the web of the upper roll through the distinguishing device is not generated unless the volume of light received by the light receiving member 182 exceeds a predetermined level.

If either one of the upper and lower rolls consists of a translucent paper, it is possible to distinguish between ordinary copying paper and the translucent paper merely by distinguishing between the upper and lower rolls. This eliminates the need to open the cover of the frame to find out what type of paper is in use during a copying operation. When one of the upper and lower rolls is in use, the other roll stands by. The loosening of the roll standing by can be avoided by the biasing force exerted thereon by the detection device 174.

The end of the roll of paper is detected, when all the paper has been used, by known means which optically detects the mark on the paper tube of the roll. Such known means comprises, as shown in FIG. 18, light emitting diodes 432, 432' and light receiving elements 433 and 433'.

Figure 20:
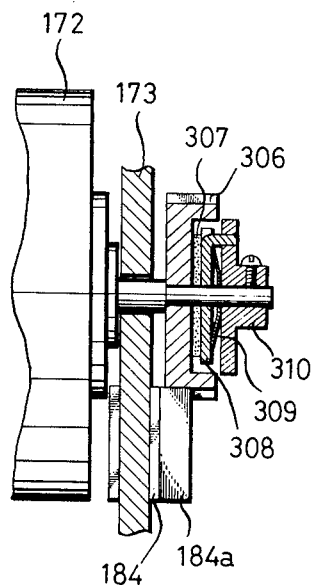
FIG. 20 is a vertical sectional view of the brake device for the roll of paper.
Figure 21:
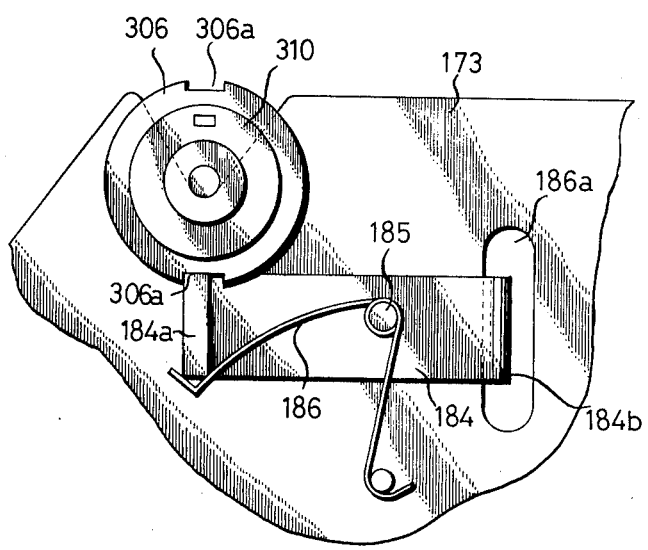
FIG. 21 is a right side view of the device shown in FIG. 20.

A brake device is provided to the support member 173 for each roll for preventing the loosening of the paper due to the inertia of the roll of paper. As shown in FIG. 17, FIG. 20 and FIG. 21, the brake device comprises a lever 184 pivotally supported through a pin 185 by the support member 173 and urged by the biasing force of a spring 186 to move in one direction. The lever 184 is formed at opposite ends thereof with bent portions 184a and 184b, the bent portion 184b being received in a slit 186a formed in the support member 173 and prevented thereby from moving downwardly. The bent portion 184a is adapted to engage a brake means attached to a spool shaft of the roll of paper 172. The brake means comprises a lock ring 306 rotatably mounted on the spool shaft, a friction plate 307, a claw seat 308, a spring 309 urging friction plate 307 against the lock ring 306, and a stop ring 310 which is locked by the claw of the claw seat 308 and is slidably but non-rotatably secured to the spool shaft. If the roll of paper 72 is mounted on the support member 173, the bent portion 184a of the lever 184 will be brought into engagement in a groove 306a formed in the lock ring 306, thereby preventing the lock ring 306 from rotating. Thus, the brake is applied to the roll of paper 172 at all times.

Each roll of paper in the supply section is supplied to the copy sheet feed device where it is charged and supplied to the vacuum tank means 170 which is an exposing section.

Referring to FIG. 17, the copy sheet feed device comprises a manually operated knife 187 for cutting off an irregular portion from the leading end portion of the web of paper paid out of the roll 172 in order to avoid jamming of the sheet passageway, the feed roller 180, cutting means 188 for cutting the web of paper into a sheet of a predetermined length, a sheet straightening means 189 and the charging device 190. The manually operated knife 187 serves as a guide plate.

The web of paper paid out of the roll 172 is led to the feed roller 180 by the manually operated knife 187 serving as a guide plate and moved forwardly as it passes between a pressure applying roller 192 and the feed roller 180. The leading end of the web of paper is irregular and may cause jamming of the sheet passageway, so that it is necessary to cut off the irregular leading end portion and render the leading end normal to the longitudinal axis. To this end, the leading end portion of the web of paper is led outwardly through a port 193 formed in the guide plate 187. A cutter 187a is provided at the exit port 193 so that the leading end portion to be cut off can be severed by means of the cutter 187a. After severing the irregular leading end portion of the web of paper, the web of paper is rreturned to its original position and the freshly formed straight leading end portion is inserted between the feed roller 180 and the pressure applying roller 192 while the feed roller 180 is rotated by operating a knob 195 (See FIG. 22).

Referring to FIG. 22, the knob 195 is affixed to a knob sleeve 198 which is rotatably supported by a sleeve 197 supported, through a one way clutch 196, at one end of a shaft of the feed roller 180 rotatably supported by the frame of the main body. The sleeve 197 is formed with a flange 197a and pivotally supports an arm 201 which is disposed, at one side thereof, adjacent a friction plate 200 which in turn is disposed adjacent the flange 197a. The arm 201 is disposed, at the other side thereof, adjacent another friction plate 200 which in turn is disposed adjacent a keep plate 203 which urges the arm 201 and the sleeve 197 in frictional engagement with each other a spring 204. The arm 201 has secured thereto one end of a wire 205 (FIG. 17) which is connected at the other end thereof to a third guide plate 219, and a spring 207 is connected at one end thereof with the third guide plate 219 and at the other end thereof to the frame. The wire 205 is guided at its intermediate portion by a pulley 206. Thus the arm 201 is pulled clockwise by spring 207. Upon the knob 195 being turned counter clockwise, the sleeve 197 is rotated by virtue of frictional engagement of the keep plate 203 with the arm 201 and the flange 197a. This causes the feed roller 180 to rotate through the one way clutch 196, thereby moving the web of paper forwardly. If the pressure applied to the knob 195 is released, then the arm 201 is restored to its original position by the biasing force of the spring 207.

Even if the knob 195 is turned in the reverse direction, rotation thereof is not transmitted to the feed roller 180 by virtue of the presence of the one way clutch 196. This means that, when the feed roller 180 is driven to rotate by a drive device subsequently to be described, no rotation is transmitted to the arm 201 and knob 195.

The pressure applying roller 192 is supported by a shaft 192a extending through a slot 173a formed in the frame 173 and urged into pressing engagement with the feed roller 180 by a spring 208.

The web of paper fed by the feed roller 180 is guided by second guide plates 209 and 209a to move to cutting means 188 which comprises a rotary cutter 210 rotatably supported by the frame, and a fixed cutter 212 which is supported for rotation by a fixed cutter bracket 211. The fixed cutter bracket 211 can have its position adjusted relative to the rotary cutter 210 and can be fixed to the frame. The fixed cutter 212 has attached thereto a pin 213 which is tensioned by a spring 215 relative to a pin 214 attached to the frame. Thus the fixed cutter 212 is urged to press against the rotary cutter 210 by the spring 215. The relative positions of the cutting edges of the rotary cutter 210 and fixed cutter 212 are set such that, as the rotary cutter 210 rotates, the point of contact between the cutting edges of the rotary cutter 210 and the fixed cutter 212, or the cutting point, gradually moves widthwise of the web of paper. Simultaneously as the cutting point moves widthwise of the web of paper, the cutting point moves in the direction of movement of the web of paper in synchronism therewith. As the cutting edge of the rotary cutter 210 moves in the direction of movement of the web of paper with the progress of the rotation of the rotary cutter 210, the fixed cutter 212 also moves together with the rotary cutter 210 because the former moves about a fulcrum 212a relative to the fixed cutter bracket 211 because the fixed cutter 212 is pressed against the rotary cutter 210 by the spring 215.

The rotary cutter 210 is supported by a shaft which is connected, through a rotary solenoid 216, to a shaft 218 which supports a manual cutting lever 217 (FIG. 22).

Referring to FIG. 17 again, the web of paper is led through a third guide plate 219 to the sheet straightening means 189. In order to prevent jamming of the paper passageway, the leading end of the web of paper is slightly cut off manually. The third guide plate 219 can have its position adjusted so as to enable the severed portion of the web of paper to be ejected along a severed end ejecting guide 220.

More specifically, the third guide plate 219 is supported by a support 221 which is rotatably supported by a bearing portion of a sheet straightening center roller 222 and attached to the end of the wire 205. If the knob 195 is turned to effect manual cutting, the front end of the third guide plate 219 is moved upwardly to a dash-and-dot line position in FIG. 17. the web of paper fed by the feed roller 180 and the pressure applying roller 192 passes by the front end of the third guide plate 219 after the latter has moved to the dash-and-dot line position because the one way clutch 196 is idling. Thus the web of paper is led by an auxiliary guide 223 toward the exit. The web of paper disposed in this position can be cut by operating the manual cutting lever 217 to cause the rotary cutter 210 to rotate. The severed end is ejected along the ejection guide 220.

If the knob 195 and manual cutting lever 217 are released, the third guide plate 219 and rotary cutter 210 are restored to their respective stand-by positions.

The sheet straightening means comprises an upper roller 224 made of rubber, a center roller 222 and a lower roller 225 made of metal. The upper roll 224 is supported by the frame for rotation in one direction only through one way clutches, while the center roller 222 and lower roller 225 are each rotatably supported by a bearing slidably attached to the frame. By virtue of the action of the one way clutches, the web can be freely withdrawn when it catches against the rollers. The lower roller 225 applies pressure to the center roller 222 so that the latter may move deeply into the upper roller 224 to remove the tendency of the web supplied by the third guide plate 219 to buckle because of its being wound in roller form in the supply section. The web thus straightened is introduced to the charging device 190 by fourth guide plates 226 and 226a.

Referring to FIG. 17 again, the charging device 190 consists of two sets of corona discharge chargers in which the tungsten wires arranged on opposite sides of the path of movement of copy sheets are of opposite polarities in order that a duplicate in positive form may be produced from both an original in positive form and an original in negative form.

Figure 23:
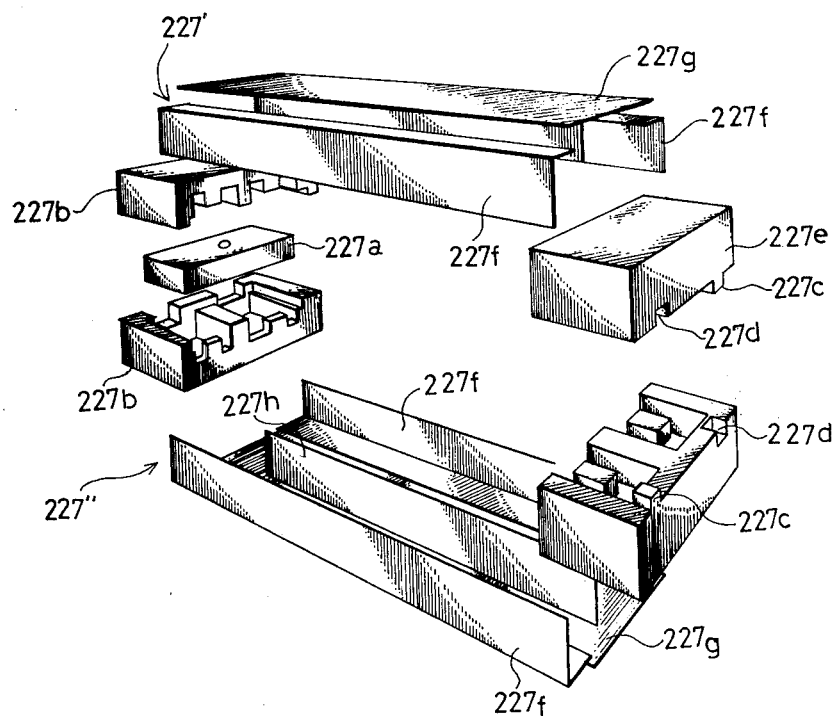
FIG. 23 is a perspective view of the charger casing.

Referring to FIG. 17 and FIG. 22, the charging device 190 comprises a casing 227 which is divided into two sections because of two chargers in each of which a tungsten wire is trained. The tungsten wires 228 are tensioned by springs 229 to prevent their loosening Nylon threads 230 are provided on portions of the upper and lower casing sections, and are brought into engagement with a copy sheet so as to enable the sheet to be spaced apart a suitable distance from the tungsten wires while being conveyed through the charger. The tungsten wires 228 are connected to electrodes. The two chargers are set such that they have opposite polarities. That is, the charger consists of a first charger in which the upper electrode has a negative polarity and the lower electrode has a positive polarity, and a second charger in which the upper electrode has a positive polarity and the lower electrode has a negative polarity, the two chargers being arranged in side-by-side relation. The two chargers can be made integrally as shown in FIG. 23.

Proposals have been made to vary the charging conditions by varying the charging polarities, by changing the diameter of the wire or the spacing between the wires and by changing the shape of the casing. It would be possible to switch the polarities of a voltage between the terminals. However, switching of polarities of a high voltage raises a safety problem with respect to electric insulation, difficult to solve within the safety standards of the parts. The present invention has succeeded in varying the charging conditions over a wide range by using two chargers of opposite polarities arranged in side-by-side relation. The invention eliminates the need to use a high voltage change-over switch, and enables setting conditions by effecting switching of the primary side taps.

When a copy sheet of 9 inches width is charged by using a corona charger adapted for copy sheets of 18 inches width, a corona discharge takes place directly between the upper and lower tungsten wires in portions where there is no sheet and consequently a current of higher value flows there than in a portion where there is a sheet. Thus, a current I of higher value flows from the voltage generator than when a sheet of 18 inches width is charged. That is, the current required will be $I_9$ inches $> I_{18}$ inches. The result of this is that the voltage of the high voltage generator is lowered, so that if the high voltage generator is adjusted to provide an optimum voltage for sheets of 18 inches width, the voltage charged on the sheets of 9 inches will be lower than that on the sheets of 18 inches. In order to avoid this disadvantage, the output of the high voltage generator is increased when sheets of 9 inches width are charged. To this end, input taps of the primary side of the high voltage generator are switched so as to bring the secondary output to an optimum charging voltage level at all times.

The charger casing 227 has a upper casing 227' and a lower casing 227''. Each casing 227' and 227'' has a plug socket attached to one end portion 227b thereof which has, as shown in FIG. 23, a recessed construction adapted to receive an intermediate insulating plate 227a. By affixing the end portion 227b relative to the intermediate insulating plate 227a, it is possible to position the two members relative to each other and fix the same in position. The other end portion 227e of each casing is shaped such that it has a projection 227c and a groove 227d. The projection 227c of the one casing and the groove 227d of the other casing are opposite to one another so that the projections are slidably received in the grooves.

The two opposite end portions 227b and 227e are affixed to ade plates 227f. A partition plate 227h is attached to a cover plate or bottom plate 227g detachably attached to the two opposite end portions 227b and 227e. By removing the cover plate or bottom plate 227g, it is possible to readily clean the tungsten wire and other parts.

A cover 231' having attached thereto a charger biasing lever 231, (FIG. 17) for urging the upper casing 227' to the lower casing 227'', is provided on the frame. By removing the cover 231', it is possible to readily effect inspection of the charging device 190 from outside.

The sheet charged by the charging device 190 is delivered to the vacuum tank means 170 by a pair of delivery rollers 232.

Figure 24:
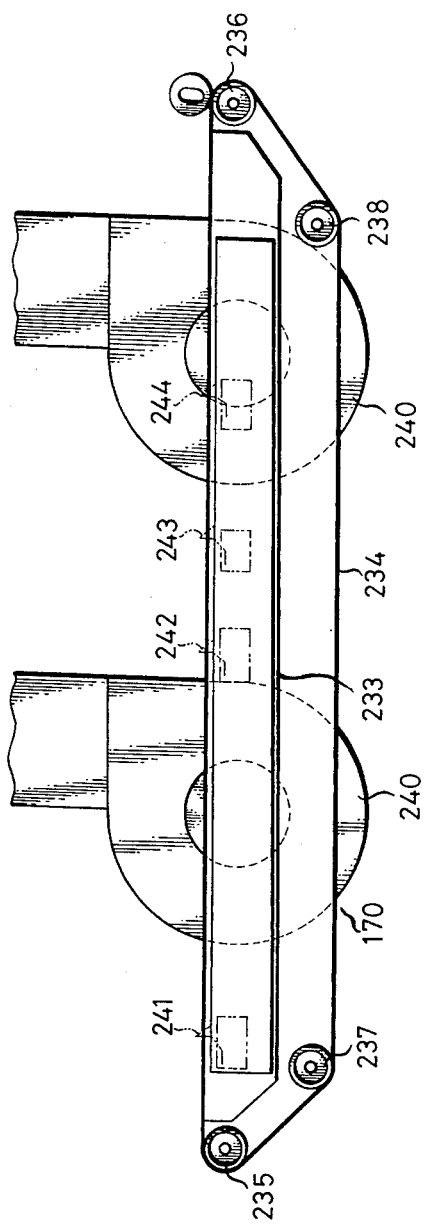
FIG. 24 is a front view of the vacuum tank.
Figure 25:
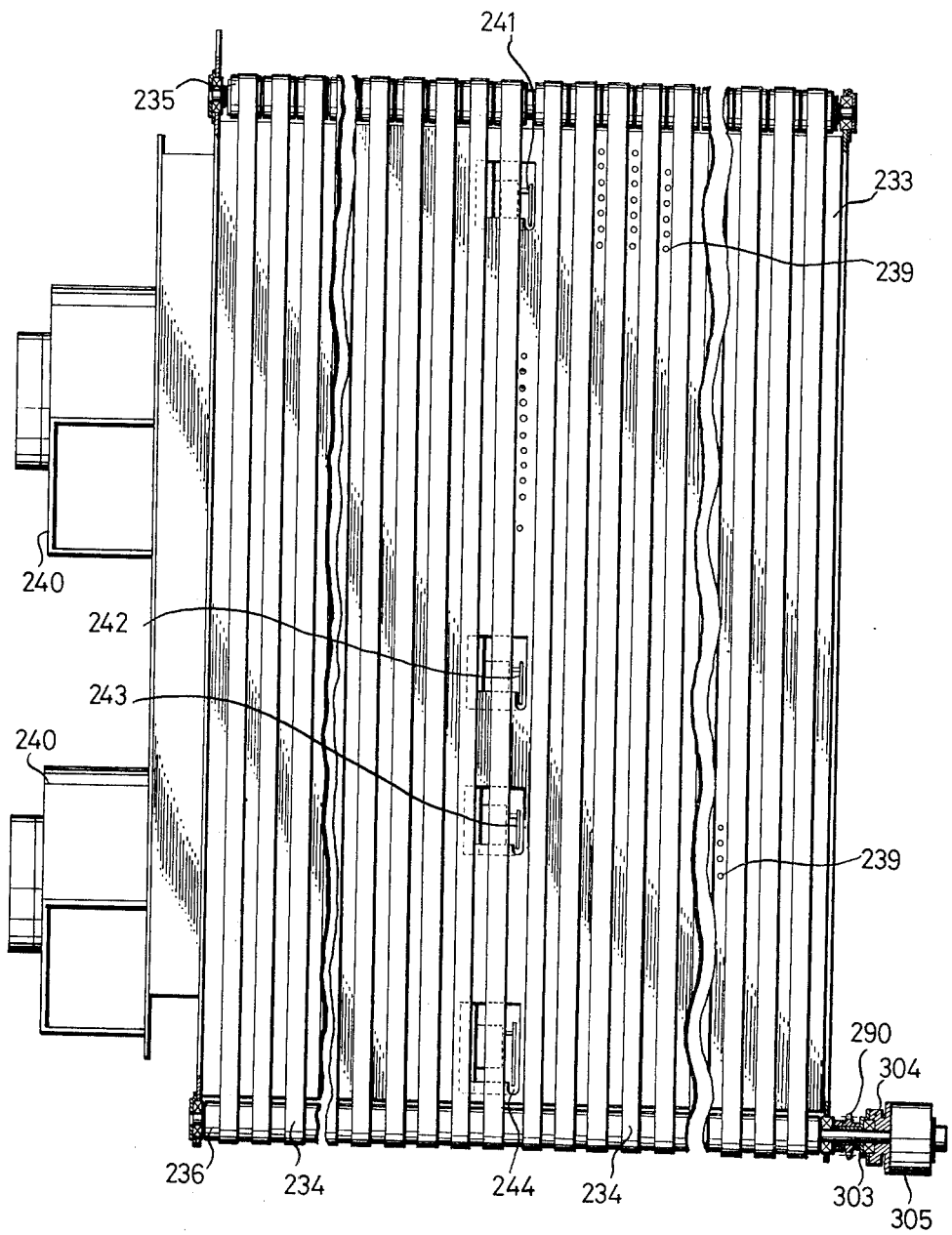
FIG. 25 is a plan view of the vacuum tank shown in FIG. 24.

Referring to FIG. 24 and FIG. 25, the vacuum tank means 170 comprises a vacuum tank 233, and a large number of endless belts 234 trained about the vacuum tank 233. The belts 234 are guided by belt rollers 235 and 236 disposed on the entrance side and the exit side respectively of the vacuum tank 233 so that the belts 234 may move while being maintained in substantially sliding contact with an upper surface of the tank 233. The lower run of each belt 234 disposed below the tank 233 is guided by guide rollers 237 and 238. The upper surface of the tank 233 is formed thereinn with a multitude of small apertures 239, while one side surface of the tank 233 is formed with openings which are maintained in communication with suction ports of two blowers 240. Upon actuation of the blowers 240, the air is evacuated from the interior of the vacuum tank 233 and a vacuum is produced therein. Thus air is drawn by suction into the tank 233 through the small apertures 239. When the copy sheet is moved on the upper surfacee of the vacuum tank 233 by the endless belts 234, the copy sheet is brought into intimate contact with the belts 234 by virture of the vacuum applied thereto through the small apertures 239, so that the copy sheet is conveyed without moving relative to the belts 234.

Limit switches 241 and 242 are arranged on the vacuum tank 233 for supplying signals to the solenoid 216 (FIG. 22) to energize the same to actuate the rotary cutter 210 of the cutting means 188. The limit switches 241 and 242 are arranged such that they can handle sheets of two different lengths. The limit switches 241 and 242 are arranged such, and their electric circuits are formed such, that when a copy sheet required is of a length which is one half that of a 18inches size sheet and while the width is that of 18 inches size, for example, the solenoid is energized when the limit switch 241 is pushed by the leading end of the paper, and when a copy sheet required is of a full length of a standard 18 inches size, for example the solenoid 216 is energized when the limit switch 242 is pushed by the leading end of the paper.

Additional limit switches are provided for copy sheets of different sizes so that, when the central portion of a copy sheet cut off from the web of paper and having a predetermined size moves into a position which is substantially in the middle portion of the vacuum tank 233 and which is in alignment with the optical axis of the projection-optical system A, the leading end of the copy sheet actuates one of the additional limit switches to stop the movement of the belts 234 so that the copy sheet may become stationary. Such additional limit switches may include, for example, a limit switch 243 for a copy sheet of the half size in length and a limit switch 244 for a copy sheet of standard size.

When a copy sheet remains stationary in a predetermined position on the vacuum tank 233, the copy sheet is exposed to an optical image of the original as light rays of the original are projected. After lapse of a predetermined time interval required for exposing, the belts 234 are driven again so as to convey the exposed copy sheet to the developing device 245.

If a single blower is used for producing a vacuum in the vacuum tank means 170, the blower should have a large capacity. This involves a long time interval requried for the blower to reach a rated number of revolutions when the blower is started and produces a noise. To eliminate these disadvantages, two blowers of a small capacity are used by arranging them in parallel. This is conducive to reduced noise and less time required for the blowers to go into full action.

Figure 26:
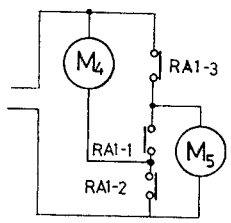
FIG. 26 is a connection diagram for the blowers for the vacuum tank.

Referring to FIG. 26, respective motors M4 and M5 for the two blowers 240 are connected such that they can be switched between series connection and parallel connection. If the switch for the main power source is turned on, the two motors M4 and M5 are connected in series with each other by a break contact of a relay RA-1-1. The result of this is that one half the rated voltage is applied to each motor, so that the motors rotate at low rates and a low suction force is exerted on the vacuum tank 233 at all times.

When the printing button is depressed and the supply of copy sheets is initiated in performing a copying operation, the relay RA-1-1 is de-actuated and the motors M4 and M5 are connected in parallel with each other by make contacts of relays RA-1-3 and RA-1-2. This causes a rated voltage to be impressed on the two motors M4 and M5, so that the motors each rotate at a rated speed. The motors are merely switched between high speed rotation and low speed rotation by this connection arrangement. This eliminates a delay of the motors reaching the rated number of revolutions and enables the vacuum tank 233 to efficiently exert a suction force on the copy sheet. The blowers of the small type are normally rotated at low speeds, so that noise is minimized and the operator reading an image of an original on the screen is not bothered by the noise of the blowers when no copying is performed.

Figure 27:
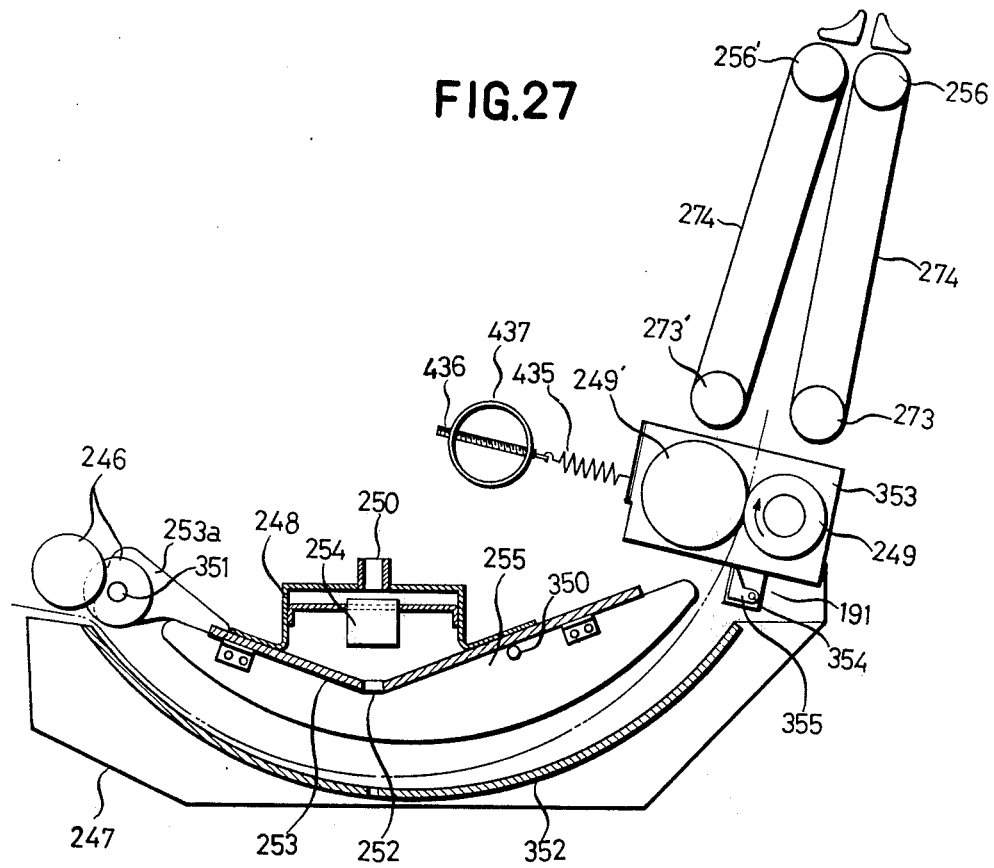
FIG. 27 is a front view of the developing device.
Figure 28:
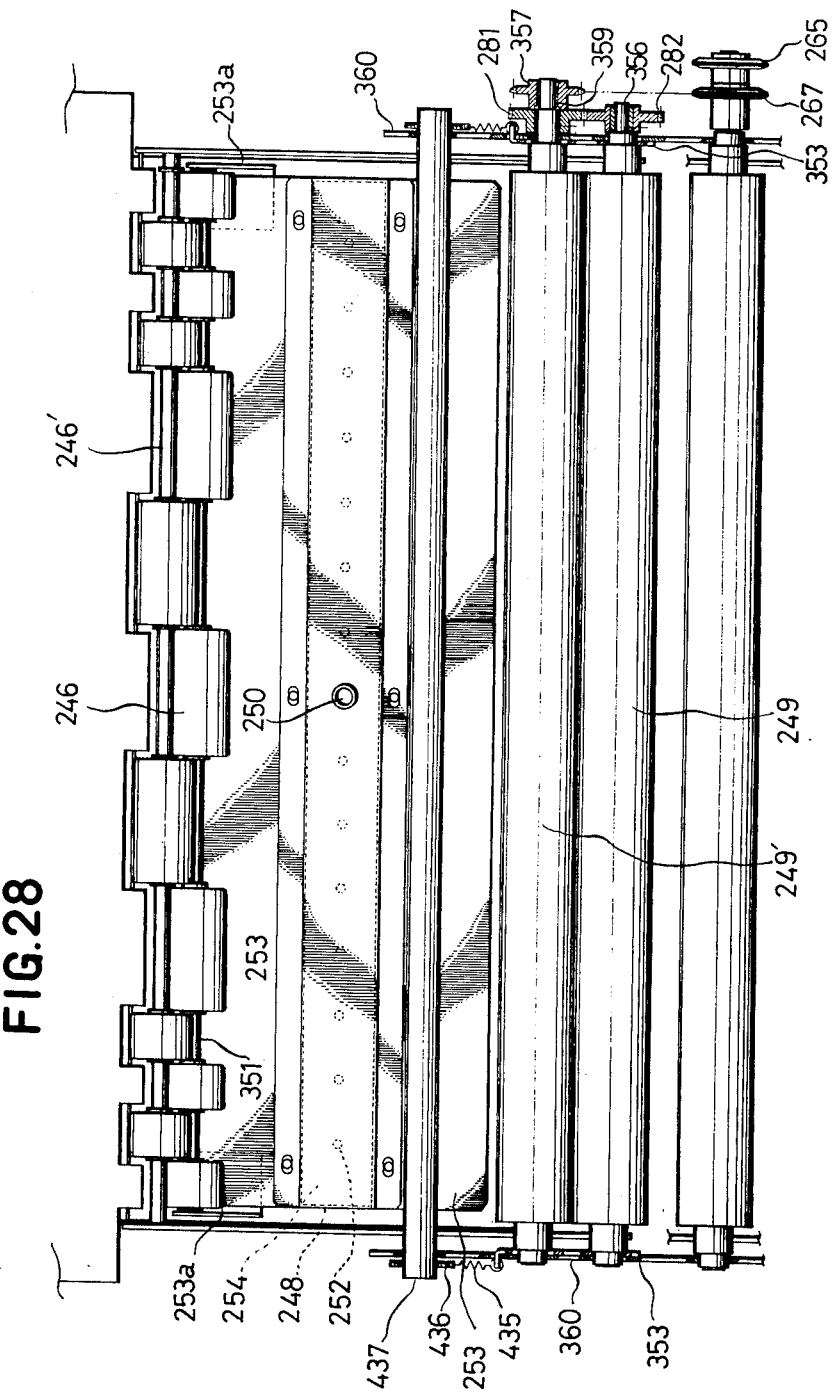
FIG. 28 is a plan view of the developing device shown in FIG. 27.

Referring to FIG. 27 and FIG. 28, the developing device 245 comprises a developing liquid tank 247, a developing liquid supply member 248 tiltably mounted on the tank 247, feed rollers 246 arranged on two fixed shafts 246' in staggered relation for rotation and a pair of squeeze rollers 249 and 249'.

As shown in FIG. 28, the developing liquid supply member 248 is in the form of a trough formed with an inlet port 250 substantially at its central portion. The developing liquid supply member 248 has attached thereto a bottom plate 253 which has a lowest central portion as seen in the direction of movement of a copy sheet and two inclined surfaces at the front and rear thereof. The bottom plate 253 is formed at its central lowest portion with outlet ports 252 which are spaced apart from one another a predetermined distance widthwise of copy sheets. The developing liquid supply member 248 also has attached thereto an angle guide plate 254 which has a greatest height in a portion thereof disposed immediately below the inlet port 250 and which gradually becomes lower symmetrically widthwise of a copy sheet. The developing liquid introduced through the inlet port 250 flows down along the entire opposite inclined side portions of the guide plate 254 onto the bottom plate 253, and at the same time flows downwardly from the top of the angle guide plate 254 to opposite end portions of the liquid supply member 248 in the widthwise direction of a copy sheet. This permits the developing liquid to be distributed evenly over a wide range. Since the developing liquid is distributed widthwise of a copy sheet by the guide plate 254, the developing liquid may be deficient in quantity in the neighborhood of the inlet port 250. To obviate this disadvantage, the developing liquid supplied by a pump impinges on the guide plate 254 and is splashed to the neighborhood of the inlet port 250, thereby enabling elimination of irregularities in the supply of the developing liquid to the surface of a copy sheet.

The bottom plate 253 of the developing liquid supply member 248 has attached thereto keep upper plates 255 which are spaced apart a suitable distance from one another widthwise of a copy sheet to enable the copy sheet introduced into the developing tank 247 to move smoothly. The bottom plate 253 normally abuts against stopper pins 350. However, lugs 253a provided on opposite ends of a feed roller 246, for the bottom plate 253, are rotatably supported by a fixed shaft 351, so that the bottom plate can be lifted upwardly. This facilitates cleaning of the guide plate and withdrawing of a copy sheet which has jammed the sheet passageway.

An exposed copy sheet is developed as it passes between the keep upper plates 255 and a guide member arranged in the tank 247. The developed copy sheet is guided by a guide 191 and positively introduced into the pair of squeeze rollers 249 and 249'. The guide 191 comprises two side plates 353 for supporting the squeeze rollers 249 and 249', an aligning shaft 354 affixed to the side plates 353, and a number of aligning plates 355 attached to the aligning shaft 354. The aligning plates 355 are spaced apart from one another a suitable distance widthwise of the copy sheet. Springs 435 are mounted between the side plates 353 and a pin 436 adjustably screwed in a shaft 437 supported by side supporting plates 360. The side plates 353 are tensioned by the springs 435. The spacing between the aligning plates 355 and the squeeze roller 249 is minimized. By this arrangement, it is possible to eliminate the possibilities of the copy sheet not being bitten by the squeeze rollers in a well-timed operation which might occur when the developing device is of a reverse developing type using a wet developing agent. Moreover, since the underside of the developed copy sheet is guided, no influences are exerted on the developed image.

The squeeze roller 249' is a metal roller having a surface coat of Teflon to insulate the roller. The other squeeze roller 249 is a roller made of rubber. A bearing 356, a drive sprocket 357 and a gear 281 are mounted on a sleeve 359 affixed to the squeeze roller 249'. The sleeve 359 is made of an insulating material. Thus the squeeze rollers 249 and 249' are insulated. The squeeze rollers 249 and 249' press against each other with a strong force to squeeze the developing liquid out of the developed copy sheet, thereby completing a developing operation.

The copy sheet developed by the developing device is delivered from the squeeze rollers 249 and 249' to two wire belts 274 each trained about one of a pair of sets of conveyor rollers 273, 273' and 256, 256' as shown in FIG. 29. The developed copy sheet is dried to fix the image by four sets of blotter rollers 257, 257a and ejected onto a copy sheet receiving tray 258 disposed outside the main body. A stream of air is blown against the copy sheet by a blower 274a while it is on the wire belts 274, so that the copy sheet is dried while its underside is pressed against the wire belts. The squeeze rollers 249, 249' and the conveyor rollers 273, 256 are supported by the side support plates 360. The side support plates 360 are pivotally supported by a second intermediate shaft 311.

The copy sheet conveyed by the wire belts 274 toward the blotter rollers 257, 257a is fed out through pairs of drying guide plates 362. The drying guide plates 362 havve slots for adjusting the space between two plates 362 of each pairs, so that the copy sheet can be guided reasonably by the nylon wire belts 274. Through the slots of the drying guide plates 362, the air stream from a blower 301 can flow, so that the drying effect of the blower 361 can be increased.

Figure 31:
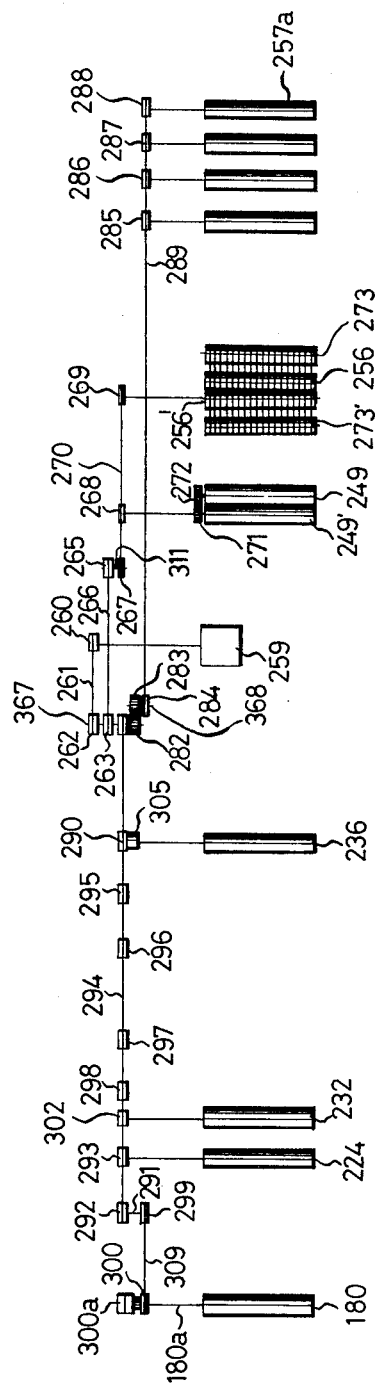
FIG. 31 is a schematic plan view of the drive system.

The rollers and belts from the copy sheet feed step to the copy sheet ejecting step are driven in synchronism with one another. The drive system for them will be described with reference to FIG. 30 and FIG. 31. also supports a sprocket 25 which is A drive motor 259 has attached to its output shaft a sprocket 260 which is connected by a chain 261 to another sprocket 262 supported by a first intermediate shaft 367 which also supports thereon a sprocket 263, for driving the developing device and the device that follows the same, and a sprocket 264 for driving the devices up to the vacuum tank means. The sprocket 263 is connected by a chain 266 to a sprocket 265 supported by a second intermediate shaft 311 which is connected by a chain 270 to a sprocket 268 supported by one of the shafts supporting the squeeze rollers 249', and a sprocket 269 supported by one of the shafts supporting the conveyor rollers 256'. The two shafts supporting the squeeze rollers 249 and 249' are interconnected through gears 271 and 272.

Gear 271 is driven through a one-way clutch so that it may rotate in one direction only whereby unsteady feed of the copy sheet, which may occur because of the rubber squeeze roller, is prevented.

The conveyor roller 256 is contacted with the conveyor roller 256' and is frictionally driven by the conveyor roller 256'. The conveyor rollers 273 and 273' are driven by the conveyor rollers 256 and 256', respectively, through wire conveyor 274.

Besides the sprockets 262, 263 and 264, gear 282 is also supported by the intermediate shaft 367 and maintained in meshing engagement with a gear 283 supported by a third intermediate shaft 268 which supports another sprocket 284 which is connected by a chain 289 to sprockets 285, 286, 287 and 288 which are each mounted on one of the blotter rollers 257a.

The sprocket 264 supported by the first intermediate shaft 367 is connected by a chain 294 to a sprocket 290 supported by the shaft of the belt roller 236 of the vacuum tank means 170, a sprocket 292 supported by an intermediate shaft 291, a sprocket 293 supported by the shaft 244a of the upper roller 244 of the web straightening rollers and a sprocket 302 supported by the shaft of the copy sheet delivery roller 232 after charging. The chain 294 is tensioned by means of a direction changing sprocket 295, idlers 296, 297, and a tension sprocket 298. Although not shown, the other chains are provided with respective tension sprockets so that all the chains may be maintained in a tensioned state.

The intermediate shaft 291 supports a sprocket 299 which is connected by a chain 309 to a sprocket 300 supported by a shaft 180a of the feed roller 180 of the copy sheet feed device.

The sprocket 290 supported by the shaft of the belt roller 236 is affixed to a sleeve 303 rotatably supported by the shaft of the belt roller 236 as shown in FIG. 25. The sleeve 303 is affixed to a clutch plate 304 rotatably supported by the shaft. The clutch plate 304 can be electromagnetically brought into and out of engagement with a solenoid clutch 305 affixed to the shaft.

The operation will now be described. The main switch is turned on to electrically connect the copying system to the power source. Then, the pressure releasing lever 70 of the pressure plate means 18 shown in FIG. 8 is pulled so as to insert the original 12 between the support plate 20 and the keep plate 21 to be placed in a position ready for the operation. When there are rolls of paper mounted in the copy sheet feed device, the paper detector means is actuated to produce a signal indicating the presence of the rolls of paper. An 18 inches indication lamp or a 9 inches indication lamp is turned on depending on whether the actuator 177 or 178 of the detection means 174, shown in FIG. 19, is rendered operative. When no roll of paper is mounted in the copy sheet feed device, a signal indicating the absence of a roll of paper is generated and a paper absence indication light is turned on.

The magnification is ascertained as the apparatus is set for operation as a reader. The focusing adjusting knob 64 is turned to bring the lens into focus. Then the knobs 42 and 59 are turned to move the original in the X-direction and Y-direction, and a predetermined portion of the original is projected onto the screen.

When the apparatus is used as a reader, the main switch is turned off upon completion of the reading operation. The original is removed from the pressure plate means 18 or replaced by a new one for performing a next following reading operation. If it is required to produce a copy of the original, the printer is set at necessary printing conditions. When the copying operation is performed, the presence or absence of paper is ascertained by a lamp $L_1$ on the operation panel shown in FIG. 32. With the paper being present in the sheet feed device, lamps $L_2$ and $L_2$, indicate whether the paper is of a desired width. If the paper is not of the desired width, switching between the webs of paper is effected.

A change-over lever $S_1$ is switched in accordance with whether the original is a negative or a positive. The change-over lever $S_1$ is actuated to switch between the two chargers of two opposite polarities to select a charger of a proper polarity.

A knob $S_2$ is turned rightwardly (ordinary paper) or leftwardly (translucent paper) depending on whether the sheet on which a duplicate is to be produced is ordinary paper or a translucent paper. At the same time, the length of the sheet is switched between a full size of 9 inches or 18 inches standard sheet and a half size of 9 inches or 18 inches standard sheet. By turning the knob $S_2$, it is possible to effect alteration of the voltage of the charger, the feed rate of the drive system and the exposure time. This operation is performed because it is necessary to bring the charging conditions, exposure time and developing conditions into conformity with the types and sizes of paper. By setting the density of duplicates at a desired level by means of a dial $S_3$, it is possible to produce duplicates of the same density irrespective of the quality and size of paper, so long as the original is of the standard density.

The density of the duplicates produced can be set at a desired level by changing the voltage of the lamp 4 by operating the dial $S_3$. In case the original is generally high in density and low in contrast, it may be impossible to produce duplicates of good quality by merely performing an ordinary density adjusting operation. If this is the case, an exposure change-over switch $S_4$ is additionally actuated. This enables prolonging the exposure time by actuating the dial $S_3$ as aforementioned.

After the appratus has been set at predetermined copying conditions as aforementioned, a dial $S_5$ is operated to set the printer to the desired number of duplicates and a the printing button $P_1$ is depressed. This intiates a copying cycle.

Depression of the printing button $P_1$ actuates the detector means 174. With the presence of a roll of paper, drive motor 259 and reflector operating mirror 130 are rendered operative, thereby causing the first reflector to begin to pivot movement. In case no rolls of paper are mounted in the supply section, the absence of paper is indicated by lamp L1 on the indication panel, and the first reflector 13 remains in the position for operation of the apparatus as a reader without pivoting Upon the first reflector beginning to pivot switch 312a for the light source 4 is turned off.

If the first reflector 13 pivots from the reading position, it stops at a copying position and the blind 151 is caused to be interposed between the screen 15 and first reflector 13 to intercept the light. The movement of the blind to the light intercepting position is completed before a copying sheet reaches a predetermined position on the exposing surface. Upon the reflector 13 reaching the copying position, switch 312b is actuated so that clutch 305 affixed to the shaft of the belt roller 236 and an electromagnetic clutch 300a (FIG. 31) connecting sprocket 300 of the feed roller 180 to the shaft of the feed roller 180 are energized. This renders the feed roller 180 and the conveyor roller 236 for the vacuum tank operative, so that the supply of the web of paper is initiated. Following the depression of the printing button $P_1$, the blower motors are changed to parallel connection and the force of suction is increased. A primary side switch for the chargers 190 is turned on.

The web of paper is charged by the charging device 190. Then, the respective limit switch 241 or 242 (See FIG. 24) which corresponds to the length of sheets selected by the knob S₂ is pushed by the leading end of the web of paper on the vacuum tank. This energizes the rotary solenoid 216 (See FIG. 22) and actuates the rotary cutter to cut the web of paper to provide a sheet of a predetermined length. After lapse of a predetermined time interval following the depression of the printing switch P₁, the electromagnetic clutch 300a (See FIGS. 22 and 31) for the shaft of the feed roller 180 is de-energized and the feed roller 180 becomes stationary. That is, when a sheet is severed, the movement of the web of paper is interrupted. The leading end of the severed sheet actuates either switch 243 or 244 stopping in accordance with the preselected size, with the result that the belt roller 236 becomes stationary. This results in the severed sheet stopping in the exposing position. The light source is turned on in timed relation to the movement of the sheet to the exposing position, so that the sheet is exposed to an optical image of the original for a predetermined time interval. Then clutch 305 is energized and the exposed sheet is conveyed to the developing device where the sheet is developed and dried before being ejected from the apparatus to the outside.

As soon as the first copy sheet is moved forwardly after being exposed to an optical image of the original, electromagnetic clutch 300a is energized to initiate the rotation of feed roller 180 to move the web of paper to cut off a second sheet and supply the same to the exposing position. The exposed sheet is developed and ejected as aforementioned. Copying of the original is repeated till the predetermined number of duplicates set by the dial S₅ is produced. Upon completion of exposing of the last sheet to an optical image of the original, the first reflector 13 pivots in the reverse direction in pivotal movement to the position in which the apparatus functions as a reader again.

The dial S₅ is constructed such that, once it is set at any number of duplicates to be made, the dial remains set at such number till the number of duplicates to be produced is varied. Thus it is possible to produce duplicates of the predetermined number for each of a plurality of originals consecutively. To this end, the dial is provided with a counter ring which is moved a distance corresponding to one tooth by the action of a solenoid as one copy sheet is exposed to an optical image of the original. After the counter ring has moved a distance corresponding to the predetermined number of sheets, the counter ring is rendered inoperative. Thus the operation of feeding a fresh supply of sheets for exposing them is terminated. Even after the supply of sheets is terminated, the last copy sheet exposed to an optical image of the original is developed and dried to have the image of the original fixed thereon before being ejected from the apparatus.

After the last copy sheet is ejected as aforementioned, it passes through an ejection detection switch 369. Upon the last copy sheet passing through the switch 369, a timer is actuated, so that the drive motor 259 stops rotating after lapse of a predetermined time interval. This finishes a printing cycle.

The ejection detection switch 369 is a switch having no contacts and consisting of a light emitting diode 364, a light receiving sensor 366 and a reflector 365 arranged as shown in FIG. 29 and FIG. 29a. A light intercepting plate 370 is arranged between the light emitting diode 364 and a plate mounting the light receiving sensor 366 thereon, thereby preventing the light emanating from the light emitting diode 364 from being directly incident on the light receiving sensor 366. The light emanating from the light emitting diode is reflected by the reflector 365 and then incident on the light receiving sensor 366 to actuate the latter.

A copy sheet (shown in dash-and-dot lines in FIG. 29a) passes between the light emitting diode 364 and light receiving sensor 366 on the one hand and the reflector 365 on the other. The copy sheet passing this point intercepts the light from the light emitting diode 364, thereby rendering the light receiving sensor 366 inoperative. Thus the presence of a copy sheet is detected. The light reflected by the surface of the copy sheet, shown in the form of broken lines in FIG. 29a, is irregularly reflected thereby, so that such light does not render the light receiving sensor operative even if it is incident thereon.

The detection switch 369 is characterized in that it functions satisfactorily even if the copy sheet is a translucent paper which is higher in transparency than ordinary paper. Being higher in transparency, the translucent paper allows a larger volume of light to pass therethrough and reach the reflector 365 than the volume of light reflected by its surface. However, the light reflected by the reflector and reaching the light receiving sensor is reflected irregularly when the light passes through the translucent paper twice, so that the light incident on the light receiving sensor is unable to render the latter operative. It will be appreciated that the detection switch 369 can perform satisfactorily even if the copy sheet handled is high in transparency. The detector switch 369, including reflector 365 attached to a bracket 365 of a guide plate 362, is attached to the opposing drying guide plate 362.

In case a larger number of duplicates are produced continuously by the apparatus according to the invention, a second copy sheet severed from the web of paper is fed to the exposing position while a first copy sheet will also get stuck in the sheet passageway. Herefast in the developing device and the jamming is not detected, the copy sheets that follow the first copy sheet will also got stuck in the sheet passageway. Heretofore, it has been the practice to use one jamming detection circuit for detecting jamming of the sheet passageway from the sheet feed device to the developing device. When this system is used, only one sheet can be made to pass through the sheet passageway between the sheet feed device and the developing device. That is, when a plurality of sheets is made to pass one after another through the passageway, trouble is experienced because detection of jamming cannot be effected for each sheet.

According to the invention, the copy sheet feed device and the developing device have individual respective jamming detection circuits.

In the path of movement of copy sheets shown schematically in FIG. 1, a jamming detection switch is rendered operative upon depression of the printing button P₁ on the panel shown in FIG. 32 to turn on the switch P₁. Either limit switch 241 or 242 (See FIG. 24) is actuated to energize the rotary solenoid 216 to actuate the rotary cutter 210 to cut a sheet from the web. Then, a switch is actuated to reset the jamming detection timer. If the jamming detection timer is not reset within a predetermined time interval, then a jamming indication lamp L₃ shown in FIG. 32 is turned on, thereby stopping the conveying of the sheet. When a large number of duplicates is made, detection of jamming is effected likewise for each sheet that follows the first sheet. The feeding of the following sheet is initiated upon completion of exposing of the preceding sheet. The jamming detection timer is rendered operative simultaneously as the feeding of the sheet is initiated.

Upon completion of exposing of one sheet, a jamming detection timer for the developing device is actuated. The jamming detection timer for the developing device is reset upon a sheet ejection detection switch 369 disposed in the sheet ejection device being reset. When jamming occurs in the developing device, the jamming detection timer for the developing device generates a signal after lapse of a predetermined time to turn on the jamming indication lamp $L_3$ to stop the feeding of paper.

Referring to the circuit diagrams shown in FIGS. 44 to 47, the operation of the apparatus will be described below.

Power On

Figure 45:
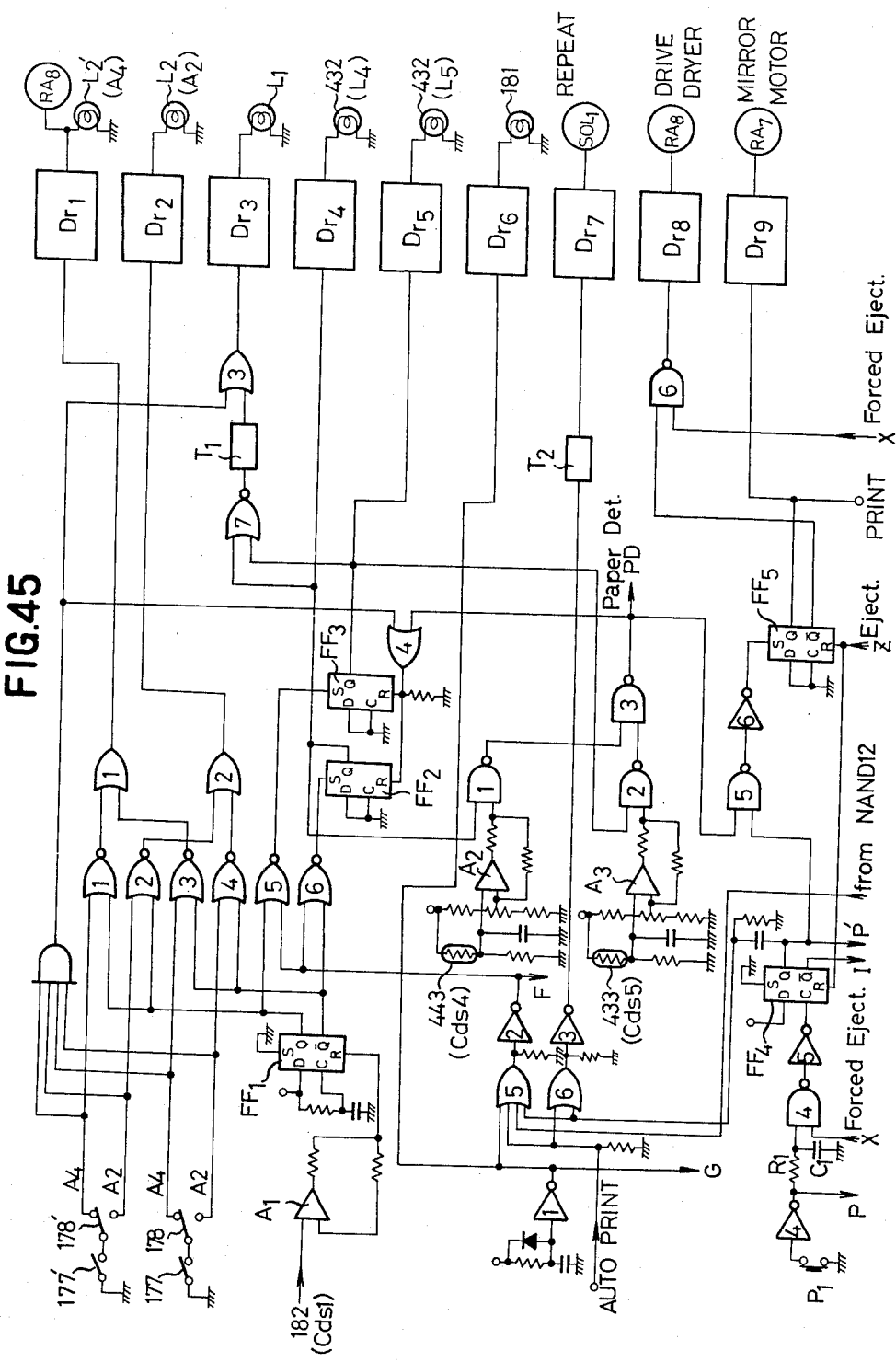
FIGS. 45, 46 and 47 are control circuit diagrams for the copying system.

When the main switch $S_0$ is turned on, the pump motor $M_1$, fan motor $M_2$ are operated at their rated levels, while the blower motors $M_4$, $M_5$ are operated at a low speed. In FIG. 45, a pulse of H level occurs at the output of the inverter $INV_1$ and this pulse momentarily illuminates the light emitting member 181 of the upper and lower roll distinguishing device for the pulse duration through the driver $Dr_6$. Assuming that the upper paper roll (ordinary paper) of 18 inch size is loaded in place, the light from the light emitting member is not received by light receiving member ($CdS_1$) 182 since the light is intercepted by the paper. Hence, flip-flop $FF_1$ remains at the set state that has been established at the moment of power on. Thus, an output will appear at the output of $NOR_4$ which has been selected by the operation of actuators 177, 178, and 18 inch size indicator lamp $L_2$ will be illuminated through $OR_2$ and driver $Dr_2$. On the other hand, one input to $NOR_6$ assumes an L level which is transmitted thereto through $OR_5$ and $INV_2$, thus setting $FF_2$. This is applied through driver $Dr_4$ to illuminate lamp ($L_4$) 432 which indicates the detection of the trailing end of the upper paper roll. This results in a reduction in the resistance of the associated roll end detector ($CdS_4$) 433, producing a paper detection signal PD through comparator A2 and $NAND_1$ to thereby reset $FF_2$, whereby the lamp 432 is deenergized. In this operation, timer $T_1$ is triggered when the output of $NOR_7$ is changed to L level by an excitation of the set input of $FF_2$. If the output of $NOR_7$ is not changed again to H level during the time timer $T_1$ is active, namely, the duration of the pulse produced at the $NOR_7$ is longer than that of the timer, the output of the timer $T_1$ can be changed to H level at the moment of the end of its duration, so that "no paper" indicator lamp $L_1$ may be lighted. Normally, the set state duration of $FF_2$ is smaller than that of the timer $T_1$ so that the excitation of the $OR_3$ may be not established. At the same time of power on, $FF_8$ is also in the set state. Q output of $FF_8$ excites a driver $Dr_{13}$ which energizes relays $RA_7$ and $RA_9$ through a logic circuit (not shown), driving the motor associated with the mirror 13 in the wind up direction. When the mirror 13 rotates to the end position, the switch 312a is operated, and is thrown to the position shown in solid line in FIG. 44, whereby the projection lamp 4 is illuminated. At the same time as the switch 312a (FIG. 46) is closed, $FF_8$ is reset through $OR_7$, whereby $RA_7$ and $RA_9$ are deenergized, stopping the rotation of the reflecting mirror. The motor 130 associated with the reflecting mirror is also stopped. A reading of the original 12 is performed under this condition, and when a copying operation is desired, the following copying conditions must be established;

Establishing the Copying Conditions

The switch $S_1$ (FIG. 47) is operated to change D input to $FF_{12}$ to either H or L level, thus selecting either negative or positive copying operation. When a print signal P' appears in the open circuit condition of the switch $S_1$, $FF_{12}$ is set, whereby relay $RA_6$ is energized through the driver $Dr_{17}$, and its contact 6-1 changes the charge polarity of the charger 190 shown in FIG. 44.

D inputs to $FF_6$ and $FF_7$ are also changed by means of an ordinary paper/translucent paper change-over switch $S_2$ (FIG. 46) and full/half size change-over switch $S_{2'}$. Depending on whether or not $FF_6$ and $FF_7$ are set by the print signal P' (FIG. 45), the duration of the exposure timing timer $T_5$ (FIG. 46) is controlled. At this time, $FF_6$ excites $NAND_{7,14}$ or $NAND_{8,13}$, whereby the half cut size positon and the half stop position are selected. When $FF_7$ is in the state of set, $FF_7$ excites $Dr_{12}$ which drives $RA_5$, whereby the drive motor $M_8$ is so controlled through the contacts 5-1, 5-4, etc. that the feeding speed may be changed, while the change of high voltage is for the better charging operation. Furthermore, $FF_7$ serves to change the duration of the timer $T_{10}$ and $T_{11}$ in FIG. 47. The jamming detection mismatched for the real feeding speed is avoidable by the changing of the states of timers $T_{10}$ and $T_{11}$.

Figure 46:
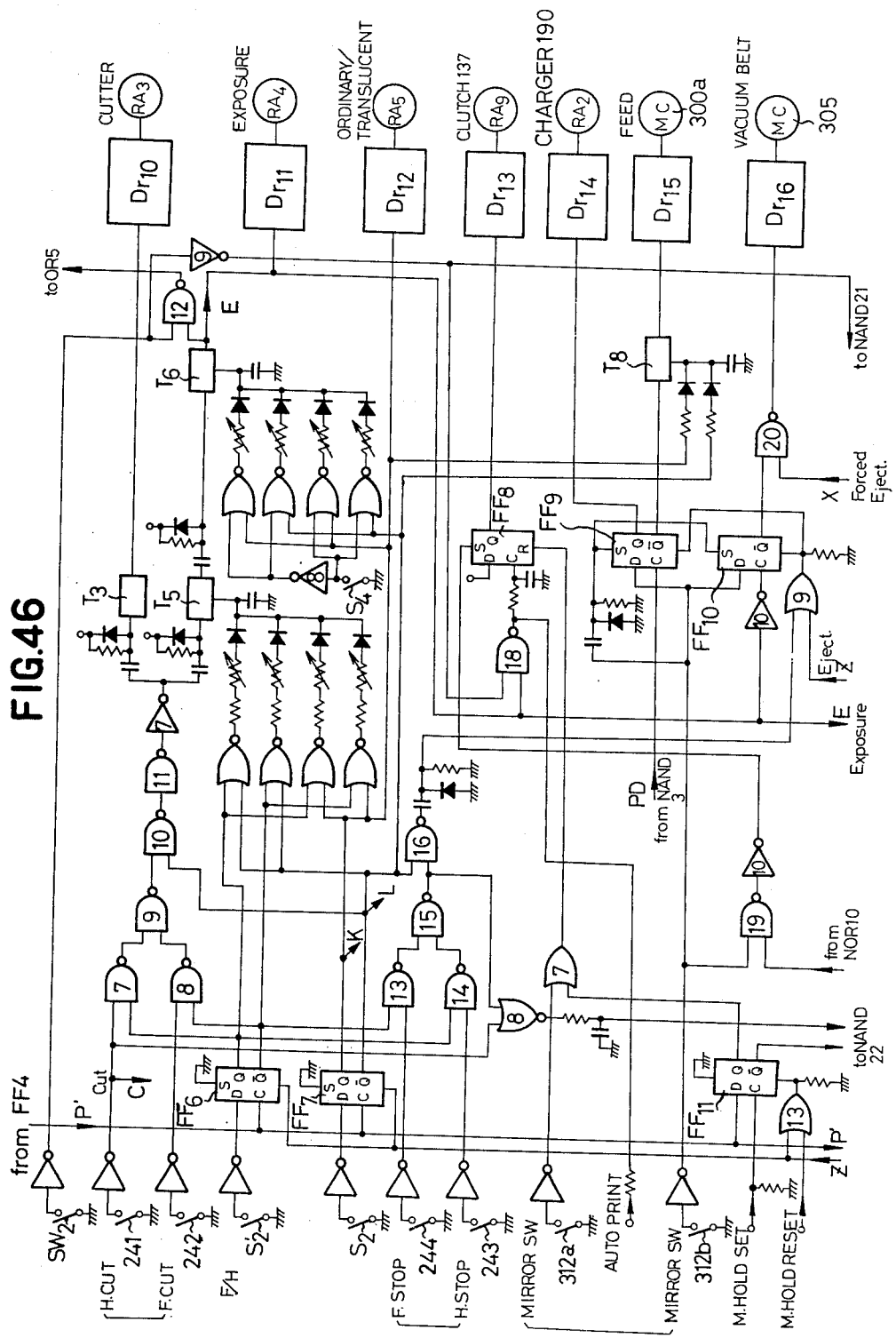

The exposure quantity can be regulated by adjusting the variable resister VR (FIG. 44) or alternatively by changing the duration of the exposure timer $T_6$ by means of the change-over switch $S_4$ (FIG. 46).

Turning On of Print Button

When the print button $P_1$ (FIG. 45) is depressed, $FF_4$ is turned to the set state and a print signal P' is produced, which sets $FF_6$, $FF_7$ and $FF_{12}$ which have been previously selected according to the copying conditions, as well as $FF_5$. Timer 2 is also triggered through $OR_6$ and $INV_3$, whereby the repeat solenoid $SOL_1$ is energized. Thus, when the repeat dial is set at a desired number of copies beyond 1, the switch $SW_2$ (FIG. 46) is closed. The check whether the paper is located or not is then operated as mentioned above, whereby the signal PD is produced to set $FF_5$. $\overline{Q}$ output of $FF_5$ energizes relay $RA_1$ through $AND_6$ and driver $Dr_8$, energizing the blower motors $M_4$, $M_5$, drier motors $M_6$, $M_7$ and main motor $M_8$ at their normal speed. Q output of $FF_5$ energizes relay $RA_7$ through driver $Dr_9$, energizing the motor 130 associated with the reflecting mirror in the direction to wind out. When the reflecting mirror 13 moves clear from the switch 312a, the latter is thrown to the other position shown in dotted lines in FIG. 44, thereby extinguishing the projection lamp 4. The print signal P' from $FF_4$ is also passed through $OR_5$ and $INV_2$ to set $FF_2$ momentarily, so that lamp 432 ($L_4$) is illuminated, but is extinguished when $FF_4$ is reset as soon as a paper detection signal is produced by the detector 433. Timer $T_2$ is triggered through $OR_6$ and $INV_3$, and repeat solenoid $SOL_1$ is energized through driver $Dr_7$, turning on the repeat switch $SW_2$ when a repeat operation is desired.

When the reversal of the mirror is terminated, the switches 312 and 312b' are actuated. By opening of 312b' motor 130 comes to a stop and by closing 312b $FF_9$ and $FF_{10}$ are set. $RA_2$ is actuated by Q output of $FF_9$ through $Dr_{14}$ and the charging of charger is started. $\overline{Q}$ output of $FF_9$ operates the timer $T_8$, whereby feed clutch 300a is energized through driver $Dr_{115}$ and initiates the feeding of the paper. $\overline{Q}$ output of $FF_{10}$ energizes further the clutch 305 associated with the vacuum belt conveyor. This allows the paper web to be fed to the position of the cut switch 241 or 242. When the paper web reaches and operates a selected cut switch, for example, the half cut switch 241, the timer $T_3$ is triggered to operate the cutter relay $RA_3$ for a given time length, thus energizing the cutter solenoid 216 for a given time so as to cut the paper web in a determined length. This applies also when the cut switch is constituted by a contactless detector. The exposure timer $T_5$ is also triggered. Subsequently, the copy sheet which has been cut is fed to the stop switch 243 or 244, to operate it, for example, switch 243. As a consequence, $FF_9$ and $Ff_{10}$ are reset through $NAND_{16}$, $OR_9$, and relay $RA_2$ associated with the charger 190 is deenergized through driver $Dr_{14}$. Also the clutch 305 is deenergized through driver $Dr_{16}$, whereby the copy sheet comes to a stop at the exposure position.

The timer $T_5$ just completes its operation at this time. Therefore, the exposure timer $T_6$ is set in operation, producing an exposure signal E which is transmitted through driver Dr 11 to energize exposure relay $RA_4$. As a result, the contact 4-1 (FIG. 44) is turned on, illuminating the projection lamp 4 and initiating the exposure. The duration of the exposure is changed in two steps in accordance with the density of the original, by the change-over switch $S_4$ (FIG. 46). The duration of the timer $T_5$ is determined in accordance with the variety and length of the sheet, namely, by the switches $S_2$, $S_2'$.

When the exposure signal E disappears at the termination of the exposure, the projection lamp 4 is extinguished, and $FF_{10}$ is set through inverter $INV_{10}$, whereby the clutch 305 is energized to eject the copy sheet. At the same time, the falling edge of the signal E operates paper jamming detection timer $T_{11}$ in the developing device. If the apparatus is in its repeat mode, a paper detection signal PD, produced by the paper end detection circuit energized through $NAND_{12}$ sets, $FF_9$, whereby the clutch 300a is operated to commence the feeding of a second copy sheet.

The exposed copy sheet is passed through a developing tank and is ejected from between the squeeze rollers. At this time, the ejection detection sensor 366 is operated to trigger timer $T_9$ through $NAND_{21}$. Thus, after a delay of a given time length, an ejection signal Z appears from $OR_{10}$, resetting $FF_4$ to $FF_7$ and $FF_9$ to $FF_{12}$.

In the present apparatus, the copying cycle is electrically controlled instead of cam controlled. For this reason, if the power is disconnected during a print cycle as a result of power failure or inadvertent operation, the apparatus will start a new cycle when the power is supplied again. This means that a copy sheet, which has come to a stop in the course of a print cycle when the power is disconnected, is left in its place when the next cycle is initiated. To overcome this difficulty, there is provided a ratchet relay in accordance with the invention which is operated by a paper cut instruction and which is restored by the paper ejection. In the event a power failure occurs subsequent to a cut instruction, indicating that a copy sheet remains within the copying machine, the self-holding of the ratchet relay provides a decision that a copy sheet remains within the copying machine, whereby the remaining copy sheet is forcedly ejected, independently from the print cycle, when the print switch is turned on.

Forced Ejection

Figure 47:
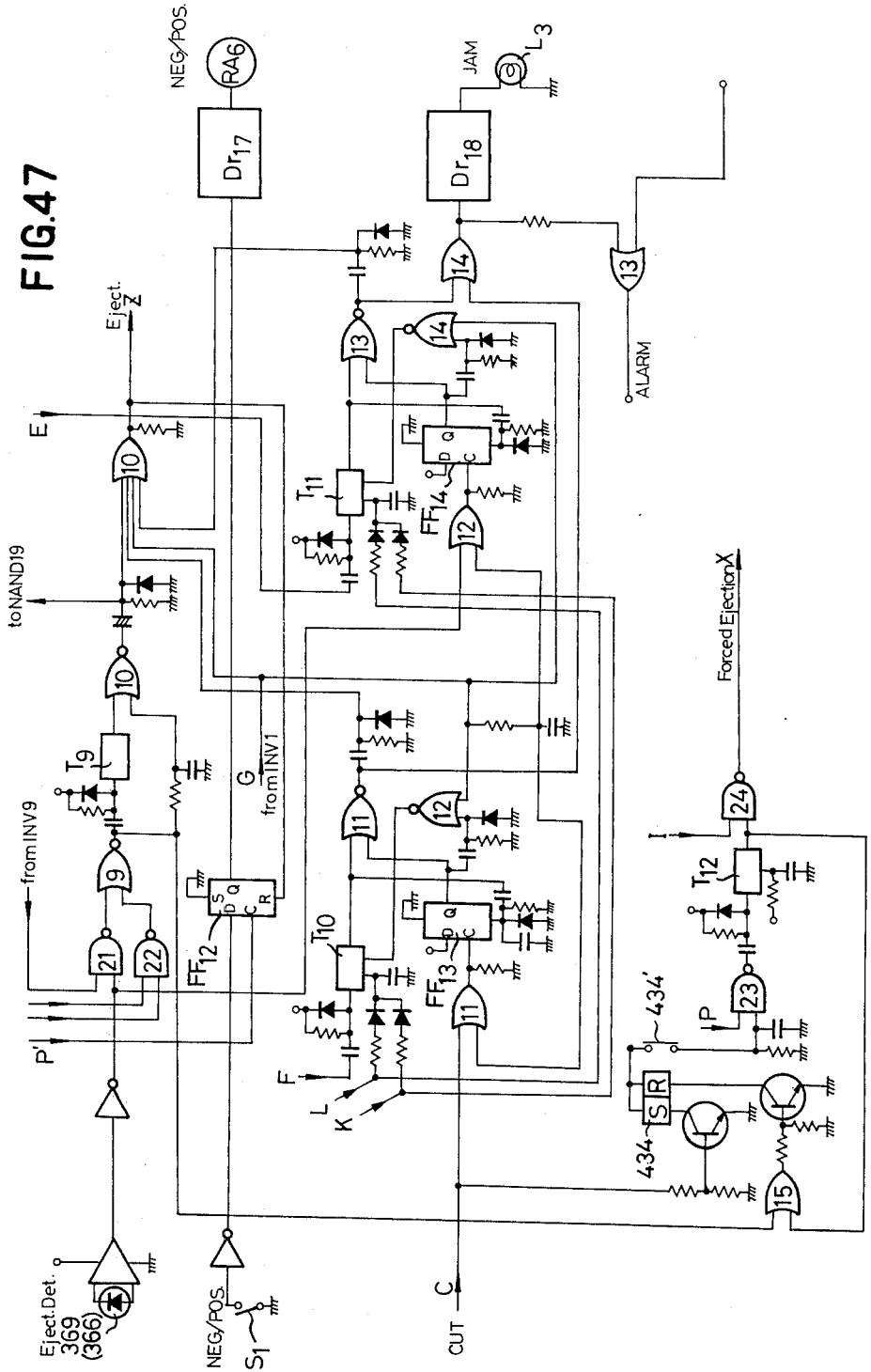
Figure 48:
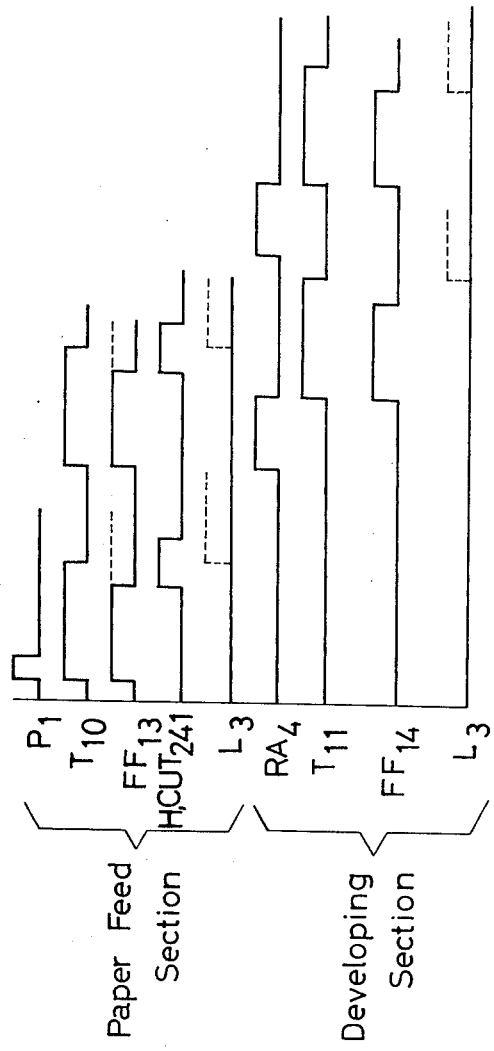
FIG. 48 is a time chart for a jamming detection operation.

Referring to FIG. 47, there is shown a ratchet relay 434 which is set by either cut switch 241 or 242 and remains set unless reset subsequently even if the voltage applied to the relay coil is interrupted. During a normal copy cycle, the ratchet relay 434 is set by a cut signal C, and is reset subsequently by the ejection detection switch 366 throgh $OR_{15}$. Thus, when the print switch $P_1$ is depressed for initiating the next print cycle, the contact 434' of the ratchet relay remains open, inhibiting one input to $NAND_{23}$, whereby the operation of forced ejection timer $T_{12}$ is prevented.

In the event the power is disconnected subsequent to a cut instruction, as by a power failure or inadvertent disconnection of the supply cord, the ratchet relay 434 remains operated. When the power is resumed under this condition, an H input remains applied to $NAND_{23}$ through the associated contact 434'. As a consequence, upon depression of the print switch $P_1$ which produces a print signal P, the output of $NAND_{23}$ will assume an L level, whereby the timer $T_{12}$ is operated and its output assumes an H level. Since $FF_4$ is not initially set, both inputs to $NAND_{24}$ will be at an H level, thus producing a forced ejection signal X. This signal is applied to driver $Dr_8$ (FIG. 45) to energize the motor drive relay $RA_1$, whereby main motor 8 is driven and MC 305 is energized through $Dr_{16}$, resulting in an ejection of a copy sheet located within the copying machine, independently from the sequence. The forced ejection signal X is also applied to the other input terminal of $NAND_4$, whereby flip-flop $FF_4$ is operated, inhibiting the initiation of a normal print cycle. A resistor $R_1$ and a capacitor $C_1$ serve delay the H level output of inverter $INV_4$ reaching $NAND_4$. In other words, a time is assured for determining whether the ratchet relay 434 is set when depressing the print switch $P_1$, and if the ratchet relay is operated, the other input to $NAND_4$ is maintained at an L level to prevent $FF_4$ from being set. If the ratchet relay 434 is not set, $FF_4$ will be set with a certain time delay after turning on the print switch, thus initiating a print cycle. The time delay is on the order of about 10mS, which is not noted by an operator.

The ratchet relay is reset through $OR_{15}$ at the same time as the timer $T_{12}$ operates, avoiding a recurrent failure to enter a print cycle in that the depression of the print switch subsequent to the operation of the timer activates the forced ejection circuit. One of the input terminals of $NAND_{24}$ is connected with an L level in order to prevent a malfunctioning of the timer $T_{12}$ to operate the forced ejection circuit during the time $FF_4$ is set.

Detection of Jamming

When $FF_4$ is set by the print switch $P_1$, a jamming detection timer $T_{10}$ on the paper feed side is triggered through $OR_5$ and $INV_2$, as shown in FIG. 47. Simultaneously, a jamming detection flip-flop $FF_{13}$ on the paper feeding side is reset by a signal F. $FF_{13}$ is normally set at the same time as the cut switch 241 is operated to cut the web. When a jamming occurs in the paper feeding section, the cut switch 241 is not operated, so that $FF_{13}$ is not set within a given time established by the timer $T_{10}$ after the detection of a jamming. Therefore, a lamp $L_3$ is lit through driver $Dr_{18}$ at the same time with the falling of the timer $T_{10}$, and an alarm is activated. The detection of a jamming during a repeat operation takes place as mentioned above. In this case, a second copy sheet is fed upon termination of the exposure of a first copy sheet or at the same time with the falling of the exposure period determining timer $T_6$, and timer $T_{10}$ is triggered through $NAND_{12}$, $OR_5$ and $INV_2$, whereby $FF_{12}$ is reset.

The detection of a jamming in the developing section takes place as follows: Simultaneously with the termination of an exposure, timer $T_{11}$ in the developing section is triggered to reset $FF_{14}$ in the developing section. $FF_{14}$ is normally set through $OR_{12}$ at the time the ejection detection switch 369 is operated. When a jamming occurs in the developing section, $FF_{14}$ will not be set within a time interval established by the timer $T_{11}$ for the detection of a jamming in the developing section, so that $NOR_{13}$ similarly produces a jamming signal, which is passed through $OR_{10}$ to reset $FF_4$ to $FF_{10}$ and $FF_{12}$, thus interrupting the feeding operation.

The embodiment described above deals with an original moving device in which originals of a given size (apertured card) are manually changed one by one, but, in accordance with another embodiment of the invention, an original moving device which contains a plurality of apertured cards one above another and which automatically feeds these cards for copying purpose, an apparatus for feeding a card, and a moving device for moving originals of various sizes (jacketed fiche) can be utilized as attachments.

Figure 33:
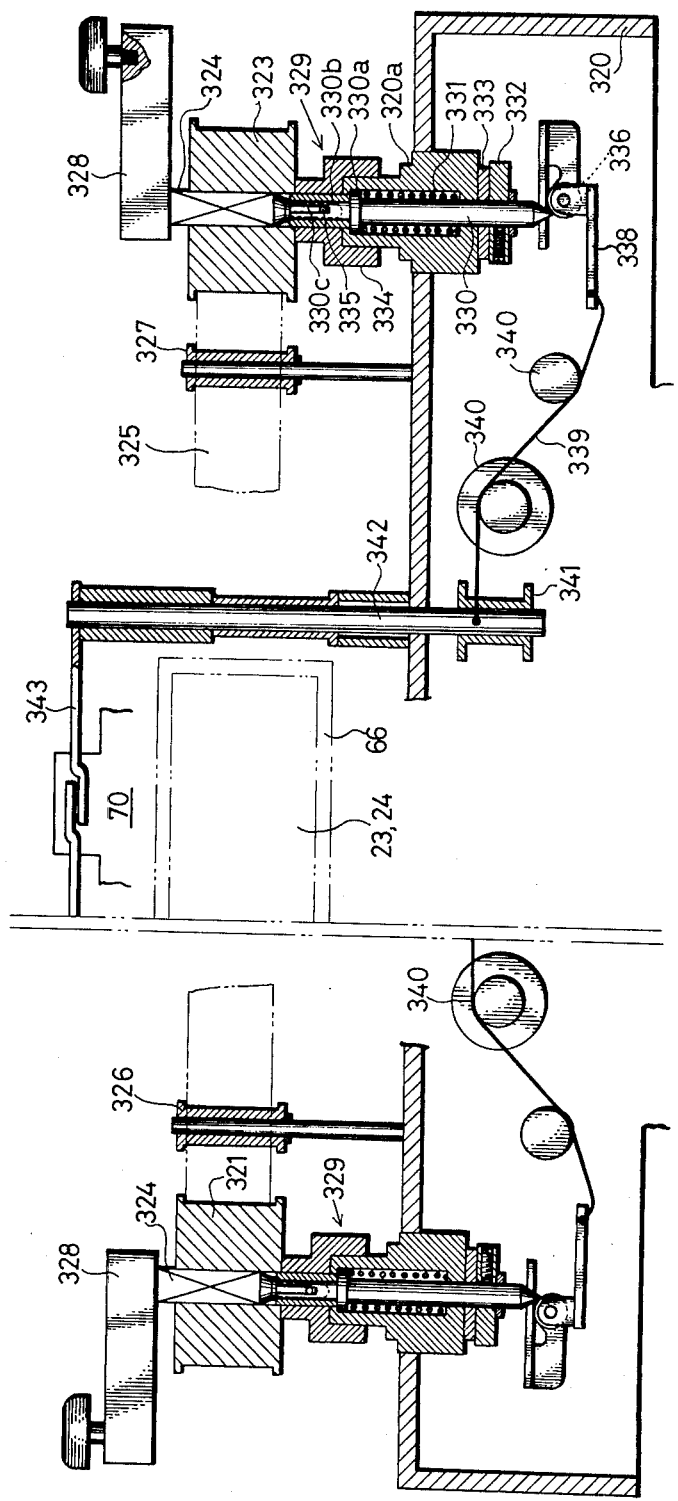
FIG. 33 is a front view of the device for feeding a roll of film.
Figure 34:
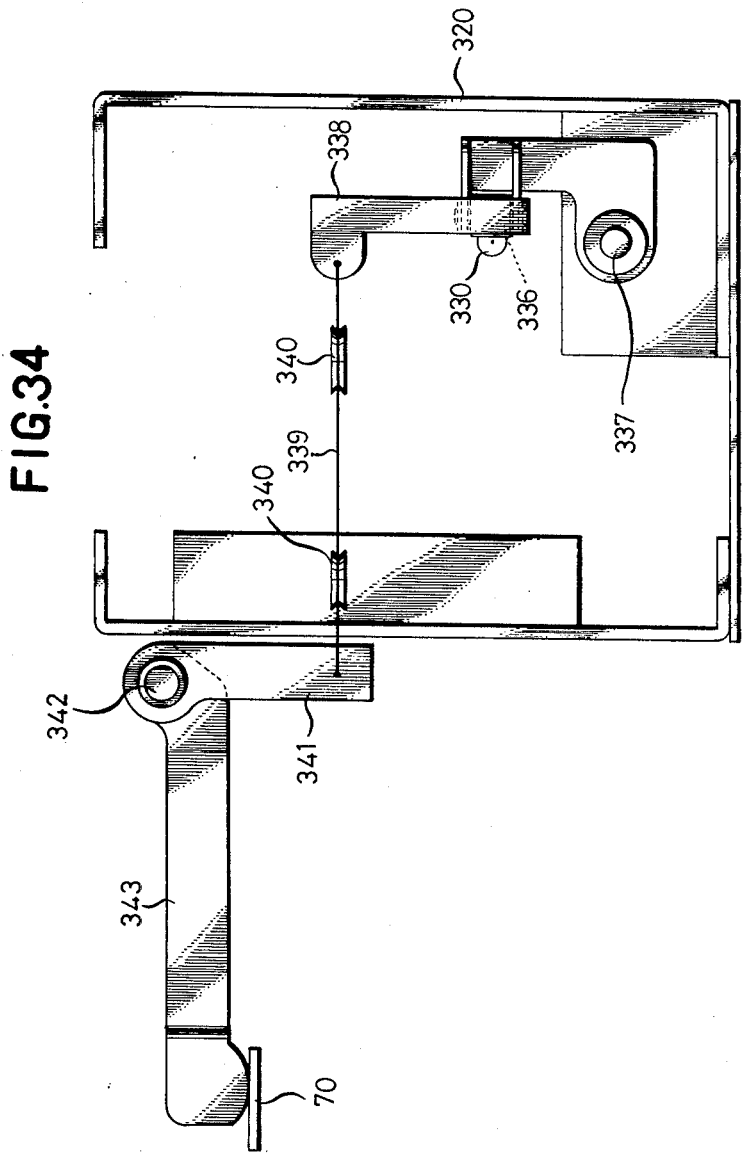
FIG. 34 is a plan view of the device shown in FIG. 33.

An apparatus for feeding a roll film may comprise an arrangement as shown in FIGS. 33 and 34. Specifically, an attachment frame 320 is detachably mounted so as to overlie an XY moving knob and is centered about a lamp housing 66 on a body frame. Mounted on the attachment frame 320 are shafts 324 for mounting a film reel 321 and a film take-up reel 323. A film 325 extends between the film reel 321 and the take-up reel 323 and is guided by guide rollers 326, 327 to pass between the pair of pressure plates 23 and 24.

The shaft 324 is detachably mounted on a support member 329. The attachment frame 320 is formed with an abutment 320a into which a shaft 330 having a flange 330a is received so as to be slidable in the vertical direction and is biased upward by a spring 331. A retaining plate 332 is secured to the shaft 330, and a friction plate 333 is freely mounted on the shaft 330 intermediate the retaining plate 332 and the abutment 320a. Since the shaft 330 is normally biased by the spring 331 into frictional engagement with the abutment 320a with the friction plate interposed therebetween, it experiences a braking action. An adjustable seat 334 can be mounted on or detached from the abutment 320a in order to permit it to be changed in accordance with the film width.

Each shaft 324 is provided with a handle 328 and is square-formed in section to be fitted into square bores in the reels 321, 323. The tapered free end of each shaft 324 which is mounted in either reel 321 or 323 is loosely fitted into an axial bore 330b formed in the shaft 330, and is adapted to rotate with the shaft 330 by engaging a pin 335 which is inserted into the shaft 324 to engage in a slit 330c formed in the shaft 330. When force is applied to the handle 328 in order to rotate the reel 321 or 323, the shaft 330 is pushed downward against the resilience of the spring 331. At this time, the lower end of the shaft 330, which is formed with a beveled surface relative to the axis thereof, functions as a cam, cooperating with a roller 336. The roller 336 is rotatably mounted on a lever 338 which is in turn rotatably mounted on the attachment frame 320 by means of a pin 337. When the roller 336 is urged, the lever 338 rotates around the pin 337, whereby a wire 339, having its one end secured to the free end of the lever 338, is pulled. The wire 339 extends around a guide roller 340 and has its other end secured to a lever 341, which is in turn secured to a shaft 342 rotatably mounted in the attachment frame 320. A release arm 343 is secured to the shaft 342, and extends to an operative position in which it is operable upon release lever 70.

When force is applied to the handle of the shaft 324, the shaft 330 is moved downward, moving the lever 338, whereby the wire 339 is pulled to rotate the release arm 343 about the shaft 342 through the wrapping seat 341. The free end of the release arm 343 then presses against the release lever 70, thus releasing the pressure from the pressure plates. Under this condition, the film is freed from the pressure plates, and can be freely taken up on either reel 321 or 323 by turning the handle 328. The rotation of the reel 321 or 323 permits a reading of desired information or a copying thereof in the manner mentioned above.

Figure 35:
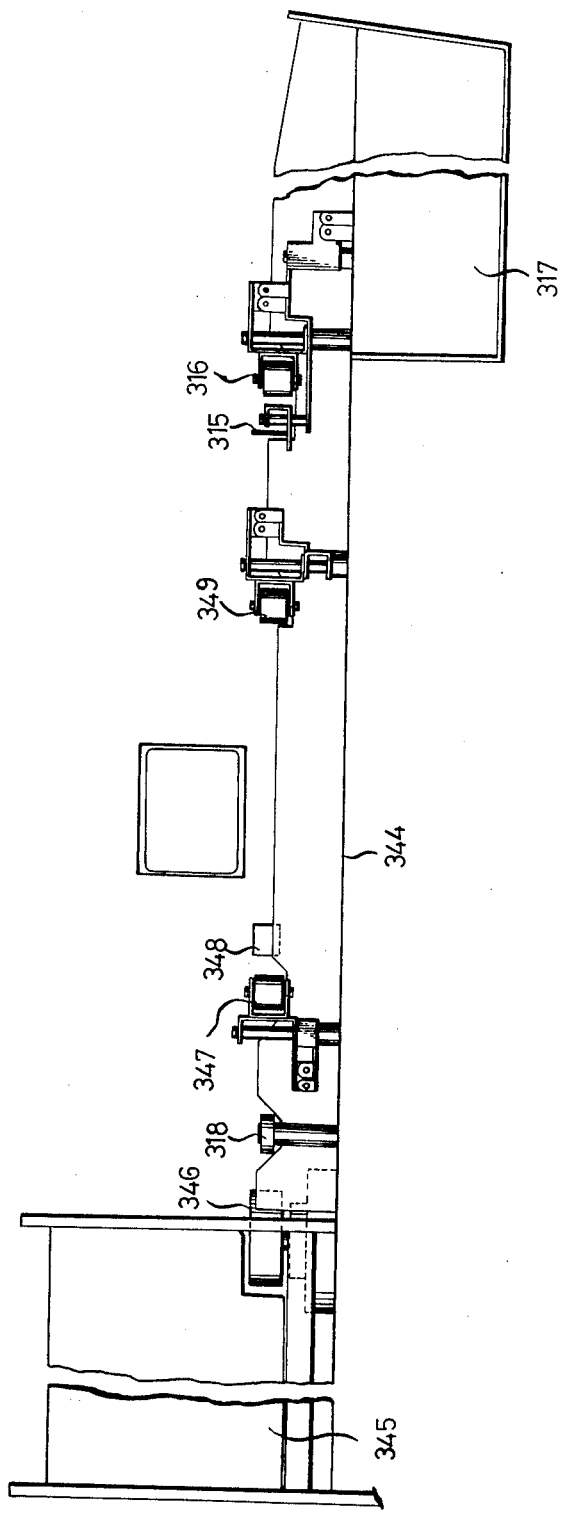
FIG. 35 is a front view showing the outline of automatic card feed device.
Figure 36:
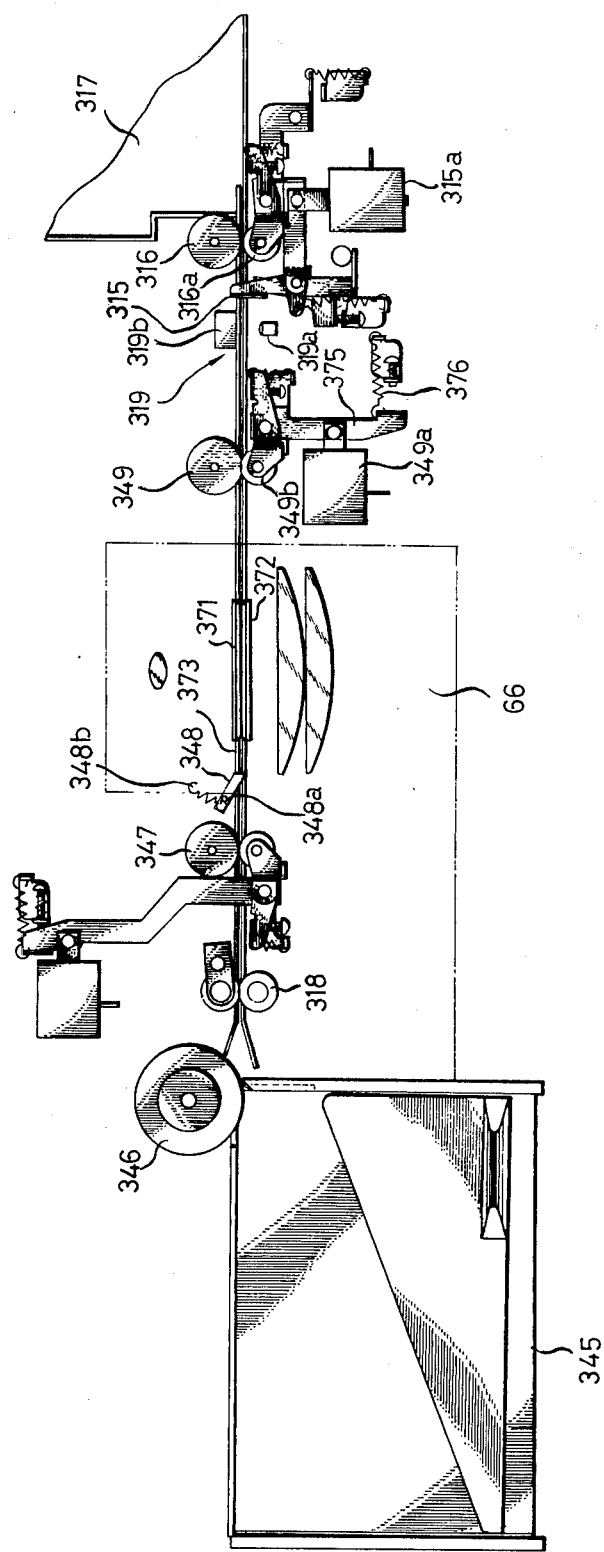
FIG. 36 is a plan view of the device shown in FIG. 35.
Figure 49:
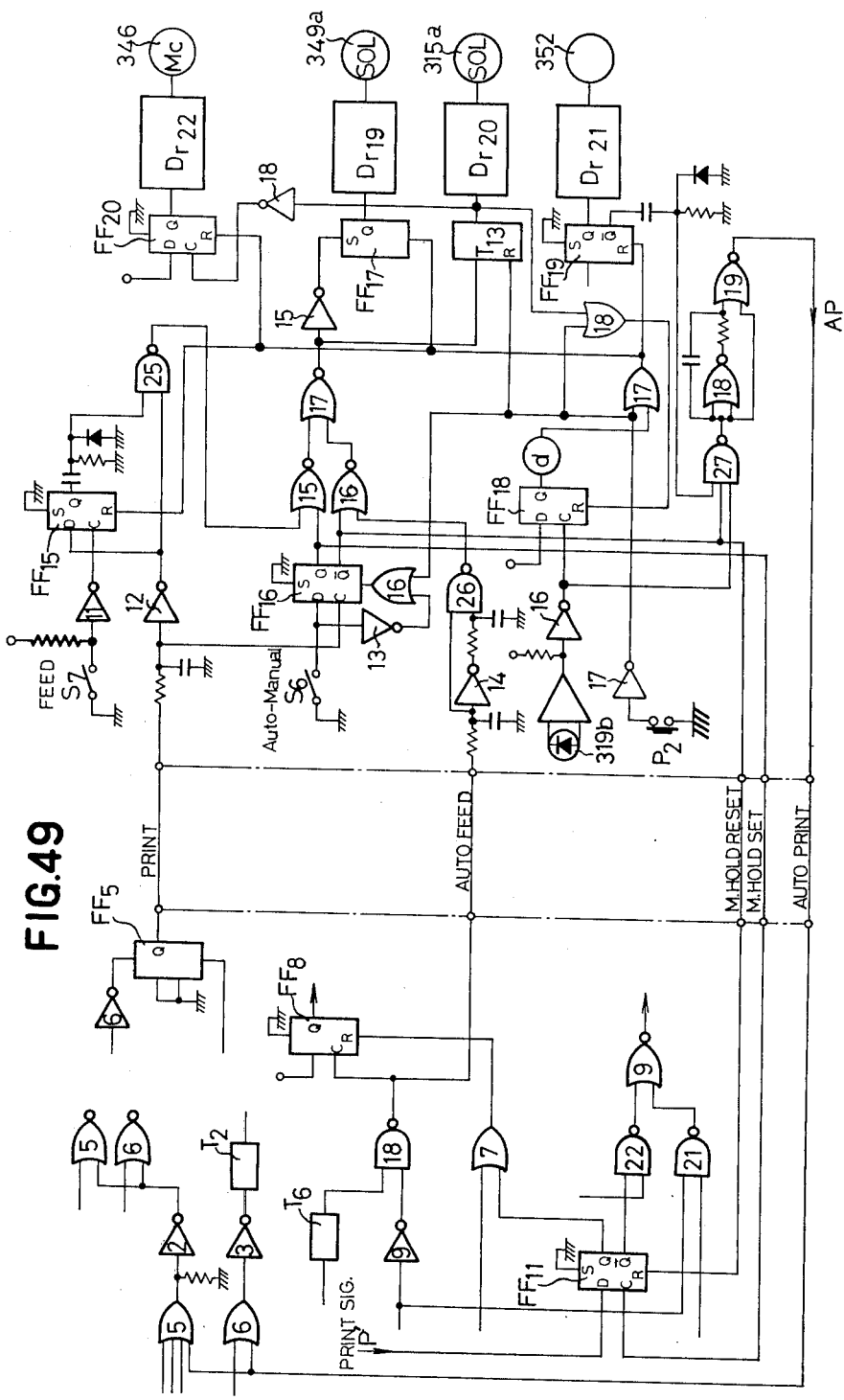
FIG. 49 is a control circuit diagram showing the relation between the copying system and the feeding of an original.

A feed apparatus which automatically supplies apertured cards one after another can be used in the present invention. Referring to FIGS. 35 and 36, the feed apparatus shown comprises a frame 344, and mounted on the frame are a hopper 345 which contains a plurality of cards or originals in juxtaposition; a feed roller 346 for delivering the originals one by one and a feed roller 347 which engages a pinch roller for feeding the original; a positioning stop 348 and a feed roller 349 which engages a pinch roller for feeding the original to an exposure position; a stop 315 for stopping the original when it has moved substantially to the exposure position; a stationary glass pressure plate 371 for holding the original when it has come to a stop at the exposure position; a pressure plate 372 which can be moved away or toward the original as it travels; and an ejection roller 316 for feeding the original to an ejection position and an ejection tray 317. An operation board for controlling the feed apparatus comprises a change-over switch $S_6$ which switches between a manual mode and an auto mode, a feed switch $S_7$ and a reset switch $S_8$ (FIG. 49).

The original which is fed by the feed roller 346 is detected by a detector 318 in order to prevent more than one original from being fed simultaneously, and is further fed by the feed roller 347 and passes over the positioning stop 348 while pressing it down, and a subsequent feeding operation is continued by the feed roller 349. The original comes to a stop when it bears against the stop 315 at the given exposure position.

Figure 38:
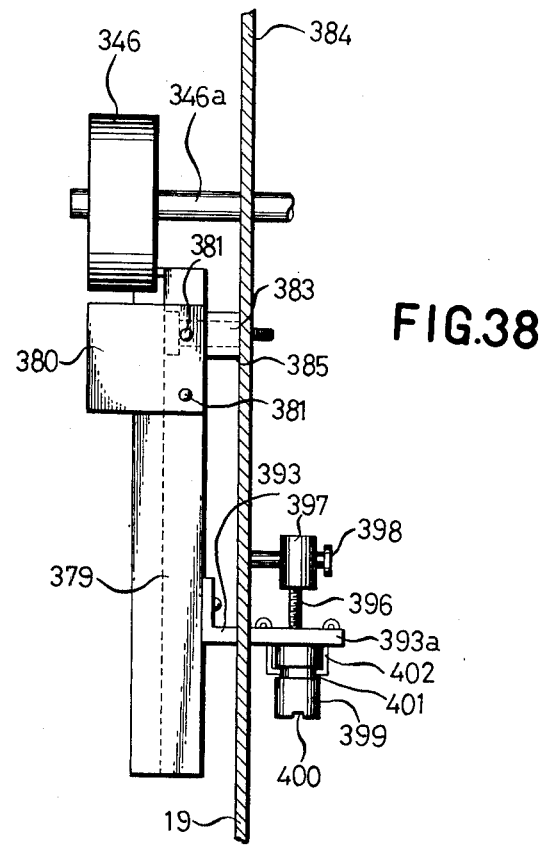
FIG. 38 is a side view of the device shown in FIG. 37, with certain parts being omitted.

By way of example, FIG. 37 illustrates one example of the hopper 345 and the feed roller 346. Specifically, the hopper 345 has a width $l$ which is slightly less than the length of the original or card 377, and a pressure plate 378 is slidably mounted in the hopper. The feed roller 346 is located at the card outlet of the hopper 345 in a manner such that part of the periphery of the roller 346 extends into the hopper 345. As shown in FIG. 38, plate 379 of the hopper 345 has a separation plate 380 secured thereto as by screw 381, and the separation plate 380 has its end spaced from the outer periphery of the feed roller 346 by a distance corresponding to the thickness of a single card. The cards 377 are received within the hopper 345 in a skewed position relative to the wall 345a thereof which extends along the card feeding direction, and the foremost card can be brought into abutment against the feed roller 346. The cards 377 are normally urged by the pressure plate 378 toward the feed roller 346. The pressure applied to the pressure plate 378 can be simply achieved by disposing springs 382 between the wall of the hopper 345 and the pressure plate 378. As the feed roller 346 rotates, the foremost card 377 is fed forward by the frictional force applied by the roller 346. As indicated in FIG. 37, the card 377 begins to rotate about the point of its contact with the roller 346 as it moves, and is passed to the next step through a guide 373. Since the card which is immediately adjacent to the foremost card being fed is retained in the initial condition, the foremost card is initially moved away from the adjacent card and along the wall 345a without causing a rubbing action. It will be thus seen that, since the foremost card contacts the immediately adjacent card only in the region of the card edges which are located adjacent to the feed roller 346, there is no rubbing between adjacent cards, so that any film applied to the card cannot be damaged or peeled off.

Figure 40:
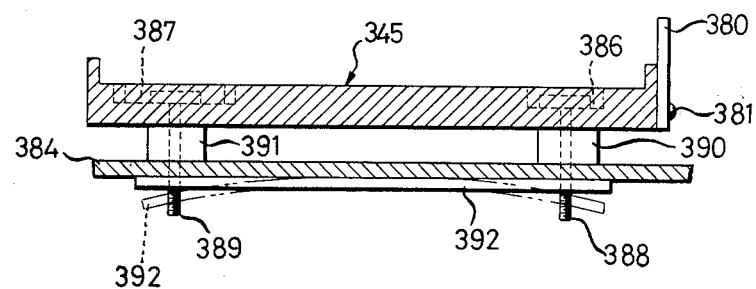
FIG. 40 is a sectional view taken along the line XXXX—XXXX of FIG. 37, with certain parts being omitted.

As shown in FIGS. 38 to 40, a stepped screw 383 is fitted into the plate 379 of the hopper 345 from the inside, and its threaded end is threadably engaged with a base plate 384 of the card feed apparatus so that the hopper 345 can be rotated about the thread 383 relative to the base plate 384. A spacer 385 is mounted between the bottom plate 379 and the base plate 384, and the screw 383 extends through the spacer 385, thus maintaining a constant spacing between the bottom plate 379 and the base plate 384. The screw 383 is preferably located as remote from the separation plate 380 as possible. The base plate 379 is formed with a pair of elongate slots 386, 387, which are engaged by screws 388, 389, respectively. As shown in FIG. 40, a pair of spacers 390, 391 are fitted on the screws 388, 389, which extends through the base plate 384 and threadably engage threaded bores in a spring nut 392. As indicated in FIG. 39, the pair of elongate slots 386, 387 are positioned such that a pair of perpendiculars 386'', 387'' drawn from the center of the screw 383 to the longitudinal axes 386', 387' of the slots 386, 387 extend through the center of the slots 386, 387 and that they are located as remote from the screw 383 as possible. The spring nut 392 which threadably engages the pair of screws 388, 389 is adapted to be curved as shown in phantom lines in FIG. 40 when the screws 388, 389 are loosened, thus maintaining the base plate 384 in parallel relationship with the bottom plate 379 of the hopper 345. The three screws 383, 388 and 389 have their head received in counterbores formed in the bottom plate 379, whereby an interference with the movement of the card 377 by the screws is avoided. As indicated in FIGS. 38 and 39, an angled bracket 393 is secured to the outer surface of the bottom plate 379, and has an upstanding portion 393a which extends through an opening 394 formed in the base plate 384. The upstanding portion 393a is formed with an elongate slot 393b into which a screw 396 is fitted. A stud mount 397 having a greater diameter than the screw 396 is either secured to or integrally formed with the screw 396, and a stud 398 extends through the stud mount 397, one end of the stud 398 being secured to the base plate 384. The opposite end of the screw 396, which is remote from the stud 398, threadably engages a nut 399 which bears against the upstanding portion of the bracket 393. A groove 400 for receiving a turning tool such as screwdriver is formed in the top of the nut 399. In addition, an annular groove 401 is formed in the outer periphery of the nut 399, and is engaged by a detent member 402, such as a leaf spring or wire, for example, the other end of the detent member 402 being fixedly attached to the upstanding portion 393a of the bracket 393. Consequently, the nut 399 can be rotated relative to the bracket 393, but cannot be removed from the bracket 393. As shown in FIG. 39, it is preferred that the bracket 393 and screw 396 be located so that a perpendicular from the center of the screw 383 to the axis 396' of the screw 396 intersects with the point of engagement between the screw 396 and the nut 399. As indicated in FIG. 38, the feed roller 346 is fixedly mounted on a shaft 346a, which is rotatable with respect to the base plate 384, but remains stationary in position.

The operation of the card feed and clearance adjusting apparatus will be described below. When it is desired to use cards having a different thickness or where the clearance is inaccurate, it is necessary to adjust the clearance between the feed roller 346 and the separation plate 380. To perform such adjustment, the screws 388, 389 are initially loosened, whereby the spring nut 392 which is fixed by these screws is also loosened. Thus, the spring nut 392 will be curved as shown in phantom lines in FIG. 40, maintaining the parallel relationship between the plate 379 and the base plate 384. Because the screws 388, 389 are fitted into the elongate slot 386, 387 in the plate 379, it is possible to rotate the bottom plate 379 about the screw 383. Under this condition, a screwdriver is engaged with the groove 400 in the nut 399 to rotate it, whereby the plate 379 can be rotated about the screw 388 relative to the base plate 384 since the screw 396 is secured to the base plate 384 through the stud 398, thus permitting an adjustment of the clearance a between the feed roller 346 and the separation plate 380. The rotation of the plate 379 about the screw 383 takes place through a small angle along an arc, but is assured by the above mentioned arrangement of the elongate slots 386, 387. After adjustment of the clearance, the pair of screws 388, 389 are tightened to secure the hopper 345 to the base plate 384.

With the above arrangement, the adjustment of the clearance can be performed while maintaining the parallel relationship between the plate 379 of the hopper 345 and the base plate 384, and since the adjustment takes place by rotating the hopper 345 about a fixed point (screw 383), the adjustment of the clearance is achieved with a high accuracy, preventing an error in the clearance a from occurring before and after tightening the screws 388, 389.

Figure 41:
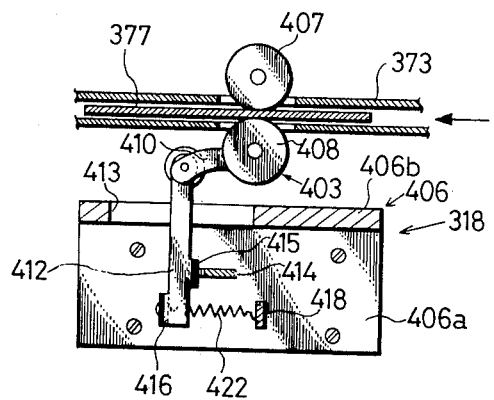
FIG. 41 is a transverse sectional view of the abnormal feed detecting device.
Figure 42:
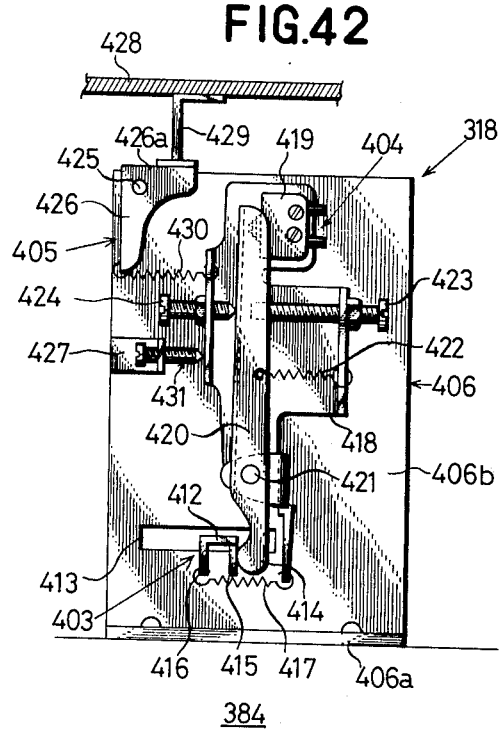
FIG. 42 is a front view of the abnormal feed detecting device shown in FIG. 41.
Figure 43:
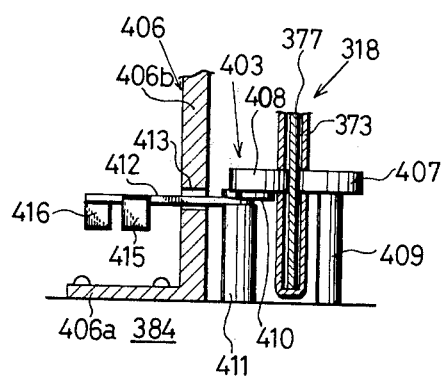
FIG. 43 is a fragmentary side view of the device shown in FIG. 42, with certain parts being omitted.
Figure 44:
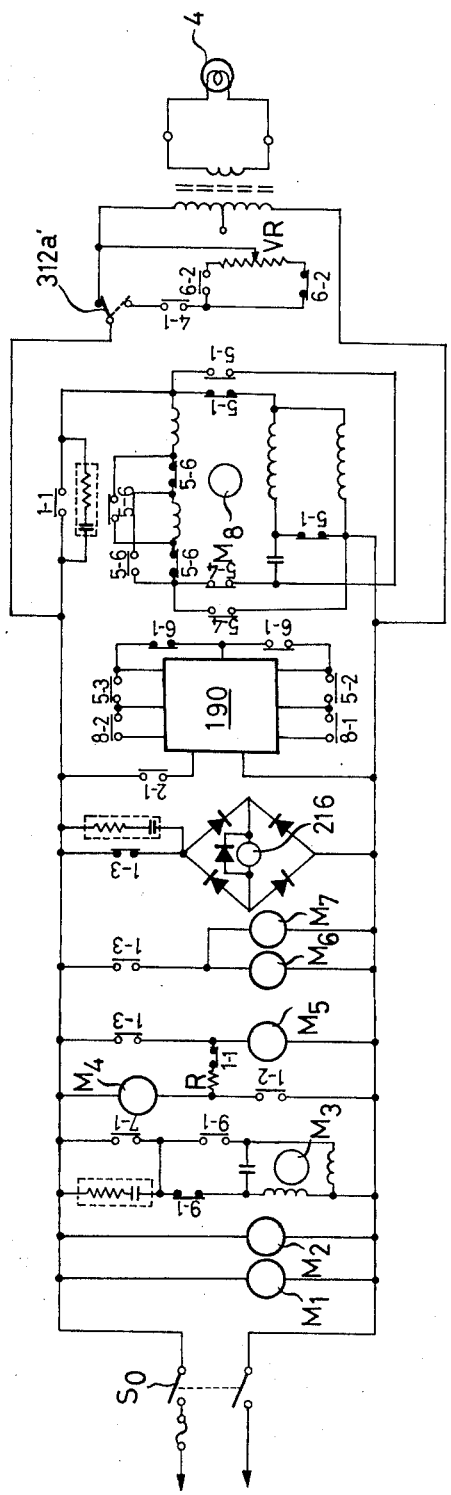
FIG. 44 is an electric circuit diagram of the drive motor section of the control device.

The abnormal feed detector 318 is located intermediate the ends of the card guide 373, and comprises a detection member 403, a switch unit 404, a device 405 for adjusting a thickness to be detected, and a support member 406 which support these components, as illustrated in FIGS. 41 to 43.

The detection member 403 comprises a roller 407 which is located so as to contact the card 377 travelling along the card guide 373, and a detection roller 408 which is located opposite to the roller 407. The card 377 is passed between these rollers. The roller 407 is rotatably carried by a stanchion 409 which is fixedly mounted on the base plate 384 of the card feed apparatus while the detection roller 408 is rotatably carried by a detection lever 410 which is in turn rotatably mounted on a stanchion 411 fixedly mounted on the base plate 384. Another lever 412 is integrally secured to the detection lever 410, and extends through an opening 413 in the support member 406, thus permitting the detection roller 408 to be moved toward or away from the roller 408 by rotating the lever 412. To this end, the opening 413 is sized to avoid an interference with the rotation of the lever 412. An engagement plate 415, which bears against an engaging lever 414 to be described later, is secured to the lever 412, the other end of which fixedly carries a plate 416 for mounting a spring 417. The other end of the spring 417 is attached to a carrier lever 418 to be described later, and the spring 417 urges the lever 412 in a direction to bias the detection roller 408 toward the roller 407. In the present example, the support member 406 comprises a base 406a secured to the base plate 384 and a vertical portion 406b which is integral with the base 406a.

The switch unit 405 comprises the carrier lever 418 which carries a detection switch 419, and a switching lever 420 which operates the detection switch 419. These two levers 418, 420 are rotatably mounted on a pivot 421, which is secured to the vertical portion 406b of the support member 406. As will be further described later, the carrier lever 418 is retained in the position shown in FIG. 42 and cannot rotate during the operation of the apparatus. A spring 422 extends between the switching lever 420 and the carrier lever 418, thus enabling the switching lever 420 to operate the detection switch 419. A stop 423 is mounted on the carrier lever 418, and prevents a movement of the switching lever 420 beyond a given position, thus preventing damage to the switch terminals which might otherwise occur as a result of the lever 420 being excessively biased by the spring 422 against the detection switch 419. It is preferred that the stop 423 comprises a bolt so that the stop position of the switching lever 420 can be easily adjusted. The engaging lever 414 is secured to or integrally formed with the end of the switching lever 420 which is remote from the detection switch 419, and is adapted to engage the engagement plate 415 of the lever 412 of the detection member 403.

Normally the switching lever 420 must be in its inoperative position (the position shown in FIG. 42) away from the terminals of the detection switch 419. Thus, the resilience of the spring 422 is made less than that of the spring 417, and the arrangement is such that the spring 422 acts effectively to actuate the detection switch 419 when the detection roller 408 is externally moved in a direction away from the roller 407 and the engagement plate 415 of the lever 412 is moved away from the engaging lever 414. The carrier lever 418 has a stop 424 mounted thereon which is adjustable in position. The stop 424 functions to stop the switching lever 420 at a desired position relative to the carrier lever 418 against the resilience of the spring 417.

The device 405 for adjusting the thickness to be detected comprises an angle-shaped rotary member 426 which is rotatably mounted on a pivot 425 secured to the support member 406, and a bracket-like stationary member 427 which is secured to the support member 406. The top surface 426a of the rotary member 426 bears against an angle-shaped retaining member 429 which is fixedly mounted on a detachable lid 428, which is a top cover in the present example, and serves for producing a tension in a spring 430 which is disposed between the rotary member 426 and the carrier lever 418. The stationary member 427 is provided with an adjusting screw 431 which prevents a rotation of the carrier lever 418 under the tension of the spring 430. Since the carrier lever 418 bears against the adjusting screw 431 under the resilience of the spring 430, the position of the carrier lever 418 is maintained when the rotary member 426 bears against the retaining member 429. However, when the lid 428 is removed, the retaining member 429 also moves upward, whereby the rotary member 426 becomes free to rotate about the pivot 425, thus releasing the carrier lever 418 for free movement.

When the cards 377 are fed one by one, the detection roller 408 remains substantially immovable, so that the switching lever 420 does not operate the detection lever 410. If more than one card is fed simultaneously in overlying relationship, the detection roller 408 is moved in a direction away from the roller 407 against the resilience of the spring 417. Thus, the engagement plate 415 of the lever 412 tends to move away from the engaging lever 414. At this time, the engaging lever 414 follows the movement of the engagement plate 415 under the action of the spring 422. In this manner, the switching lever 420 rotates around the pivot 421 to press against the terminals of the detection switch 419, thereby producing an abnormality detection signal. The cards can be restored to a normal condition, as by shutting down the machine, in response to the operation of the detection switch 419.

When different cards are used which have a different thickness, it is necessary to adjust the clearance between the rollers 407 and 408. Turning the adjusting screw 431 causes the carrier lever 418 to rotate about the pivot 421, whereby the engaging lever 414 which is secured to the switching lever 420 drives the lever 412 of the detection member 403 so as to move the detection roller 408 away from or toward the roller 407. More specifically, the stop 424 maintains the switching lever 420 at a desired position relative to the carrier lever 418 against the resilience of the spring 422 while turning the adjusting screw 431, so that it may be said that the switching lever 420 is maintained in a kind of integral relationship with the carrier lever 418. As a result, when the carrier lever 418 is moved by means of the adjusting screw 431, such movement is transmitted to the detection lever 410 through the switching lever 420, thus adjusting the clearance between the detection roller 408 and the roller 407.

When the lid 428 is opened, the constraint on the detection roller 408 is removed. Specifically, when the apparatus is shut down and the lid 428 is opened for the purpose of inspection, the retaining member 429 is moved upward to remove the constraint on the rotary member 426, which therefore becomes free for rotation. This results in relaxing the tension in the spring 430, whereby the carrier lever 418 is released for movement. If the carrier lever 418 is released, it is maintained in integral relationship with the switching lever 420, and the tension in the spring 417 remains unchanged, but since the detection roller 408 is also released as a result of its integral relationship with the carrier lever 418, it can be freely moved away from the roller 407. After completion of a repair of the apparatus, for example, which is performed by moving the rollers 407 and 408 away from each other, the closure of the lid 428 causes the rotary member 426, the carrier lever 418, the detection roller 408 and the like to be restored to the given positions shown so as to be ready for another detection operation.

The positioning stop 348 does not prevent a forward movement of the original (card) by moving away from the guide 373, but blocks a reverse movement of the original by stopping it. To this end, it is pivotally mounted on a pin 348a and is subjected to the resilience of a spring 348b.

The stop 315 is normally locked by the lever 374 and maintains the guide 373 in a closed condition, so that the original comes to a stop by abutment against the stop 315. At this time, the impact and inertia of the original causes the stop 315 to move back by a slight distance, and the stop returns subsequently under the resilience of spring, whereby the original is urged toward the positioning stop 348. To provide a smooth backward movement of the original, the solenoid 349a, having its plunger pivotally mounted on a lever 375 which rockably supports the pinch roller 349b relative to the feed roller 349, is deenergized, whereupon the lever 375 acts, under the resilience of the spring 376, to move the pinch roller 349b away from the feed roller 349.

An original passage detector 319 comprising a light emitting element 319a and a light receiving element 319b is located on the oppostie side of the guide 373 at a position intermediate the feed roller 349 and the stop 315. It is possible, for detecting the passage of the original, to detect the movement of the stop 315.

Figure 50:
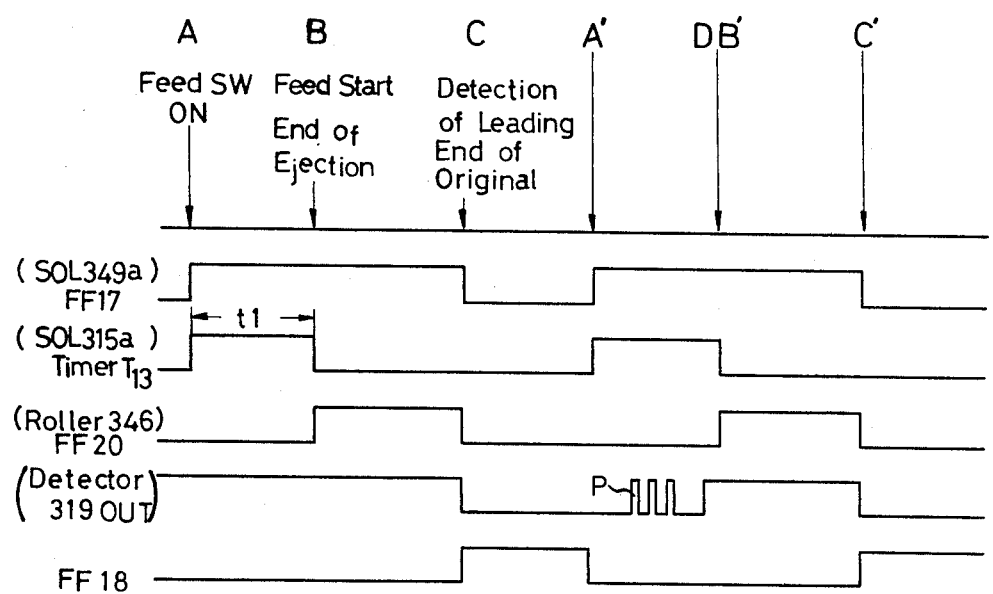
FIG. 50 is a time chart for the automatic feed control of the card.

When the feed switch $S_7$ is depressed, the inverter 11 (FIG. 49) connected between this switch and the input terminal C of $FF_{15}$ will have a high level output, thus setting this flip-flop. The output terminal Q of $FF_{15}$ assumes a high level, and its output signal (the feed signal) sets $FF_{17}$ through $NAND_{25}$, $NOR_{15,17}$ and $INV_5$, whereby the solenoid 349a is energized by driver $Dr_{19}$. The output of $NOR_{17}$ starts timer $T_{13}$, the output of which turns driver $Dr_{20}$ on, energizing solenoid 315a. Thus when the feed switch $S_7$ is turned on, the both solenoids 349a, 315a are energized simultaneously (A in FIG. 50).

The solenoid 349a drives the pinch driver 349b against the feed roller 349, feeding any original which may be present between the pressure plates 371, 372. The energization of the solenoid 315a causes the stop 315 to move away from the guide 373 in the downwards direction. Simultaneously the pinch roller 316a will be driven into engagement with the driven roller 316, whereby the original which passed the stop 315 will be fed by the drive roller 316 to the ejection tray. Thus, an original ejection takes place regardless of whether or not an original is present on the pressure plate.

Timer $T_{13}$ operates for a duration $t_1$, determined by a capacitor CT and a resistor RT a which is chosen slightly longer than the time interval required for the trailing end of the original to clear the detector 319 after the feed switch $S_7$ is depressed, and then its output disappears. In this manner, solenoid 315a is turned off, returning the leading end stop 315 to a projecting position (original positioning condition). The falling edge of the output from timer $T_{13}$ drives the output of inverter $INV_{18}$, which is connected between the output terminal of timer $T_{13}$ and the input terminal C of $FF_{20}$, to a high level, setting $FF_{20}$. This result in a conduction of driver $Dr_{22}$ which is connected with the output terminal Q of $FF_{20}$, energizing the original feed electromagnetic clutch MC connected in the output circuit thereof, thus driving the original feed roller 346 to feed an original in the hopper 345 (B in FIG. 50).

When the leading end of a card being fed intercepts light to the original detector 319, an amplifier contained in this detector has its output changed from a high to a low level, which is then inverted by the inverter 16 and applied to C input of $FF_{18}$ to set it. The output terminal Q of $FF_{18}$ is connected through $OR_{17}$ with the reset input terminal R of $FF_{15}$, $FF_{17}$, $FF_{19}$ and $FF_{20}$, which are therefore reset at the same time as the detector 319 detects the leading end of the original, thus turning the solenoid 349a and the clutch MC off (C in FIG. 50).

When the solenoid 349a is deenergized by an operation of the card passage detector 319, the feeding operation of the original is interrupted, and the original is correctly positioned by the positioning stop 348. A timer (not shown) is operated when the original passes by the light receiving element 319a, and terminates its operation when the original is positioned, thus closing the movable pressure plate 372.

After a reading on the screen, the auto-manual change-over switch $S_6$ is thrown to the manual position when a copy of that original alone is desired, while the switch is thrown to the auto-position where a succession of copies for the originals contained in the hopper is desired. The operation of the card feeder and the related operation of the copying machine for a manual mode and an auto mode will be described below with reference to FIGS. 45 to 47, FIG. 49 and FIG. 36.

1. Manual Mode

The auto-manual change-over switch $S_6$ is thrown to the manual position; thus it is closed. A required number of copies is preset on the repeat dial $S_5$ provided on the body of the copying machine (hereinafter referred to simply as "body"), and the print button $P_1$ is depressed, whereupon a copying cycle starts. Specifically, the Q output of $FF_5$ (FIG. 49) assumes a high level and is inverted by $INV_{12}$ in the original feeder, and is then applied to the D input of $FF_{15}$ and one of the gating inputs of $NAND_{25}$, thus preventing $FF_{15}$ from being set by the depression of a feed button $S_7$. In this manner, an original which is in its exposure process cannot be ejected. When the exposure step for the last copy in the required number of copies is terminated, the machine resumes a reader capability, and the copy sheet is ejected. When the feed switch $S_6$ is depressed again (A' in FIG. 50), the original located on the pressure plate 372 is ejected by a process similar to that mentioned above. Where the original is one which is not yet punched, the detector output rises at the moment the trailing end of the original (FIG. 49) clears the detector 319 and no longer intercepts the light (D in FIG. 50), and where the original is a punched one and punched apertures therein momentarily interrupt the interception of the light to the detector 319, its output will rise and then fall again despite the fact that the trailing end of the original has not yet cleared the detector 319. The detection of such punched apertures is indicated as pulse P on FIG. 50. The flip-flop $FF_{18}$ is not set in response to the detection pulse P for the punched apertures since its reset input terminal is connected through $OR_{18}$ with the output terminal of timer $T_{13}$ and the flip-flop remains reset for the duration $t_1$ of the timer, i.e. while the timer output persists. Consequently, the solenoid 349a continues to operate, and the solenoid 315a also continues its operation until the output from timer $T_{13}$ ceases, so that it is upon cessation of the timer output that the flip-flop $FF_{20}$ is set to energize the clutch MC (B' in FIG. 50). In this manner, a new original is fed after or simultaneously with the completion of the original ejection, and no new original is fed during the course of the ejection.

A newly fed original has its leading end detected by the detector 319 in the similar manner as mentioned previously (C' in FIG. 50), and is located at the given position.

Switch $P_2$ represents a reset switch, which may be depressed to reset flip-flop $FF_{15}$–$FF_{20}$ as well as timer $T_{13}$.

2. Auto Mode

The auto-manual change-over switch $S_6$ is thrown to the auto position, or is opened. A required number of copies is set on the repeat dial $S_5$ in the similar manner as in the manual mode. When the repeat dial is turned to a desired position, a required number of copies is obtained for succeeding originals as well. The depression of the print button $P_1$ sets $FF_5$, the Q output of which sets $FF_{16}$ in turn, thus changing to the auto mode. When $FF_{16}$ is set, $FF_{11}$ contained in the control body is also set. The Q output of $FF_{11}$ provides a low level input to $NAND_{22}$, preventing an ejection termination signal Z from being produced. The $\overline{Q}$ output of $FF_{11}$ provides a high level signal to the reset terminal of $FF_8$ which is used to drive the reflecting mirror 13, thus preventing it from being set. In this manner, it is assured that, when the exposure for the last copy is terminated, the reflecting mirror 13 cannot be operated and thus remains unchanged in position.

When the exposure for the last copy is initiated, the output body $NAND_{18}$ contained in the control of changes from a high level to a low level, and resumes a high level again at the same time with the termination of the exposure. A signal which is defined by a change from the low to high level causes the output of $NAND_{26}$ contained in the control of the original feeder to change to a high level momentarily, thus triggering timer $T_{13}$ through $NOR_{16,17}$ and setting $FF_{17}$ through $INV_{15}$. The solenoid 349a is energized by the output of $FF_{17}$ and the solenoid 315a is energized by the output of $FF_{18}$, whereby the original located on the pressure plate 372 is ejected, and a next original in the hopper is conveyed. After a given operation, this original stops on the pressure plate, releasing $FF_{19}$ which is used to drive the pressure plate drive solenoid 352. At the moment $FF_{19}$ is released, the output of $NAND_{27}$ contained in the control of the original feeder changes from a high to a low level, which change is shaped into a pulse by means of $NOR_{18,19}$ and fed to $OR_{5,6}$ in the control of the body as an auto print signal AP. The signal AP permits a copying operation to be performed by a process similar to that initiated by the depression of the print button $P_1$. Subsequently, the ejection and feeding of the originals are continued until the last exposure for the given number of copies is completed and until the originals contained in the hopper 345 are exhausted.

When all of the originals contained in the hopper are copied and the last original is ejected from the pressure plate 371, the machine initiates a next original feeding operation, but the absence of an original to be fed causes the original jamming detection circuit to reset the original conveying drive system after a given period of time. In this manner, $FF_{16}$ is also reset, and hence $FF_{11}$ in the body is also set, making the ejection detection circuit operative. A detection time for the original jamming is chosen less than a time interval required for the leading edge of the last copy sheet to reach the ejection detection switch following the termination of the exposure. When the ejection of the last copy sheet is detected and the timer $T_9$ expires, the output of $NAND_{19}$ momentarily assumes a low level to set $FF_8$, whereby the drive motor for the first reflecting mirror 13 is set in motion, rotating the first reflecting mirror to make the machine ready to act as a reader. A reader operation is enabled by the closure of the switch 312a which illuminates the light source 4.

If an interruption of the copying operation is desired during the auto mode, the reset switch $P_2$ may be depressed to change the machine into the manual mode. Subsequent operation takes place in a manner similar to that described above in connection with the manual mode. Alternatively, the auto-manual change-over switch $S_6$ may be thrown to the manual position. The switching between the auto and manual modes is preferential for the manual mode, so that a transition from the auto to manual mode is possible during a copying cycle, but a transition from the manual to auto mode is prevented.

Upon termination of the projection, the solenoid 349a is energized, whereby the pinch roller 349b is urged against the feed roller 349, thus feeding the original. Simultaneously, the solenoid 315a pivotally connected to the lever 374 of the stop is energized to move the lever 374, whereby the stop 315, which is rotatably mounted on this lever, moves away from the guide 373. Since the pinch roller 316a is urged against the roller 316 at this time, the original having passed the stop 315 is delivered by the roller 316 into the ejection tray 317.

The detector 319 is maintained isolated from light during the time the original remains stationary for the purpose of projection.

What we claim is:

1. A reader-printer apparatus comprising, in combination, a projection optical system; a copying system having a duplication exposing position; a screen; and a reflector device in said optical system selectively operable to project an image of an original either onto said screen or to said duplication exposing position; said copying system including means operable to mount at least two rolls of paper or different respective widths, a copy sheet feed device switchable between the rolls of paper to be fed in accordance with the required width of copy sheets to be produced from the original, a paper cutting device operable to sever the paper fed from a roll into copy sheets of the required length, a charging device receiving the copy sheets and including two charges selectively energizable in accordance with the copy sheet size and quality, a copy sheet suction and conveyor device receiving copy sheets from said charging device and conveying the copy sheets to said duplication exposing position, a developing device receiving exposed copy sheets delivered thereto from said duplication exposing position by said suction and conveying device, and a copy sheet ejecting device receiving the developed copy sheets from said developing device and ejecting the copy sheets from said apparatus.

2. A reader-printer apparatus as in claim 1 further comprising a detector means arranged in the copy sheet passage for detecting the passing of said copying system of the copy sheet, said detector means comprising a light emitting element, a light receiving element and a mirror, said light emitting element and light receiving element being arranged in one side of the copy sheet passage and said mirror being arranged in the other side of the copy sheet passage so as to reflect light from said light emitting element toward said light receiving element.

3. A reader-printer apparatus, as claimed in claim 1 wherein said developing device comprises a developing liquid tank and a developing liquid supply member mounted on the tank, said liquid supply member having a bottom plate which has a lowest central portion as seen in the direction of movement of the copy sheet, two inclined surface at the front and rear thereof, and outlet ports arranged on the central lowest portion thereof spaced apart from one another and a guide plate which is formed in chevron form with highest central portion and lower side portions, and is disposed upon the central portion of the bottom plate, whereby developing liquid is distributed evenly.

4. A reader-printer apparatus, as claimed in claim 1, in which said reflector device comprises a mirror; a shaft supporting said mirror for rotation through a predetermined angle in opposite directions; a pair of gears mounted coaxially on said shaft for rotation thereabout and in juxtaposition with each other; a pair of pins rotatable with said mirror and positioned symmetrically on opposite sides of said shaft; respective pins on each of said gears; respective springs each connecting one of said first mentioned pins to a pin on a respective gear; and driving means engaged with said gears and operable to rotate said mirror; whereby backlash of said gears is eliminated.

5. A reader-printer apparatus, as claimed in claim 1, including a frame; said paper cutting device comprising a rotary cutter; a rotary solenoid having a solenoid shaft secured to said rotary cutter; a manual cutting lever secured to said solenoid shaft to rotate said rotary cutter to manually cut a paper; said copy sheet feed device including a paper feed roller; a manually operable knob; a friction clutch connecting said manually operable knob to said paper feed roller; a driving shaft coaxial with said paper feed roller; a one-way clutch connecting said driving shaft to said paper feed roller; a guide plate oscillatably supported by said frame; a wire connecting said guide plate to said manually operable knob; said guide plate being tilted, responsive to manual rotation of said paper feed roller by said manually operable knob, to form an ejecting guide for a severed end of the paper.

6. A reader-printer apparatus, as claimed in claim 1, including a paper feed roller disposed in said copy sheet feed device; a guide plate operable to lead paper from a roller of paper toward said paper feed roller, said guide palte being formed with an exit port for leading the end portion of the paper outwardly therethrough; and a cutter positioned in the vicinity of said exit port and operable to sever the leading end portion of the paper led outwardly through said exit port.

7. A reader-printer apparatus, as claimed in claim 1, in which said copy sheet suction and conveyor device includes a vacuum tank disposed along a copy sheet passage; a plurality of laterally spaced conveyor belts maintained in sliding contact with a periphery defining an open side of said vacuum tank; two suction blowers having suction ports in communication with said vacuum tank; respective motors for driving said suction blowers; and switch means interconnecting said motors and operable selectively to connect said motors in series during the time said apparatus is not providing duplicate copies of an original and in parallel during the time said apparatus is producing duplicate copies of an original, for increasing the speed of said suction blowers during the time the apparatus is producing copies and decreasing the speed of said blowers during the time said apparatus is not producing copies.

8. A reader-printer apparatus, as claimed in claim 1, in which said copy sheet suction and conveyor device has switches positioned along the path of travel of copy sheets therethrough and selectively operable by the copy sheets to center each copy sheet in alignment longitudinally with the optical axis of said projection optical system; said switches including respective switches operable responsive to each different length of copy sheet passing through said copy sheet suction and conveyor device.

9. A reader-printer apparatus, as claimed in claim 1, in which said copy sheet feed device and said developing device comprise respective detection means operable independently to detect separately jamming of the respective copy sheet passage portion extending therethrough; each jamming detection means including first and second respective switches and a respective timer; the first respective switch of each jamming detection means being actuated to reset the associated timer with jamming being detected if the second respective switch is not actuated in a predetermined time interval established by the associated timer.

10. A reader-printer apparatus, as claimed in claim 1, comprising a print switch operable to effect duplication of an original; a first switch operable to produce a cut signal for said cutting device; a second switch operable to produce a copy sheet ejection detection signal; and a ratchet relay adapted to be set by said cut signal and to be reset by said ejection detection signal; the set state of said ratchet relay being maintained, unless said ratchet relay is reset, even if the power supply to said apparatus is terminated, so as to eject a copy sheet, responsive to application of power to said apparatus, and independently of operation of said print switch.

11. A reader-printer apparatus, as claimed in claim 1, in which said projection optical system comprises an original feeding device constituted by a pressure plate for receiving an original, an ejection roller, and a feed roller operable, responsive to a feed signal, to feed the original to said ejection roller; a photoelectric detector positioned between said feed roller and said ejection roller and constituted by a light emitting element and a light-receiving element, said photoelectric detector detecing passage of an original to said ejection roller and, responsive to light from said emitting element being again incident on said receiving element, producing an output signal; a flip-flop connected to said photoelectric detector and driven to a set state, responsive to the output signal of said photoelectric detector, producing a signal stopping said feed roller; and a timer operatively associated with said flip-flop, said timer, responsive to said feed signal, blocking driving of said flip-flop to the set state during the time interval required for the trailing end of the original to clear said photoelectric detector.

12. A reader-printer apparatus, as claimed in claim 1, in which said projection optical system includes an original feeding device; pressing plate means operable to receive an original therein; an automatic feed device operable to feed originals automatically; said original feeding device being constructed and arranged to interchangeably receive said pressing plate means and said automatic feed device; said pressing plate means being constructed and arranged for changing originals manually one by one; said automatic feed device being operable to store a plurality of originals, in the form of cards, in juxtaposition, and to feed the cards automatically one by one.

13. A reader-printer apparatus, as claimed in claim 12, in which said original feeding device comprises a support; and a plurality of carriers selectively disengageably mountable on said support; each carrier, when mounted on said support, being movable in both the horizontal and the vertical direction for proper positioning of an original; said carriers being interchangeable in accordance with the dimensions of the original, the length to be moved, or both.

14. A reader-printer apparatus, as claimed in claim 1, in which said reflector device comprises a reflector mounted for rotation through a predetermined angular range; and a blind opened and closed in synchronism with rotation of said reflector in respective opposite directions.

15. A reader-printer apparatus, as claimed in claim 14, including a rotatable shaft secured to one end of said blind and operable to wind said blind thereon; pivoted arm means secured to the opposite end of said blind; spring means biasing said pivoted arm means in a direction to unwind said blind from said rotatable shaft; a wire drum secured to rotate with said rotatable shaft; a wire secured to one end to said drum and wound thereon; and means rotatable with said reflector operable, responsive to pivoting of said reflector through said predetermined angular range, to engage and pull said wire to rotate said drum to rotate said rotatable shaft to wind said blind thereon, whereby said blind is opened and closed in synchronism with pivoting of said reflector.

16. A reader-printer apparatus, as claimed in claim 1, in which said charging device comprises a casing including upper and lower casing sections; two sets of electrodes arranged side by side in each casing section; and respective tungsten wires connected to each electrode, the wires in each casing section extending in spaced parallel relation to each other; each set of electrodes and tungsten wires constituting a respective one of said two chargers; whereby the polarities and the voltage of said two sets of electrodes and tungsten wires are adjustable independently of each other.

17. A reader-printer apparatus, as claimed in claim 16, wherein the voltage applied to the electrodes of each charger is adjustable dependent on the width of the copy sheet, to prevent a voltage drop based on a corona discharge taking place between the spaced tungsten wires in portions thereof not separated by a copy sheet.

* * * * *